US012334629B2

(12) United States Patent
Park et al.

(10) Patent No.: US 12,334,629 B2
(45) Date of Patent: Jun. 17, 2025

(54) WEARABLE ELECTRONIC DEVICE INCLUDING ANTENNA

(71) Applicant: SAMSUNG ELECTRONICS CO., LTD., Suwon-si (KR)

(72) Inventors: Sungkoo Park, Suwon-si (KR); Kyoungmok Kim, Suwon-si (KR); Seunghwan Kim, Suwon-si (KR); Jonghoon Kim, Suwon-si (KR); Jiyeon Yun, Suwon-si (KR); Jaeho Lim, Suwon-si (KR); Jaebong Chun, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 213 days.

(21) Appl. No.: 18/118,352

(22) Filed: Mar. 7, 2023

(65) Prior Publication Data

US 2023/0231303 A1 Jul. 20, 2023

Related U.S. Application Data

(63) Continuation of application No. PCT/KR2023/000572, filed on Jan. 12, 2023.

(30) Foreign Application Priority Data

Jan. 12, 2022 (KR) ........................ 10-2022-0004665
Mar. 29, 2022 (KR) ........................ 10-2022-0038468
Jan. 12, 2023 (KR) ........................ 10-2023-0004713

(51) Int. Cl.

*H01Q 1/27* (2006.01)
*H01Q 1/48* (2006.01)
*H01Q 5/364* (2015.01)

(52) U.S. Cl.

CPC ............... *H01Q 1/273* (2013.01); *H01Q 1/48* (2013.01); *H01Q 5/364* (2015.01)

(58) Field of Classification Search

CPC .......... H01Q 1/243; H01Q 1/27; H01Q 1/273; H01Q 1/44; H01Q 5/30; H01Q 5/364; H04B 1/385; H04B 2001/3866

See application file for complete search history.

(56) References Cited

U.S. PATENT DOCUMENTS

2013/0194141 A1 8/2013 Okajima et al.
2014/0071004 A1 3/2014 Jenwatanavet et al.
(Continued)

FOREIGN PATENT DOCUMENTS

JP 4730674 7/2011
JP 2013-090061 5/2013
(Continued)

OTHER PUBLICATIONS

Search Report dated Apr. 11, 2023 in International Patent Application No. PCT/KR2023/000572.
(Continued)

*Primary Examiner* — Jason M Crawford
(74) *Attorney, Agent, or Firm* — Nixon & Vanderhye, P.C.

(57) ABSTRACT

An example wearable electronic device may include: a bridge; a first rim disposed in a first direction of the bridge, and a second rim disposed in a second direction of the bridge, the second direction being opposite to the first direction; and a first temple configured to be folded or unfolded with respect to the first rim using a first hinge part, and a second temple configured to be folded or unfolded with respect to the second rim using a second hinge part, wherein the first temple includes: a first printed circuit board on which a wireless communication circuit is disposed and
(Continued)

a ground area is partially formed; a non-conductive area formed on a part of the ground area; a feeder wire disposed across the non-conductive area, and having a first end electrically connected to the wireless communication circuit using a signal path and a second end disposed adjacent to the ground area; a feeder point formed adjacent to the second end of the feeder wire and electrically connected to the feeder wire; and a first electronic component electrically connected to a part of the ground area, electrically connected to the feeder point, using a first conductive connection member, wherein the part of the ground area and at least a part of the first electronic component may be utilized as antennas.

20 Claims, 43 Drawing Sheets

(56) References Cited

U.S. PATENT DOCUMENTS

| | | | | |
|---|---|---|---|---|
| 2014/0240474 | A1* | 8/2014 | Kondo | H04B 1/385 348/56 |
| 2014/0375679 | A1 | 12/2014 | Margolis | |
| 2015/0109174 | A1 | 4/2015 | Chang | |
| 2016/0079660 | A1 | 3/2016 | Bevelacqua | |
| 2016/0204839 | A1 | 7/2016 | Liu | |
| 2017/0103440 | A1 | 4/2017 | Xing et al. | |
| 2018/0081201 | A1 | 3/2018 | Lore et al. | |
| 2018/0212314 | A1 | 7/2018 | Rautio | |
| 2020/0119433 | A1* | 4/2020 | Ashwood | H01Q 1/273 |
| 2020/0174281 | A1* | 6/2020 | Gui | G02C 5/22 |
| 2021/0149224 | A1* | 5/2021 | Zhang | G02C 11/10 |
| 2023/0076226 | A1* | 3/2023 | Yang | H01Q 1/38 |
| 2023/0121025 | A1* | 4/2023 | Choe | H01Q 1/27 361/749 |
| 2023/0147580 | A1* | 5/2023 | Kim | H01Q 1/273 361/679.03 |
| 2023/0163449 | A1* | 5/2023 | Choi | H01Q 1/273 343/718 |
| 2023/0213771 | A1* | 7/2023 | Choe | G02B 27/0172 345/8 |
| 2023/0231303 | A1* | 7/2023 | Park | H01Q 1/48 343/702 |
| 2024/0098912 | A1* | 3/2024 | Jeon | H05K 1/181 |
| 2024/0111334 | A1* | 4/2024 | Yang | G02B 27/0172 |
| 2024/0151987 | A1* | 5/2024 | Hong | G02C 5/14 |

FOREIGN PATENT DOCUMENTS

| | | |
|---|---|---|
| JP | 5576948 | 8/2014 |
| KR | 10-1433669 | 8/2014 |
| KR | 10-2005997 B1 | 7/2019 |
| KR | 10-2019-0120349 | 10/2019 |
| KR | 10-2021-0015460 | 2/2021 |
| KR | 10-2296123 B1 | 8/2021 |
| WO | 2018/140097 | 8/2018 |

OTHER PUBLICATIONS

Written Opinion dated Apr. 11, 2023 in International Patent Application No. PCT/KR2023/000572.

Extended Search Report dated Mar. 4, 2025 in European Patent Application No. 23740468.6.

Wang, Yan-Yan Et Al: "Sub-6GHZ 4G/5G Conformal Glasses Antennas," IEEE Access, vol. 7, pp. 182027-182036, XP011762910, DOI: 10.1109/ACCESS.2019.2959603, Dec. 13, 2019.

Cihangir, Aykut Et Al: "Feasibility Study of 4G Cellular Antennas for Eyewear Communicating Devices," IEEE Antennas and Wireless Propagation Letters, vol. 12, pp. 1704-1707, XP011538732, ISSN: 1536-1225, DOI: 10.1109/LAWP.2013.2287204, Jan. 29, 2014.

* cited by examiner

WEARABLE ELECTRONIC DEVICE INCLUDING ANTENNA

CROSS-REFERENCE TO RELATED APPLICATIONS

This application is a continuation application of International Application No. PCT/KR2023/000572 designating the United States, filed on Jan. 12, 2023, in the Korean Intellectual Property Receiving Office and claiming priority to Korean Patent Application No. 10-2022-0004665, filed on Jan. 12, 2022, Korean Patent Application No. 10-2022-0038468, filed on Mar. 29, 2022, and Korean Patent Application No. 10-2023-0004713, filed on Jan. 12, 2023, in the Korean Intellectual Property Office, the disclosures of which are incorporated by reference herein in their entireties.

BACKGROUND

1. Field

The disclosure relates to a wearable electronic device including at least one antenna.

2. Description of Related Art

A wearable electronic device has been provided in various forms, such as glasses shaped augmented reality (AR) glasses or head mounted display (HMD).

The wearable electronic device may transmit and receive various pieces of data to and from another electronic device through wireless communication.

In order to perform wireless communication with another electronic device, the wearable electronic device may include at least one antenna (e.g., antenna radiator).

SUMMARY

A wearable electronic device may include glasses-shaped augmented reality (AR) glasses or smart glasses implementing various kinds of content on transparent glasses (e.g., lenses).

The wearable electronic device may visually provide a user with information in which an actually existing (real-world) environment and a virtual object made up of graphics are synthesized.

Wearable electronic devices have been small-sized and light-weight to provide convenience of wearing to the user. Accordingly, a wearable electronic device may have a reduced disposition space for an antenna (e.g., antenna radiator) for performing wireless communication with another electronic device.

Various embodiments of the disclosure can provide a wearable electronic device which can utilize at least one of a ground area and an electronic component, disposed on a first temple and/or a second temple, as an antenna.

Technical problems to be solved in the disclosure are not limited to the above-mentioned technical problems and unmentioned or other technical problems will be able to be clearly understood from the following description.

A wearable electronic device according to an example embodiment of the disclosure may include: a bridge; a first rim disposed in a first direction of the bridge, and a second rim disposed in a second direction of the bridge, the second direction being opposite to the first direction; and a first temple configured to be folded or unfolded with respect to the first rim using a first hinge part, and a second temple configured to be folded or unfolded with respect to the second rim using a second hinge part, wherein the first temple includes: a first printed circuit board on which a wireless communication circuit is disposed and a ground area is partially formed; a non-conductive area formed on a part of the ground area; a feeder wire disposed across the non-conductive area, and having a first end electrically connected to the wireless communication circuit using a signal path and a second end disposed adjacent to the ground area; a feeder point formed adjacent to the second end of the feeder wire and electrically connected to the feeder wire; and a first electronic component electrically connected to a part of the ground area, electrically connected to the feeder point, using a first conductive connection member.

A wearable electronic device according to an example embodiment of the disclosure may include: a bridge; a first rim disposed in a first direction of the bridge, and a second rim disposed in a second direction of the bridge, the second direction being opposite to the first direction; and a first temple configured to be folded or unfolded with respect to the first rim using a first hinge part, and a second temple configured to be folded or unfolded with respect to the second rim using a second hinge part, wherein the first temple includes: a first printed circuit board on which a first wireless communication circuit is disposed and a first ground area is partially formed; a first non-conductive area formed on a part of the first ground area; a first feeder wire disposed across the first non-conductive area, and having a first end electrically connected to the first wireless communication circuit using a first signal path and a second end disposed adjacent to the first ground area; a first feeder point formed adjacent to the second end of the first feeder wire and electrically connected to the first feeder wire; and a first electronic component electrically connected to a part of the first ground area electrically connected to the first feeder point using a first conductive connection member, and wherein the second temple includes: a second printed circuit board on which a second wireless communication circuit is disposed and a second ground area is partially formed; a second non-conductive area formed on a part of the second ground area; a second feeder wire disposed across the second non-conductive area, and having a first end electrically connected to the second wireless communication circuit using a second signal path and a second end disposed adjacent to the second ground area; a second feeder point formed adjacent to the second end of the second feeder wire and electrically connected to the second feeder wire; and a second electronic component electrically connected to a part of the second ground area, electrically connected to the second feeder point, using a second conductive connection member.

According to various embodiments of the disclosure, at least one of the ground area and the electronic component (e.g., sound output module, battery, or motor) disposed on the first temple and/or the second temple may be utilized as an antenna (e.g., antenna radiator) without preparing a separate disposition space for disposing an antenna on the wearable electronic device.

According to various embodiments of the disclosure, since the at least one of the ground area and the electronic component disposed on the first temple and/or the second temple may be utilized as an antenna (e.g., antenna radiator), issues relating to the lack of physical disposition space for disposing the antenna on the wearable electronic device can be addressed.

In addition, various effects being understood directly or indirectly through the present document may be provided.

BRIEF DESCRIPTION OF THE DRAWINGS

In relation to the description of the drawings, the same or similar reference numerals may be used for the same or similar elements.

The above and other aspects, features, and advantages of certain embodiments of the present disclosure will be more apparent from the following detailed description, taken in conjunction with the accompanying drawings, in which.

DETAILED DESCRIPTION

Figure 1:
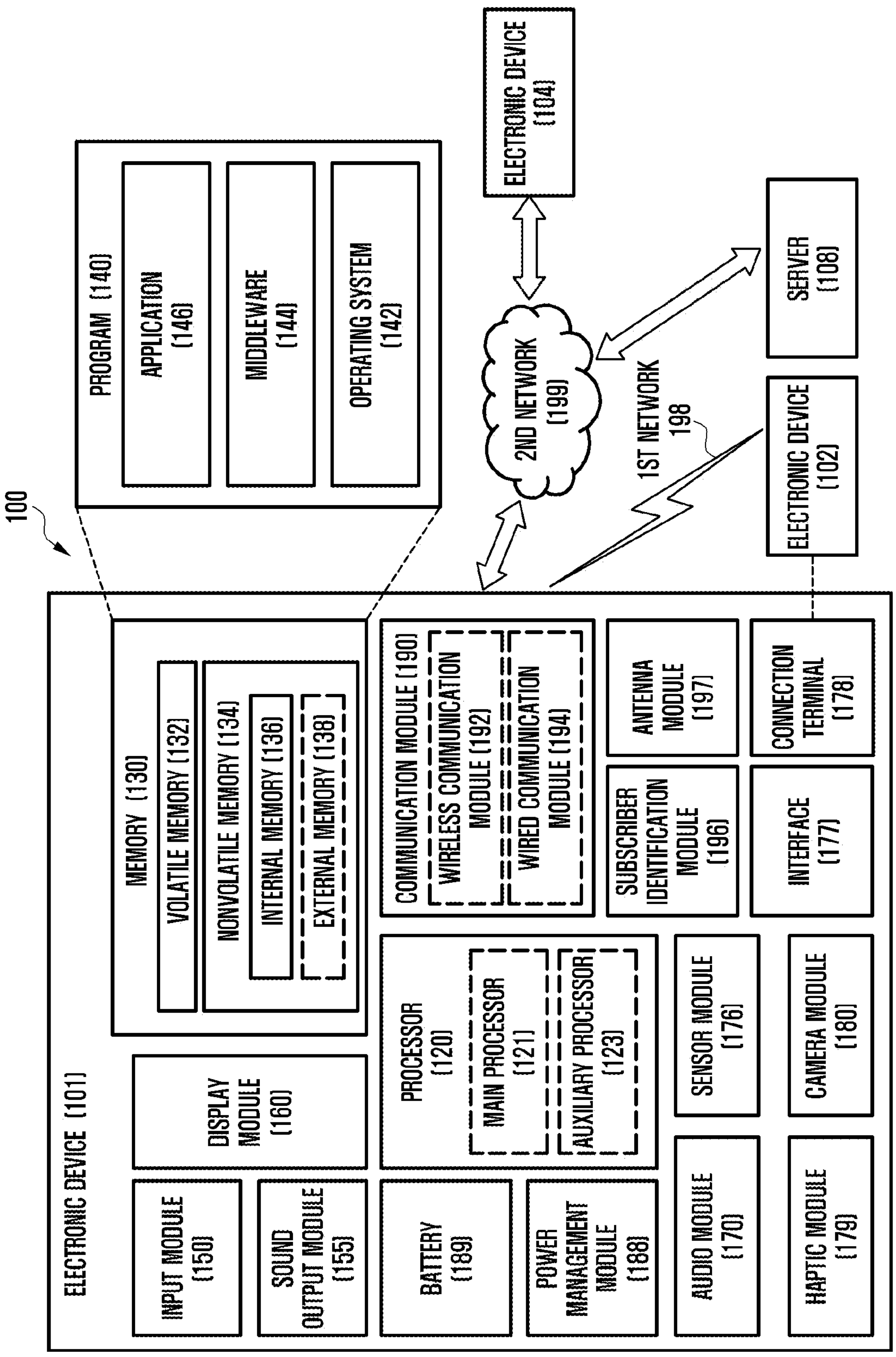
FIG. 1 is a block diagram of an example electronic device in a network environment according to various embodiments.

FIG. 1 is a block diagram of an example electronic device in a network environment according to various embodiments of the disclosure.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connection terminal 178, a haptic module 179, a camera module 180, a power management module 188, a battery 189, a communication module 190, a subscriber identification module (SIM) 196, or an antenna module 197. In various embodiments, at least one of the components (e.g., the connection terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connection terminal 178 may include a connector via which the electronic device 101 may be physically connected with the external electronic device (e.g., the electronic device 102). According to an embodiment, the connection terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beam-forming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of or including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as “A or B,” “at least one of A and B,” “at least one of A or B,” “A, B, or C,” “at least one of A, B, and C,” and “at least one of A, B, or C,” may include any one of, or all possible combinations of the items enumerated together in a corresponding one of the phrases. As used herein, such terms as “1st” and “2nd,” or “first” and “second” may be used to simply distinguish a corresponding component from another, and does not limit the components in other aspect (e.g., importance or order). It is to be understood that if an element (e.g., a first element) is referred to, with or without the term “operatively” or “communicatively”, as “coupled with,” “coupled to,” “connected with,” or “connected to” another element (e.g., a second element), the element may be coupled with the other element directly (e.g., wiredly), wirelessly, or via a third element.

As used in connection with various embodiments of the disclosure, the term “module” may include a unit implemented in hardware, software, or firmware, or a combination thereof, and may interchangeably be used with other terms, for example, “logic,” “logic block,” “part,” or “circuitry”. A module may be a single integral component, or a minimum unit or part thereof, adapted to perform one or more functions. For example, according to an embodiment, the module may be implemented in a form of an application-specific integrated circuit (ASIC).

Figure 2:
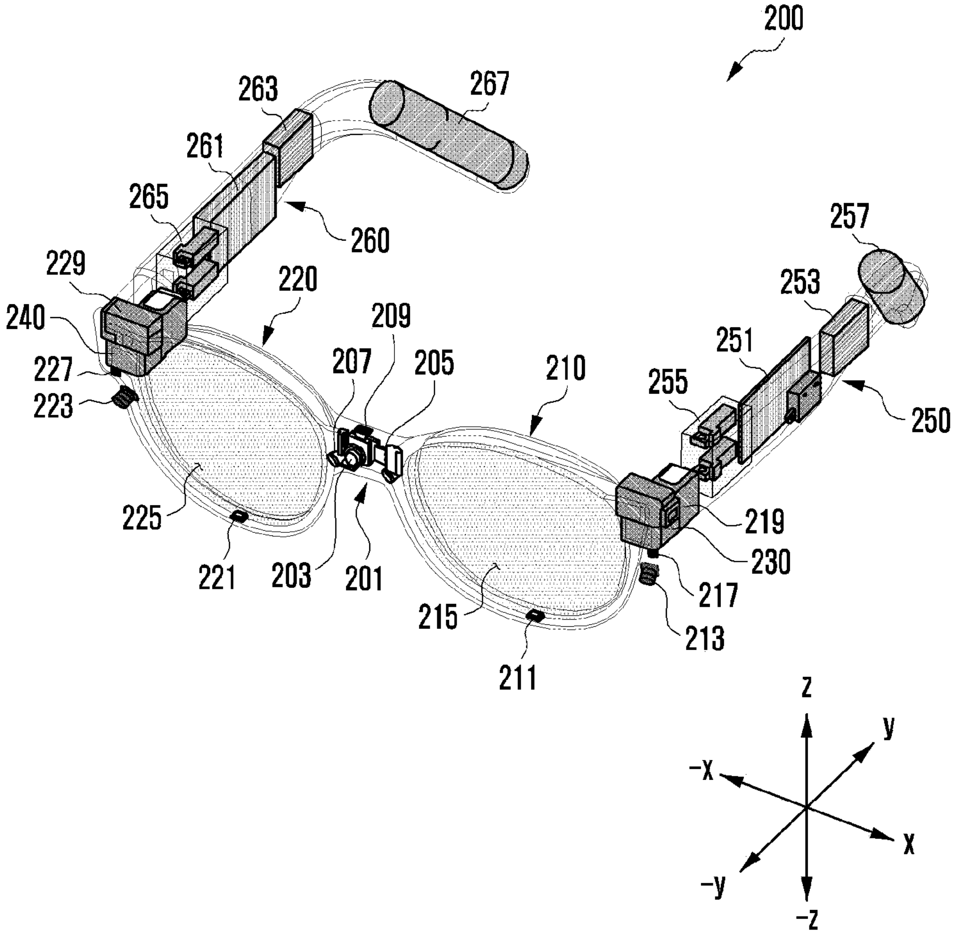
FIG. 2 is a perspective view schematically illustrating the configuration of an example wearable electronic device according to various embodiments.

FIG. 2 is a perspective view schematically illustrating the configuration of an example wearable electronic device according to various embodiments of the disclosure.

A wearable electronic device 200 of FIG. 2 may include components identified as being included in the electronic device 101 of FIG. 1. The wearable electronic device 200 may include glasses-shaped augmented reality (AR) glasses or smart glasses.

With reference to FIG. 2, the wearable electronic device 200 according to various embodiments of the disclosure may include a bridge 201, a first rim 210, a second rim 220, a first end piece 230, a second end piece 240, a first temple 250, and/or a second temple 260.

According to an embodiment, the bridge 201 may connect the first rim 210 and the second rim 220 with each other. When a user wears the wearable electronic device 200, the bridge 201 may be located over the user's nose. The bridge 201 may divide the first rim 210 and the second rim 220 from each other based on the user's nose.

According to various embodiments, the bridge 201 may include a camera module 203, a first gaze tracking camera 205, a second gaze tracking camera 207, and/or an audio module 209.

According to various embodiments, the camera module 203 (e.g., camera module 180 of FIG. 1) may capture an image of the front (e.g., −y-axis direction) of the user (e.g., user of the wearable electronic device 200), and may acquire image data. The camera module 203 may capture an image corresponding to a user's field of view (FoV), or may measure a distance from a subject (e.g., object). The camera module 203 may include an RGB camera, a high resolution (HR) camera, and/or a photo video (PV) camera. In order to acquire a high definition image, the camera module 203 may include a color camera having an auto focus (AF) function and an optical image stabilization (OIS) function.

According to various embodiments, the first gaze tracking camera 205 and the second gaze tracking camera 207 may identify a user's gaze. The first gaze tracking camera 205 and the second gaze tracking camera 207 may capture an image of the user's pupil in a direction opposite to the image capturing direction of the camera module 203. For example, the first gaze tracking camera 205 may partially capture an image of the user's left eye, and the second gaze tracking camera 205 may partially capture an image of the user's right eye. The first gaze tracking camera 205 and the second gaze tracking camera 207 may detect user's pupils (e.g., left eye and right eye), and may track the user's gaze direction. The tracked gaze direction may be utilized for the movement of the center of a virtual image including a virtual object corresponding to the gaze direction. The first gaze tracking camera 205 and/or the second gaze tracking camera 207 may track the user's gaze by using at least one of an electro-oculography or electrooculogram (EOG) sensor, a coil system, a dual Purkinje system, bright pupil systems, or dark pupil systems.

According to various embodiments, the audio module 209 (e.g., audio module 170 of FIG. 1) may, for example, be disposed between the first gaze tracking camera 205 and the second gaze tracking camera 207. The audio module 209 may convert a user's voice into an electrical signal, or may convert an electrical signal into a voice. The audio module 209 may include a microphone.

According to an embodiment, the first rim 210 and the second rim 220 may form a frame (e.g., glasses frame) of the wearable electronic device 200 (e.g., AR glasses). The first rim 210 may be disposed in a first direction (e.g., x-axis direction) of the bridge 201. The first rim 210 may be disposed at a location corresponding to the user's left eye. The second rim 220 may be disposed in a second direction (e.g., −x-axis direction) of the bridge 201, the second direction being opposite to the first direction (e.g., x-axis direction). The second rim 220 may be disposed at a location corresponding to the user's right eye. The first rim 210 and the second rim 220 may each be formed of a metal material and/or a non-conductive material (e.g., polymer).

According to various embodiments, the first rim 210 may surround and support at least a part of a first glass 215 (e.g., first display) disposed on an inner periphery thereof. The first glass 215 may be located in front of the user's left eye. The second rim 220 may surround and support at least a part of a second glass 225 (e.g., second display) disposed on an inner periphery thereof. The second glass 225 may be located in front of the user's right eye. The user of the wearable electronic device 200 can see a foreground (e.g., actual or real-world image) for an external object (e.g., subject) through the first glass 215 and the second glass 225. The wearable electronic device 200 can implement the augmented reality by overlapping and displaying a virtual image on the foreground (e.g., actual or real-world image) for the external object.

According to various embodiments, the first glass 215 and the second glass 225 may include projection type transparent displays. The first glass 215 and the second glass 225 may form reflective surfaces with transparent plates (or transparent screens), and an image generated from the wearable electronic device 200 may be reflected (e.g., total internal reflection) through the reflective surfaces, and may be incident to the left eye and the right eye of the user. In an embodiment, the first glass 215 may include an optical waveguide that transfers light generated from a light source of the wearable electronic device 200 to the user's left eye. For example, the optical waveguide may be formed of glass, plastic, or polymer materials, and may include a nano pattern (e.g., polygonal or curved grating structure or mesh structure) formed on the inside or surface of the first glass 215. The optical waveguide may include at least one of a diffraction element (e.g., diffractive optical element (DOE) or holographic optical element (HOE)), or a reflective element (e.g., reflective mirror). The optical waveguide may guide the display light, emitted from the light source, to the user's eye using the at least one diffractive element or reflective element included in the optical waveguide. In various embodiments, the diffractive element may include an input/output optical member, and the refractive element may include a total internal reflection (TIR) element. For example, the optical path of the light emitted from the light source may be guided to the optical waveguide through the input optical member, and the light that moves through the inside of the optical waveguide may be guided in the direction of the user's eye through the output optical member. The second glass 225 may be implemented substantially in the same manner as the first glass 215.

According to various embodiments, the first glass 215 and the second glass 225 may include, for example, a liquid crystal display (LCD), a digital mirror device (DMD), a light crystal on silicon (LCoS), an organic light emitting diode (OLED), or a micro light emitting diode (micro LED). Although not illustrated, in case that the first glass 215 and the second glass 225 are composed of or include one of the liquid crystal display, the digital mirror device, or the liquid crystal on silicon, the wearable electronic device 200 may include a light source that emits light onto screen output areas of the first glass 215 and the second glass 225. In another embodiment, in case that the first glass 215 and the second glass 225 can generate light by themselves, for example, in case that the first glass 215 and the second glass 225 are composed of or include one of the organic light emitting diode or the micro LED, the wearable electronic device 200 may provide a virtual image having a good quality to the user even if the wearable electronic device 200 does not include a separate light source.

According to various embodiments, the first rim 210 may include a first microphone 211, a first recognition camera 213, a first light-emitting device 217, and/or a first display module 219. The second rim 220 may include a second microphone 221, a second recognition camera 223, a second light-emitting device 227, and/or a second display module 229.

In various embodiments, the first light-emitting device 217 and the first display module 219 may be included in the first end piece 230, and the second light-emitting device 227 and the second display module 229 may be included in the second end piece 240.

According to various embodiments, the first microphone 211 and/or the second microphone 221 may receive the voice of the user of the wearable electronic device 200, and may convert the voice into an electrical signal.

According to various embodiments, the first recognition camera 213 and/or the second recognition camera 223 may recognize a surrounding space of the wearable electronic device 200. The first recognition camera 213 and/or the second recognition camera 223 may detect a user's gesture within a predetermined distance (e.g., predetermined space) of the wearable electronic device 200. The first recognition camera 213 and/or the second recognition camera 223 may include a global shutter (GS) camera that can reduce a rolling shutter (RS) phenomenon in order to detect and track user's quick hand movements and/or fine movements of the fingers. The wearable electronic device 200 may detect the user's eye corresponding to the dominant eye and/or the auxiliary eye between the user's left eye and right eye using the first gaze tracking camera 205, the second gaze tracking camera 207, the first recognition camera 213, and/or the second recognition camera 223. For example, the wearable electronic device 200 may detect the eye corresponding to the dominant eye and/or the auxiliary eye based on the user's gaze direction against an external object or a virtual object.

According to various embodiments, the first light-emitting device 217 and/or the second light-emitting device 227 may emit light in order to increase accuracy of the camera module 203, the first gaze tracking camera 205, the second gaze tracking camera 207, the first recognition camera 213, and/or the second recognition camera 223. The first light-emitting device 217 and/or the second light-emitting device 227 may be used as auxiliary means (e.g., devices including circuitry) to increase the accuracy when capturing images of the user's pupils using the first gaze tracking camera 205 and/or the second gaze tracking camera 207. In a case of capturing an image of a user's gesture using the first recognition camera 213 and/or the second recognition camera 223, the first light-emitting device 217 and/or the second light-emitting device 227 may be used as the auxiliary means (devices) if it is not easy to detect an object (e.g., subject) to be captured due to a dark environment or light mixing and reflection of several light sources. The first light-emitting device 217 and/or the second light-emitting device 227 may include, for example, LEDs, IR LEDs, or xenon lamps.

According to various embodiments, the first display module 219 and/or the second display module 229 may emit light, and may transfer the emitted light to the user's left eye and/or right eye using the first glass 215 and/or the second glass 225. The first glass 215 and/or the second glass 225 may display various pieces of image information using the light emitted through the first display module 219 and/or the second display module 229. The first display module 219 and/or the second display module 229 may include the display module 160 of FIG. 1. The wearable electronic device 200 may overlap and display the foreground for an external object and images emitted through the first display module 219 and/or the second display module 229 through the first glass 215 and/or the second glass 225.

According to an embodiment, the first end piece 230 may be combined with a part (e.g., x-axis direction) of the first rim 210. The second end piece 240 may be combined with a part (e.g., −x-axis direction) of the second rim 220. In various embodiments, the first light-emitting device 217 and the first display module 219 may be included in the first end piece 230. The second light-emitting device 227 and the second display module 229 may be included in the second end piece 240.

According to various embodiments, the first end piece 230 may connect the first rim 210 and the first temple 250 with each other. The second end piece 240 may connect the second rim 220 and the second temple 260 with each other.

According to an embodiment, the first temple 250 may be operatively connected to the first end piece 230 using a first hinge part 255. The first hinge part 255 may be rotatably configured so that the first temple 250 is folded or unfolded with respect to the first rim 210. The first temple 250 may extend to be located, for example, along the left side of the user's head. When the user wears the wearable electronic device 200, the distal end part (e.g., y-axis direction) of the first temple 250 may be configured, for example, to be bent to be supported on the user's left ear. The second temple 260 may be operatively connected to the second end piece 240 using a second hinge part 265. The second hinge part 265 may be rotatably configured so that the second temple 260 is folded or unfolded with respect to the second rim 220. The second temple 260 may extend to be located, for example, along the right side of the user's head. When the user wears the wearable electronic device 200, the distal end part (e.g., y-axis direction) of the second temple 260 may be configured, for example, to be bent to be supported on the user's right ear.

According to various embodiments, the first temple 250 may include a first printed circuit board 251, a first sound output module 253 (e.g., sound output module 155 of FIG. 1), and/or a first battery 257 (e.g., battery 189 of FIG. 1). The second temple 260 may include a second printed circuit board 261, a second sound output module 263 (e.g., sound output module 155 of FIG. 1), and/or a second battery 267 (e.g., battery 189 of FIG. 1).

According to various embodiments, on the first printed circuit board 251 and/or the second printed circuit board 261, various electronic components (e.g., at least some of constituent elements included in the electronic device 101 of FIG. 1), such as the processor 120, the memory 130, the interface 177, and/or the wireless communication module 192 disclosed in FIG. 1, may be disposed. The processor may include, for example, one or more of a central processing unit, an application processor, a graphic processing device, an image signal processor, a sensor hub processor, or a communication processor. The first printed circuit board 251 and/or the second printed circuit board 261 may include, for example, a printed circuit board (PCB), a flexible PCB (FPCB), or a rigid-flexible PCB (RFPCB). In a certain embodiment, the first printed circuit board 251 and/or the second printed circuit board 261 may include a main PCB, a sub PCB disposed to partly overlap the main PCB, and/or an interposer substrate between the main PCB and the sub PCB. The first printed circuit board 251 and/or the second printed circuit board 261 may be electrically connected to other constituent elements (e.g., the camera module 203, the first gaze tracking camera 205, the second gaze tracking camera 207, the audio module 209, the first microphone 211, the first recognition camera 213, the first light-emitting device 217, the first display module 219, the second microphone 221, the second recognition camera 223, the second light-emitting device 227, the second display module 229, the first sound output module 253, and/or the second sound output module 263) using the FPCB and/or an electrical path such as a cable. For example, the FPCB and/or the cable may be disposed on at least parts of the first rim 210, the bridge 201, and/or the second rim 220. In an example embodiment, the wearable electronic device 200 may include only one of the first printed circuit board 251 or the second printed circuit board 261.

According to various embodiments, the first sound output module 253 and/or the second sound output module 263 may transfer an audio signal to the left and/or right ears of the user. The first sound output module 253 and/or the second sound output module 263 may include, for example, a piezo-electric speaker (e.g., bone conduction speaker) that transfers the audio signal without a speaker hole. In an example embodiment, the wearable electronic device 200 may include only one of the first sound output module 253 or the second sound output module 263.

According to various embodiments, the first battery 257 and/or the second battery 267 may supply a power to the first printed circuit board 251 and/or the second printed circuit board 261 using a power management module (e.g., power management module 188 of FIG. 1). The first battery 257 and/or the second battery 267 may include, for example, a non-rechargeable primary battery, or a rechargeable secondary battery, or a fuel cell. In an example embodiment, the wearable electronic device 200 may include only one of the first battery 257 or the second battery 267.

According to various embodiments, the wearable electronic device 200 may include a sensor module (e.g., sensor module 176 of FIG. 1). The sensor module may generate an electrical signal or a data value corresponding to an internal operation state or an external environment state of the wearable electronic device 200. The sensor module may include, for example, at least one of a gesture sensor, a gyro sensor, a barometric pressure sensor, a magnetic sensor, an acceleration sensor, a grip sensor, a color sensor, an infrared (IR) sensor, a biosensor (e.g., HRM sensor), a temperature sensor, a humidity sensor, or an illumination sensor. In an example embodiment, the sensor module may recognize user's bio information by using various bio sensors (or bio recognition sensor), such as an e-nose sensor, an electromyography (EMG) sensor, an electrocardiogram (ECG) sensor, or an iris sensor.

According to various embodiments, although it has been described that the wearable electronic device 200 is a device that displays augmented reality using the first glass 215 and the second glass 225 in the above description, the wearable electronic device 200 is not limited thereto, but may be, for example, a device that displays virtual reality (VR).

Figure 3:
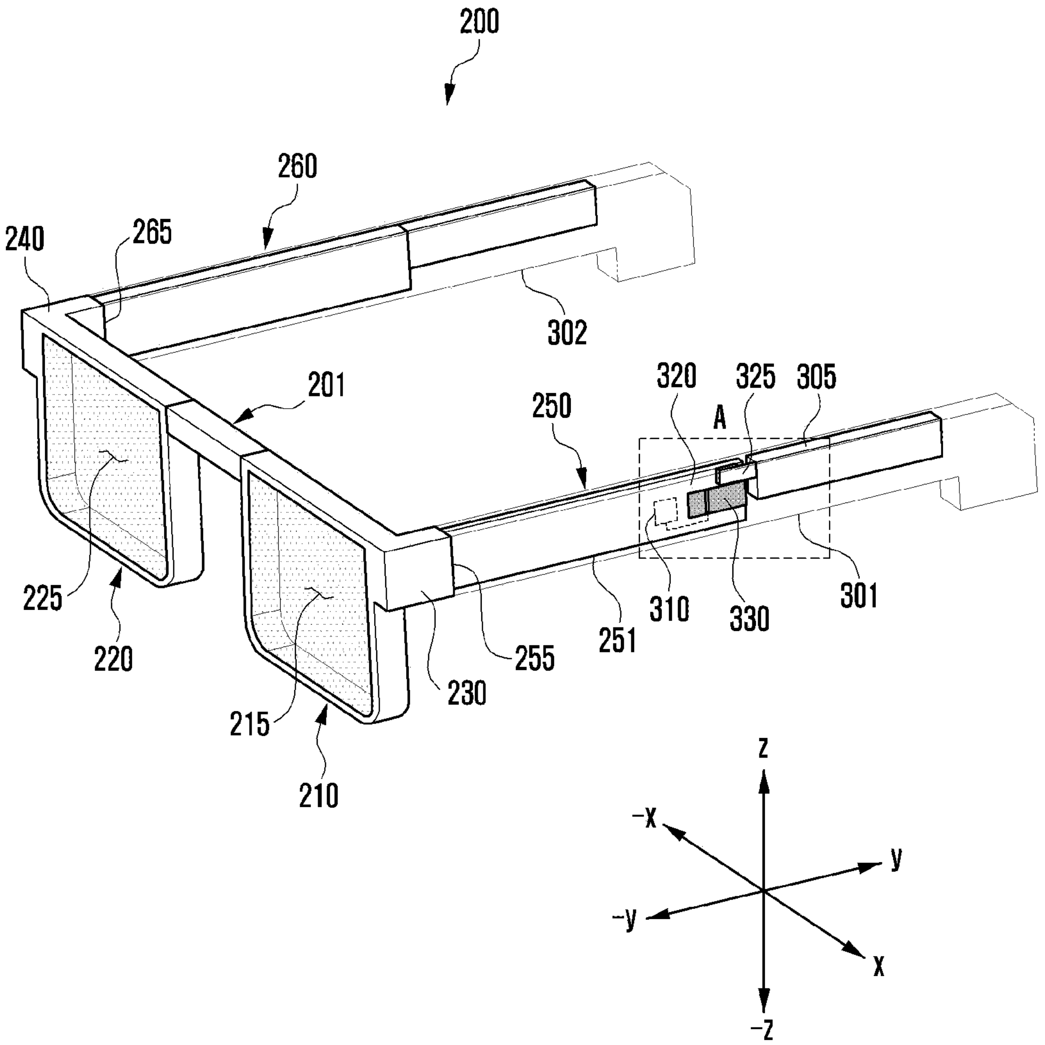
FIG. 3 is a perspective view schematically illustrating an example wearable electronic device including at least one antenna according to various embodiments.
Figure 4:
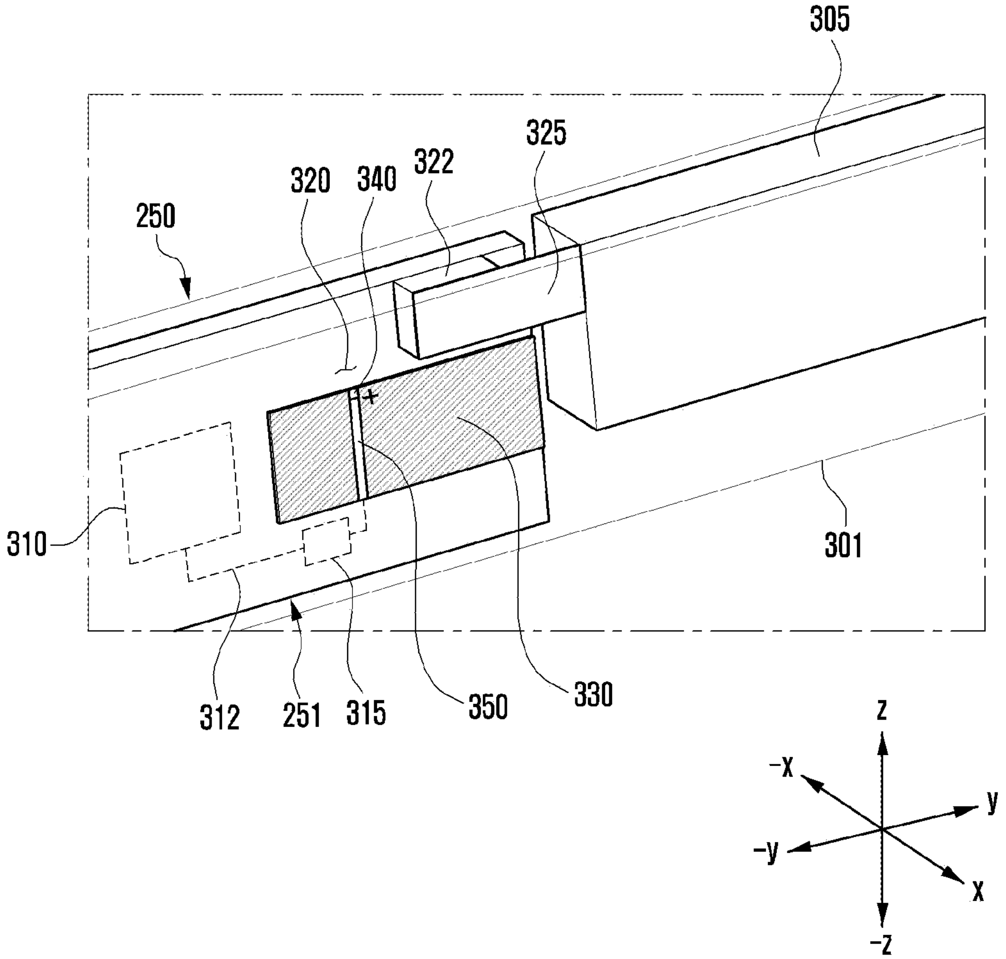
FIG. 4 is an enlarged view schematically illustrating part A of the wearable electronic device disclosed in FIG. 3 according to various embodiments.
Figure 5:
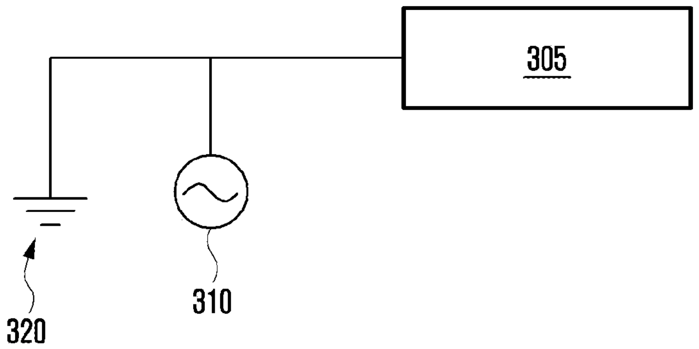
FIG. 5 is a diagram illustrating the structure of an example antenna according to various embodiments.

FIG. 3 is a perspective view schematically illustrating an example wearable electronic device including at least one antenna according to various embodiments of the disclosure. FIG. 4 is an enlarged view schematically illustrating part A of the example wearable electronic device disclosed in FIG. 3 according to various embodiments of the disclosure. FIG. 5 is a diagram illustrating the structure of an example antenna according to various embodiments of the disclosure.

The wearable electronic device 200 of FIG. 3 may include components identified in the description of the wearable electronic device 200 of FIG. 2. The wearable electronic device 200 disclosed in FIG. 3 may correspond to some configurations of the wearable electronic device 200 disclosed in FIG. 2. The wearable electronic device 200 disclosed in FIG. 3 may be united or applied to the wearable electronic device 200 of FIG. 2. In explaining FIG. 3, the same reference numerals may be given to substantially the same constituent elements as those of the embodiment of the wearable electronic device 200 of FIG. 2.

With reference to FIG. 3, the wearable electronic device 200 according to various embodiments of the disclosure may include the bridge 201, the first rim 210, the second rim 220, the first end piece 230, the second end piece 240, the first temple 250, and/or the second temple 260.

According to an embodiment, the bridge 201 may connect the first rim 210 and the second rim 220 with each other. For example, the bridge 201 may be formed of a non-conductive material (e.g., polymer) and/or a conductive material (e.g., metal).

According to an embodiment, the first rim 210 and the second rim 220 may form a part of a frame (e.g., glasses frame) of the wearable electronic device 200. For example, the first rim 210 and the second rim 220 may be formed of a non-conductive material (e.g., non-conductive injection moldings) and/or a conductive material (e.g., metal).

According to various embodiments, the first rim 210 may be disposed in the first direction (e.g., x-axis direction) of the bridge 201. The first rim 210 may be disposed around the user's left eye. The second rim 220 may be disposed in the second direction (e.g., −x-axis direction) of the bridge 201, which is the direction opposite to the first direction (e.g., x-axis direction). The second rim 220 may be disposed around user's right eye.

According to various embodiments, the first rim 210 may surround and support at least a part of the first glass 215 (e.g., first display) disposed on an inner periphery thereof. The first glass 215 may be located in front of the user's left eye. The second rim 220 may surround and support at least a part of the second glass 225 (e.g., second display) disposed on an inner periphery thereof. The second glass 225 may be located in front of the user's right eye.

According to an embodiment, the first end piece 230 may be combined with a part of the first rim 210 (e.g., x-axis direction). The second end piece 240 may be combined with a part of the second rim 220 (e.g., −x-axis direction). The first end piece 230 may connect the first rim 210 and the first temple 250 with each other. The second end piece 240 may connect the second rim 220 and the second temple 260.

According to an embodiment, the first temple 250 may be operatively connected to the first end piece 230 using the first hinge part 255 (e.g., first hinge part 255 of FIG. 2). The first hinge part 255 may be rotatably configured so that the first temple 250 is folded or unfolded with respect to the first rim 210. The first temple 250 may extend to be located, for example, along the left side of the user's head. In an embodiment, at least a part of the exterior of the first temple 250 may be formed as a first non-conductive case 301. In an embodiment, at least a part of the exterior of the first temple 250 may be formed of a conductive material (e.g., metal).

According to an embodiment, the second temple 260 may be operatively connected to the second end piece 240 using the second hinge part 265 (e.g., second hinge part 265 of FIG. 2). The second hinge part 265 may be rotatably configured so that the second temple 260 is folded or unfolded with respect to the second rim 220. The second temple 260 may extend to be located, for example, along the right side of the user's head. In an embodiment, at least a part of the exterior of the second temple 260 may be formed as a second non-conductive case 302. In an embodiment, at least a part of the exterior of the second temple 260 may be formed of a conductive material (e.g., metal).

According to various embodiments, the first non-conductive case 301 or the second non-conductive case 302 may include a dielectric material (e.g., insulator) including, for example, at least one of polycarbonate, polyimide, plastic, or polymer.

With reference to FIGS. 3 and 4, the first temple 250 may include the first printed circuit board 251 and a first electronic component 305. For example, the first printed circuit board 251 and the first electronic component 305 may be disposed inside the first non-conductive case 301. The first electronic component 305 may include, for example, an electrically conductive component, such as the sound output module (e.g., sound output module 155 of FIG. 1 or first sound output module 253 of FIG. 2), the battery (e.g., battery 189 of FIG. 1 or first battery 257 of FIG. 2), or a motor.

According to various embodiments, the first printed circuit board 251 may include a wireless communication circuit 310, a ground area 320, a non-conductive area 330, a feeder point 340, and/or a feeder wire 350.

According to an embodiment, the wireless communication circuit 310 (e.g., wireless communication module 192 of FIG. 1) may transmit and/or receive a wireless signal through the feeder point 340. For example, the wireless communication circuit 310 may include a radio frequency IC (RFIC). The wireless communication circuit 310 may be electrically connected to the feeder point 340 using a signal path 312 and the feeder wire 350.

According to an embodiment, the ground area 320 may be formed on at least a part of the first printed circuit board 251. The ground area 320 may be partly formed on the first printed circuit board 251.

According to an embodiment, the non-conductive area 330 may be formed on a part of the first printed circuit board 251. The non-conductive area 330 may be partly formed on the ground area 320. The non-conductive area 330 may be formed to extend in a direction (e.g., horizontal direction) substantially corresponding to the disposition direction (e.g., y-axis direction) of the first temple 250. In an embodiment, the non-conductive area 330 may be substantially disposed side by side with the wireless communication circuit 310 or the first electronic component 305. In an embodiment, the non-conductive area 330 may be formed on a part of a middle part (e.g., between z-axis and −z-axis) of the first printed circuit board 251, for example, in a (-) shape. The non-conductive area 330 may include a fill cut area. The non-conductive area 330 may include a slit or a slot. The non-conductive area 330 may include an area on which a polymer material is applied. For example, the non-conductive area 330 may include an area in which a conductive layer including a ground is omitted from the first printed circuit board 251

According to an embodiment, the feeder point 340 may be electrically connected to the wireless communication circuit 310 using the signal path 312 and the feeder wire 350. The feeder point 340 may transmit and/or receive the wireless signal under the control of the wireless communication circuit 310. The feeder point 340 may be formed adjacent to an end (e.g., second end in a z-axis direction) of the feeder wire 350 disposed across the non-conductive area 330 in one direction (e.g., z-axis direction or −z-axis direction). In an embodiment, the feeder point 340, the feeder wire 350, and the signal path 312 may be electrically connected to one another, and may form a feeder part.

According to an embodiment, the feeder wire 350 may have a first end (e.g., −y-axis direction) electrically connected to the signal path 312 and a second end (e.g., y-axis direction) electrically connected to the feeder point 340, and may operate as the feeder part. In an embodiment, the feeder wire 350 may include a coaxial cable. The feeder wire 350 may be disposed across at least a part of the non-conductive area 330, for example, in a vertical direction (e.g., z-axis direction). In an embodiment, the feeder wire 350 may be disposed substantially in a vertical structure with respect to the non-conductive area 330. The feeder wire 350 may transfer the wireless signal, being transferred from the wireless communication circuit 310 through the signal path 312, to the feeder point 340. The wireless signal transferred to the feeder point 340 may be transferred to at least a part of the ground area 320. The feeder point 340 may be electrically connected to the part of the ground area 320. The wireless signal, transferred through the wireless communication circuit 310, the signal path 312, and the feeder wire 350, may be transferred to the feeder point 340 and at least a part of the ground area 320. In an embodiment, the at least a part of the ground area 320 may operate as a first antenna radiator (e.g., first radiator 610 of FIG. 6).

According to various embodiments, a matching circuit 315 may be disposed between the wireless communication circuit 310 and the feeder wire 350. The matching circuit 315 may be disposed in the signal path 312 between the wireless communication circuit 310 and the feeder wire 350. The matching circuit 315 may adjust impedance matching of an antenna (e.g., first radiator 610 and/or second radiator 620 of FIG. 6). The matching circuit 315 may include, for example, at least one switch and/or at least one passive element. The at least one passive element may have different element values. The at least one passive element (e.g., lumped element) may include capacitors having various capacitance values and/or inductors having various inductance values.

According to various embodiments, the first printed circuit board 251 and the first electronic component 305 may be disposed to be spaced apart from each other. The at least a part of the ground area 320 formed on the first printed circuit board 251 and the first electronic component 305 may be electrically connected to each other using a first conductive connection member 325. In an embodiment, the first electronic component 305 may include a battery. The conductive area (e.g., ground area, conductive protection cover, and/or conductive battery pack) of the first electronic component 305 may be electrically connected to the at least a part of the ground area 320 using the first conductive connection member 325. In various embodiments, if the first electronic component 305 is the battery, a signal line and a power line disposed between the battery and the first printed circuit board 251 may be electrically connected, for example, to the at least a part of the ground area 320 through the first conductive connection member 325 and a first connector 322, and thus may degrade an influence exerted on the radiation performance of the antenna.

According to an embodiment, the first conductive connection member 325 may include a flexible printed circuit board (FPCB) or an FPCB type RF cable (FRC). The first electronic component that is electrically connected to the at least a part of the ground area 320 may operate as a second radiator (e.g., second radiator 620 of FIG. 6). In an embodiment, the at least a part of the ground area 320 may be electrically connected to a part of the first conductive connection member 325 by using the first connector 322. The first connector 322 may include, for example, a pad for contact, a coupling member, a C-clip, or a conductive foam spring.

According to various embodiments, the wireless communication circuit 310, the signal path 312, the matching circuit 315, the feeder wire 350, the ground area 320, the non-conductive area 330, the feeder point 340, the first connector 322, the first conductive connection member 325, and the first electronic component 305 may be disposed inside the first non-conductive case 301 that forms at least a part of the exterior of the first temple 250.

With reference to FIG. 5, the example wearable electronic device 200 according to various embodiments of the disclosure may form the non-conductive area 330 on the at least a part of the ground area 320, and may include an inverted F antenna formed using the wireless communication circuit 310, the part of the ground area 320, and the first electronic component 305.

Figure 6:
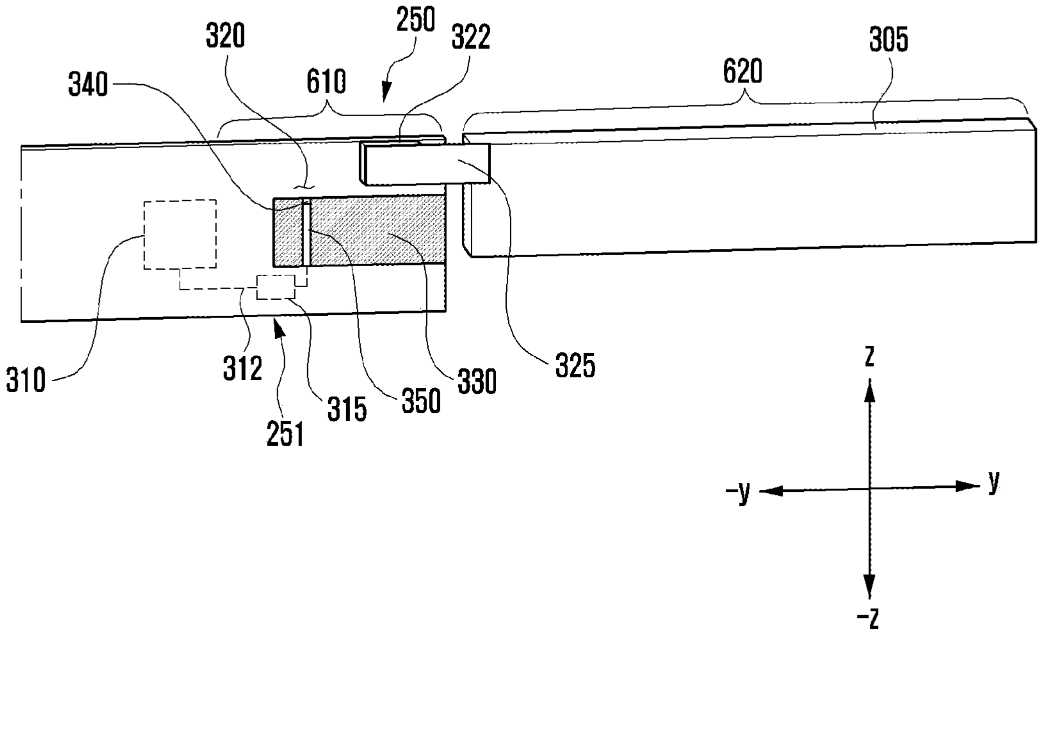
FIG. 6 is a view illustrating a first radiator and a second radiator of an example wearable electronic device according to various embodiments.
Figure 7:
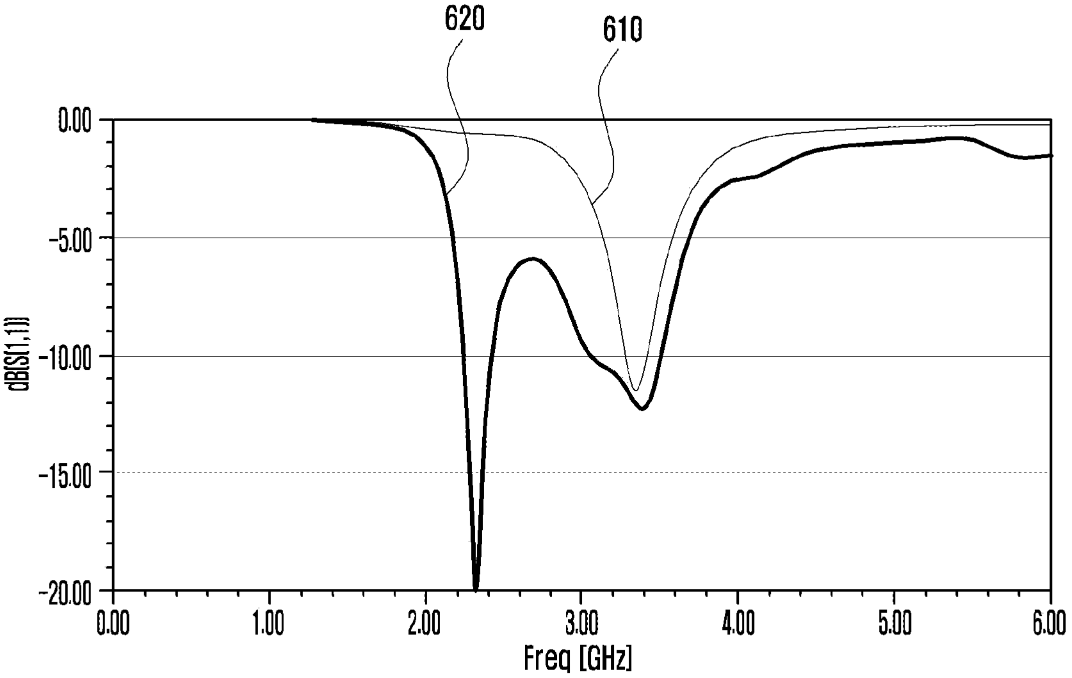
FIG. 7 is a diagram illustrating characteristics of a first radiator and a second radiator according to various embodiments.
Figure 8:
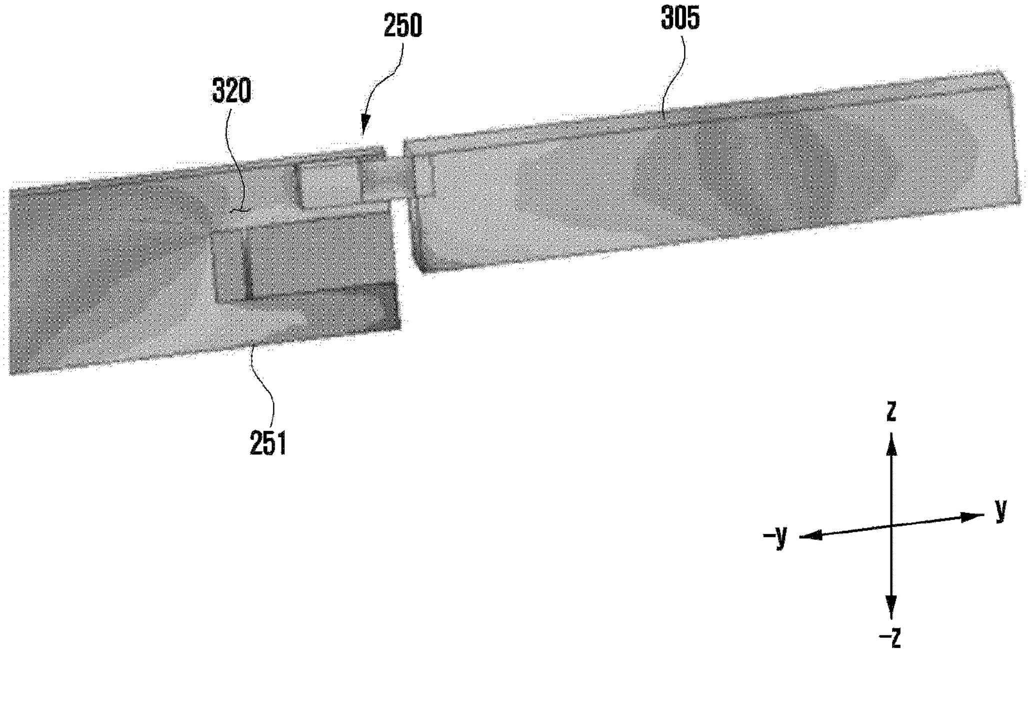
FIG. 8 is a diagram illustrating electric fields of a first radiator and a second radiator according to various embodiments.
Figure 9:
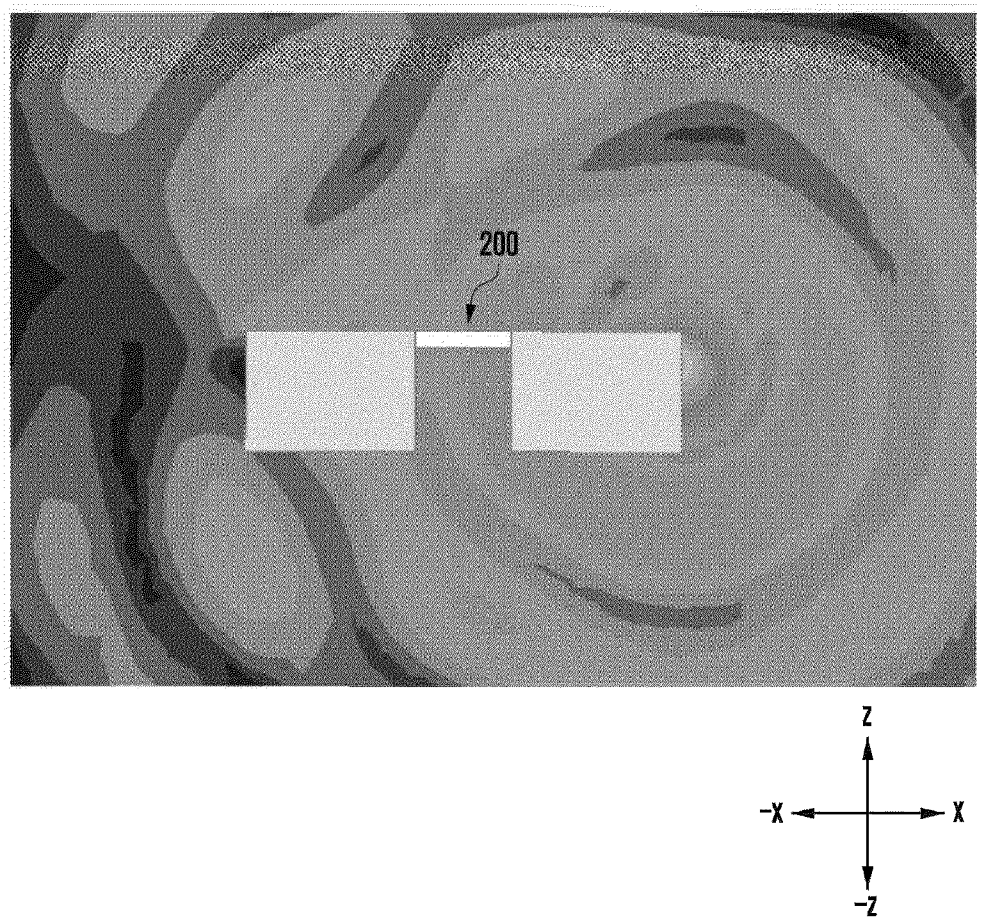
FIG. 9 is a diagram illustrating electric field distribution of a first radiator and a second radiator according to various embodiments.

FIG. 6 is a view explaining the configuration of a first radiator and a second radiator of an example wearable electronic device according to various embodiments of the disclosure. FIG. 7 is a diagram illustrating characteristics of a first radiator and a second radiator according to various embodiments of the disclosure. FIG. 8 is a diagram illustrating electric fields of a first radiator and a second radiator according to various embodiments of the disclosure. FIG. 9 is a diagram illustrating electric field distribution of a first radiator and a second radiator according to various embodiments of the disclosure.

With reference to FIG. 6, the wearable electronic device 200 according to an embodiment of the disclosure may include the first radiator 610 and the second radiator 620. In various embodiments, the first radiator 610 and the second radiator 620 may operate as antenna radiators of the wearable electronic device 200.

According to an embodiment, the first radiator 610 may be electrically connected to the wireless communication circuit 310, the signal path 312, the matching circuit 315, the feeder wire 350, and/or the feeder point 340. The first radiator 610 may be the part of the ground area 320. The first radiator 610 may operate as the antenna of the wearable electronic device 200.

According to an embodiment, the second radiator 620 may include at least a part of a conductive area (e.g., ground area, conductive protection cover, and/or conductive battery pack) of the first electronic component 305 (e.g., battery). In various embodiments, the first radiator 610 and the second radiator 620 may operate as the antenna.

With reference to FIG. 7, in a case in which the wearable electronic device 200 uses the first radiator 610, it may be identified that the first radiator 610 forms a resonance frequency in the frequency band of about 3.2 GHz to 3.5 GHz using the part of the ground area 320 (e.g., first antenna radiator) based on a reflection loss of about −6 dB or less.

With reference to FIG. 8, it may be identified that the wearable electronic device 200 may be utilized as the antenna in a manner that an electric field is formed on the part (e.g., first antenna radiator) of the ground area 320 of the first printed circuit board 251 included in the first temple 250 and the first electronic component 305 (e.g., second antenna radiator).

With reference to FIG. 9, it may be identified that omni-directional electric field distribution is formed around the first radiator 610 and the second radiator 620 disposed in the first temple 250 in the wearable electronic device 200.

Figure 10:
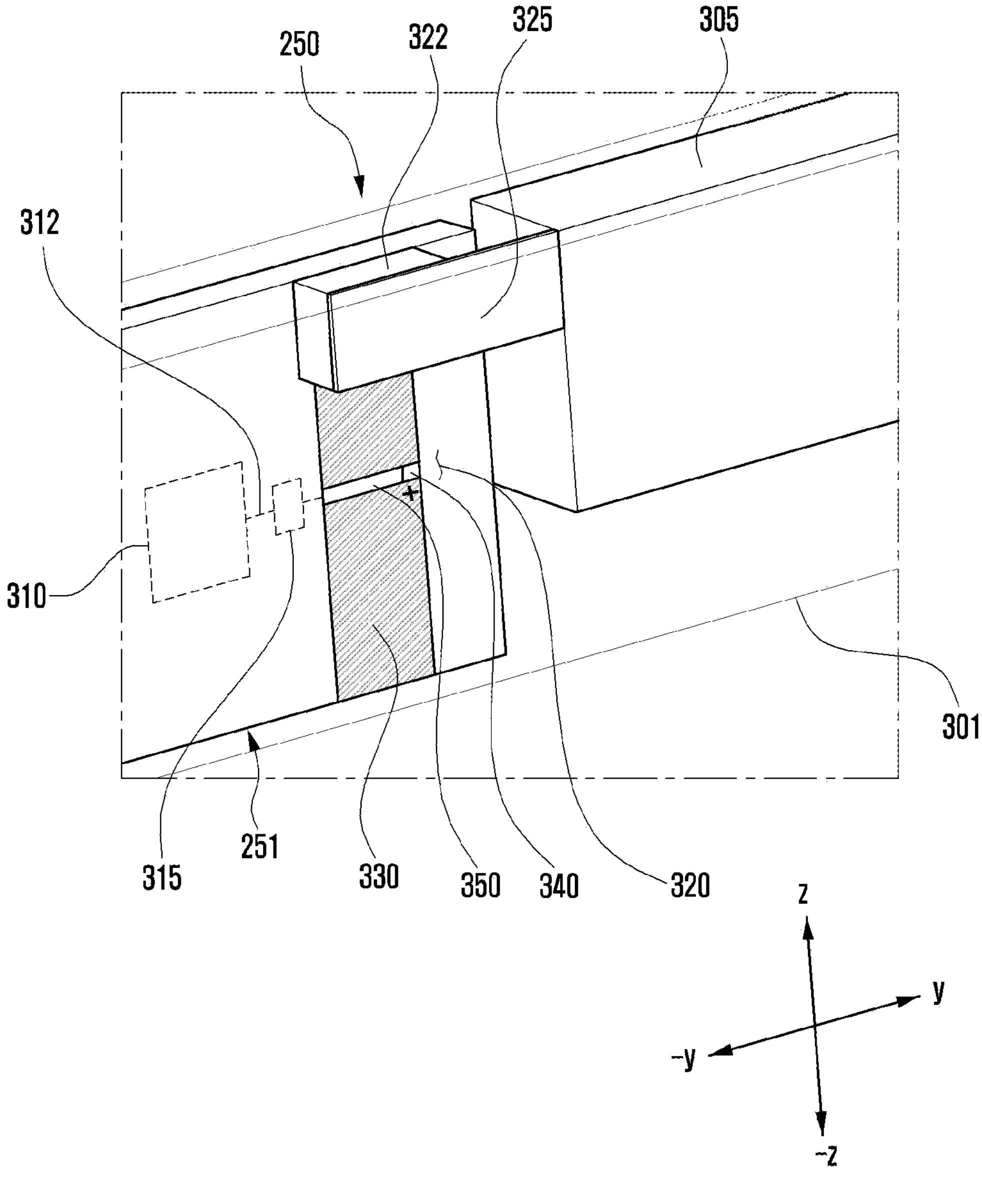
FIG. 10 is a view illustrating another embodiment of part A of the example wearable electronic device disclosed in FIG. 3 according to various embodiments, and is a view illustrating a first embodiment of a disposition direction of a non-conductive area and a location of a feeder point.
Figure 11:
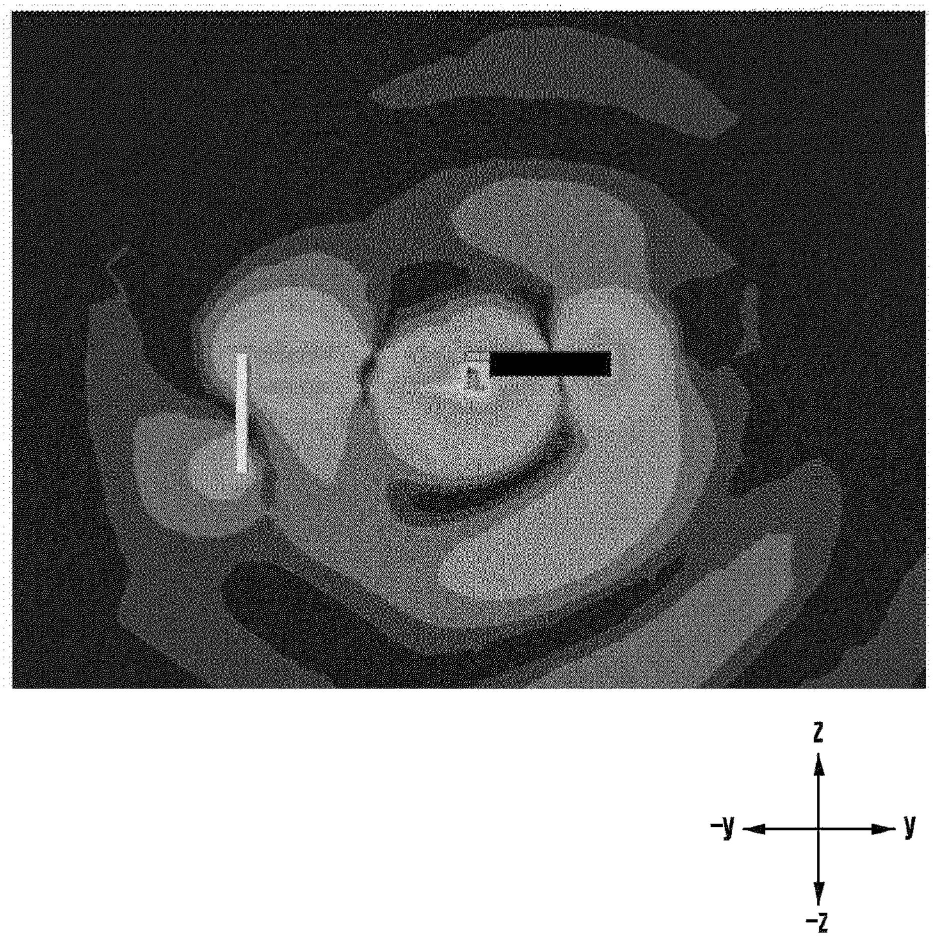
FIG. 11 is a diagram illustrating an electric field according to the disposition direction of the non-conductive area and the location of the feeder point disclosed in FIG. 10.

FIG. 10 is a view illustrating another embodiment of part A of the example wearable electronic device disclosed in FIG. 3 according to various embodiments of the disclosure, and is a view illustrating a first embodiment of a disposition direction of a non-conductive area and a location of a feeder point. FIG. 11 is a diagram illustrating an electric field according to the disposition direction of the non-conductive area and the location of the feeder point disclosed in FIG. 10.

According to an embodiment of the disclosure, the wearable electronic device 200 may adjust the radiation pattern of the first radiator 610 and the second radiator 620 by changing the disposition direction of the non-conductive area 330 and the location of the feeder point 340. For example, the wearable electronic device 200 may change the radiation pattern of the antenna (e.g., first radiator 610 and second radiator 620) by changing the direction of the non-conductive area 330 and the direction of the feeder wire 350. In an embodiment, the non-conductive area 330 may include a fill cut area, a slit or a slot.

With reference to FIG. 10, the non-conductive area 330 according to the first embodiment of the wearable electronic device 200 may be formed on a part of the first printed circuit board 251. The non-conductive area 330 may be partly formed on the ground area 320. In an embodiment, the non-conductive area 330 may be formed substantially in the vertical direction (e.g., −z-axis direction) to the disposition direction (e.g., y-axis direction) of the first temple 250. For example, the non-conductive area 330 may extend in the vertical direction (e.g., −z-axis direction) from a lower part of the first connector 322, and may be formed up to one side surface of the first printed circuit board 251 (e.g., −z-axis direction)

According to an embodiment, the feeder point 340 may be electrically connected to the wireless communication circuit 310 using the signal path 312 and the feeder wire 350. The feeder wire 350 may have a first end (e.g., −y-axis direction) electrically connected to the signal path 312 and a second end (e.g., y-axis direction) electrically connected to the feeder point 340. The feeder point 340 may be electrically connected to the part of the ground area 320. The feeder wire 350 may be disposed across at least a part of the non-conductive area 330, for example, in the horizontal direction (e.g., y-axis direction). In an embodiment, the feeder wire 350 may be disposed substantially in the horizontal structure with respect to the non-conductive area 330. The feeder wire 350 may transfer the wireless signal transferred through the wireless communication circuit 310 and the signal path 312 to the feeder point 340 and the at least a part of the ground area 320. The wireless signal transferred from the wireless communication circuit 310 through the signal path 312, the feeder wire 350, and the feeder point 340 may be transferred to the at least a part of the ground area 320. In an embodiment, the matching circuit 315 may be disposed on the signal path 312 between the wireless communication circuit 310 and the feeder wire 350.

According to various embodiments, the part of the ground area 320 may be electrically connected to the first connector 322. The wireless signal, being transferred through the part of the ground area 320 and the first connector 322, may be transferred to the first electronic component 305 using the first conductive connection member 325.

With reference to FIG. 11, in case that the non-conductive area 330 is formed from a downward direction (e.g., −z-axis direction) of the first connector 322 to one side surface (e.g., −z-axis direction) of the first printed circuit board 251 in the direction (e.g., −z-axis direction) that is vertical to the disposition direction (e.g., y-axis direction) of the first temple 250, an electric field having a strong strength may be formed in the downward direction (e.g., −z-axis direction) of the first temple 250 in the wearable electronic device 200. For example, it can be identified that the amount of radiation has been increased in the downward direction (e.g., −z-axis direction) of the first connector 322 in the wearable electronic device 200.

Figure 12:
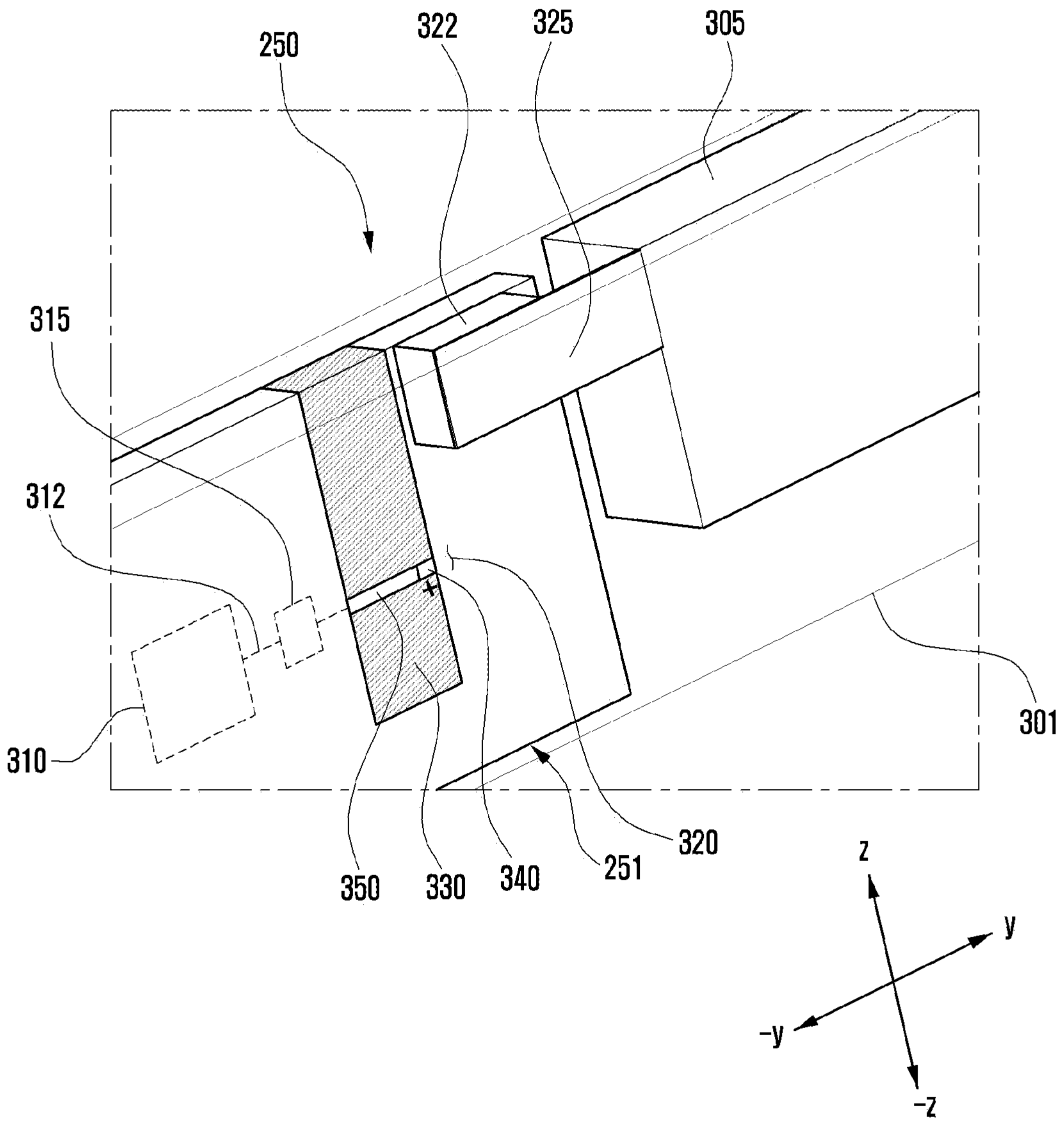
FIG. 12 is a view illustrating another embodiment of part A of the example wearable electronic device disclosed in FIG. 3 according to various embodiments, and is a view illustrating a second embodiment of a disposition direction of a non-conductive area and a location of a feeder point.
Figure 13:
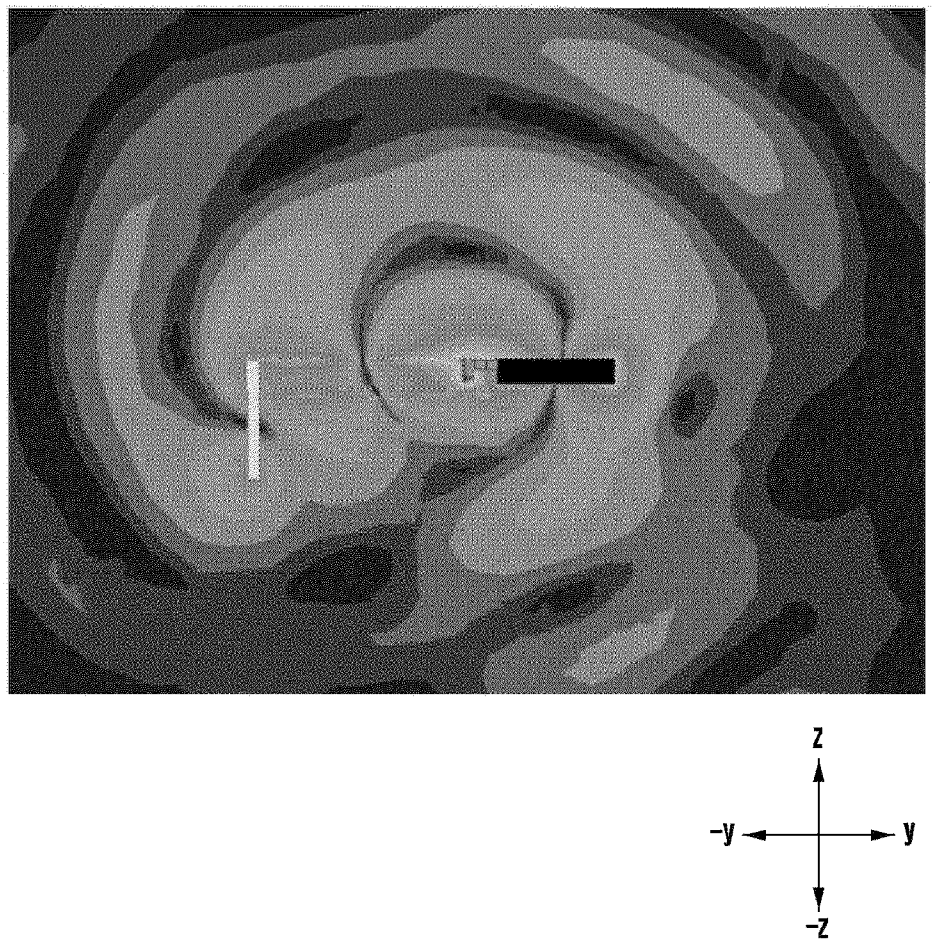
FIG. 13 is a diagram illustrating an electric field according to the disposition direction of the non-conductive area and the location of the feeder point disclosed in FIG. 12.

FIG. 12 is a view illustrating another embodiment of part A of the example wearable electronic device disclosed in FIG. 3 according to various embodiments of the disclosure, and is a view illustrating a second embodiment of a disposition direction of a non-conductive area and a location of a feeder point. FIG. 13 is a diagram illustrating an electric field according to the disposition direction of the non-conductive area and the location of the feeder point disclosed in FIG. 12.

According to various embodiments of the disclosure, the wearable electronic device 200 may adjust the radiation patterns of the first radiator 610 and the second radiator 620 by changing the disposition direction of the non-conductive area 330 and the location of the feeder point 340. In an embodiment, the wearable electronic device 200 may change the radiation patterns of the antenna (e.g., first radiator 610 and second radiator 620) by changing the location and the direction of the non-conductive area 330 and the direction of the feeder wire 350.

With reference to FIG. 12, the non-conductive area 330 according to the second embodiment of the wearable electronic device 200 may be formed substantially in the vertical direction (e.g., z-axis direction) to the disposition direction (e.g., y-axis direction) of the first temple 250. The non-conductive area 330 may be formed to be spaced apart from one side surface (e.g., −y-axis direction) of the first connector 322 and to extend to one side surface (e.g., z-axis direction) of the first printed circuit board 251 in the direction (e.g., z-axis direction) that is vertical to the disposition direction (e.g., y-axis direction) of the first template 250. The non-conductive area 330 may extend in the vertical direction (e.g., z-axis direction) from a part adjacent to the one side surface (e.g., −y-axis direction) of the first connector 322, and may be formed up to one side surface of an upper end (e.g., z-axis direction) of the first printed circuit board 251.

According to an embodiment, the feeder point 340 may be electrically connected to the wireless communication circuit 310 using the signal path 312 and the feeder wire 350. The feeder wire 350 may have a first end (e.g., −y-axis direction) electrically connected to the signal path 312 and a second end (e.g., y-axis direction) electrically connected to the feeder point 340. The feeder wire 350 may be disposed across at least a part of the non-conductive area 330, for example, in the horizontal direction (e.g., y-axis direction). In an embodiment, the feeder wire 350 may be disposed substantially in the horizontal structure with respect to the non-conductive area 330. The feeder wire 350 may transfer the wireless signal transferred through the wireless communication circuit 310 and the signal path 312 to the feeder point 340 and the at least a part of the ground area 320. The wireless signal transferred from the wireless communication circuit 310 through the signal path 312 and the feeder wire 350 may be transferred to the feeder point 340 and the at least a part of the ground area 320. In an embodiment, the matching circuit 315 may be disposed on the signal path 312 between the wireless communication circuit 310 and the feeder wire 350.

According to various embodiments, the part of the ground area 320 may be electrically connected to the first connector 322. The wireless signal, being transferred through the part of the ground area 320 and the first connector 322, may be transferred to the first electronic component 305 using the first conductive connection member 325.

With reference to FIG. 13, in case that the non-conductive area 330 is spaced apart from one side surface (e.g., −y-axis direction) of the first connector 322 and is formed on one side surface (e.g., z-axis direction) of the first printed circuit board 251 in the direction (e.g., z-axis direction) that is vertical to the disposition direction (e.g., y-axis direction) of the first temple 250, an electric field having a strong strength may be formed in the upward direction (e.g., z-axis direction) of the first temple 250 in the wearable electronic device 200. For example, it can be identified that the amount of radiation has been increased around the first connector 322 and in the upward direction (e.g., z-axis direction) of the first connector 322 in the wearable electronic device 200.

Figure 14:
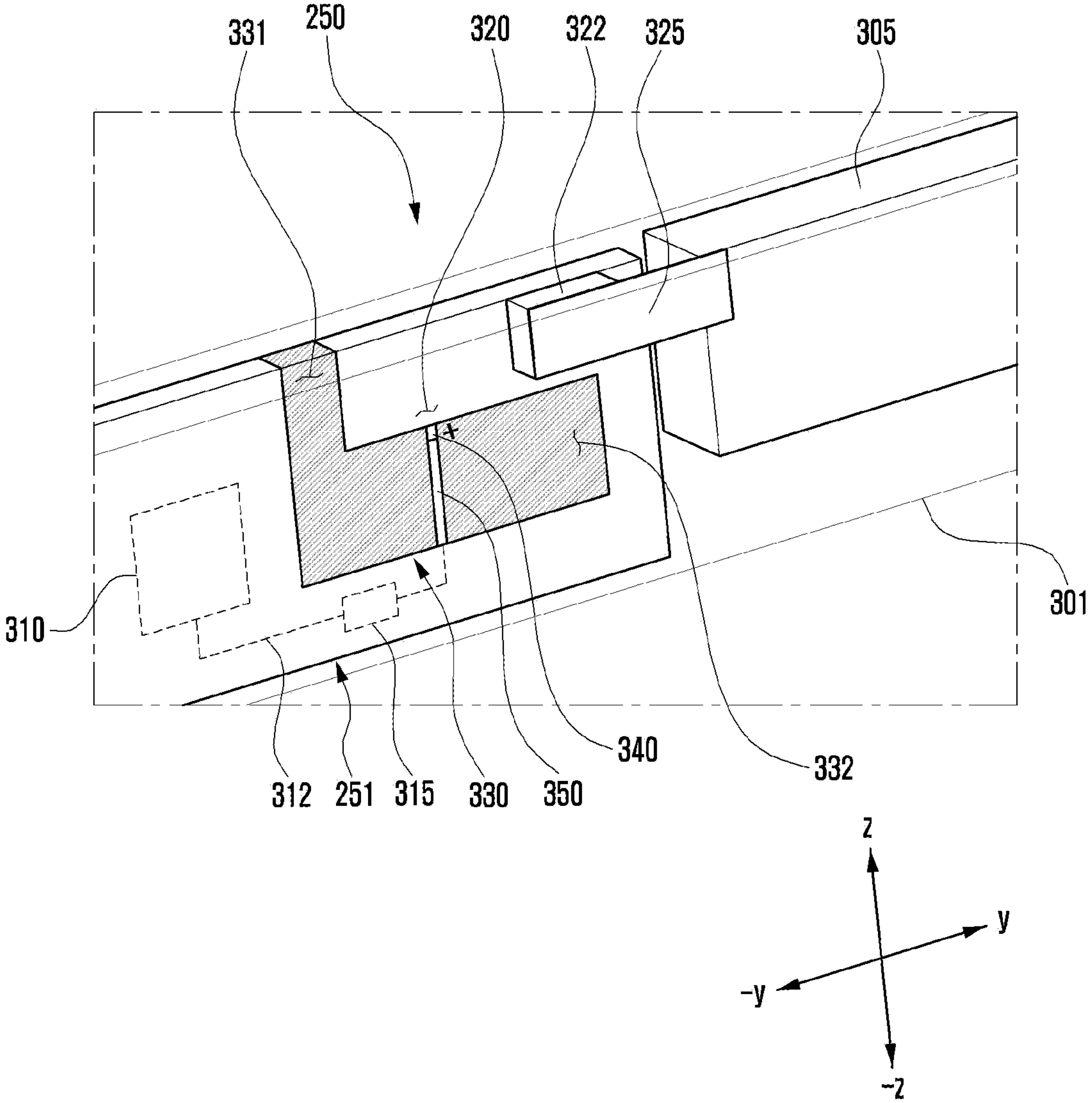
FIG. 14 is a view illustrating another embodiment of part A of the example wearable electronic device disclosed in FIG. 3 according to various embodiments, and is a view illustrating a third embodiment of a disposition direction of a non-conductive area and a location of a feeder point.
Figure 15:
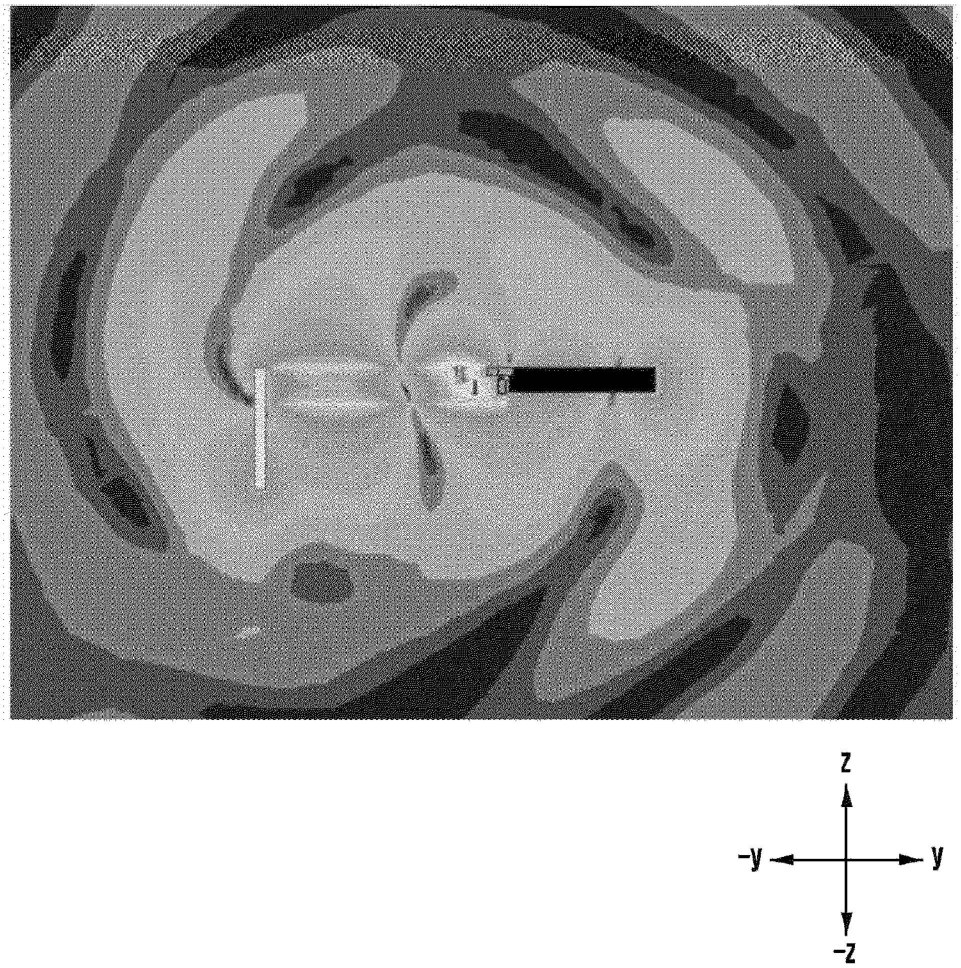
FIG. 15 is a diagram illustrating an electric field according to the disposition direction of the non-conductive area and the location of the feeder point disclosed in FIG. 14.

FIG. 14 is a view illustrating another embodiment of part A of the example wearable electronic device disclosed in FIG. 3 according to various embodiments of the disclosure, and is a view illustrating a third embodiment of a disposition direction of a non-conductive area and a location of a feeder point. FIG. 15 is a diagram illustrating an electric field according to the disposition direction of the non-conductive area and the location of the feeder point disclosed in FIG. 14.

According to various embodiments of the disclosure, the wearable electronic device 200 may adjust the radiation pattern of the first radiator 610 and the second radiator 620 by changing the disposition direction of the non-conductive area 330 and the location of the feeder point 340. In an embodiment, the wearable electronic device 200 may change the radiation pattern of the antenna (e.g., first radiator 610 and second radiator 620) by changing the location and the direction of the non-conductive area 330 and the direction of the feeder wire 350, and.

With reference to FIG. 14, the non-conductive area 330 according to the third embodiment of the wearable electronic device 200 may be formed to have a first part 331 substantially in the vertical direction (e.g., z-axis direction) to the disposition direction (e.g., y-axis direction) of the first temple 250, and a second part 332 substantially in the horizontal direction (e.g., y-axis direction) to the disposition direction (e.g., y-axis direction) of the first temple 250. For example, the non-conductive area 330 according to the third embodiment may be formed in an "L" shape.

According to an embodiment, the first part 331 of the non-conductive area 330 may be spaced apart from one side surface (e.g., −y-axis direction) of the first connector 322, and may be disposed on one side surface (e.g., z-axis direction) of the first printed circuit board 251 in the direction (e.g., z-axis direction) that is vertical to the disposition direction (e.g., y-axis direction) of the first temple 250. The second part 322 of the non-conductive area 330 may be formed from the downward direction (e.g., −z-axis direction) of the first connector 322 to the direction (e.g., −y-axis direction) that is parallel to the disposition direction (e.g., y-axis direction) of the first temple 250. The first part 331 of the non-conductive area 330 may be disposed to extend up to the upper end surface (e.g., z-axis direction) of the first printed circuit board 251.

According to an embodiment, the feeder point 340 may be electrically connected to the wireless communication circuit 310 using the signal path 312 and the feeder wire 350. The feeder wire 350 may have a first end (e.g., −z-axis direction) electrically connected to the signal path 312 and a second end (e.g., z-axis direction) electrically connected to the feeder point 340. The feeder wire 350 may be disposed across at least a part (e.g., second part 332) of the non-conductive area 330, for example, in the vertical direction (e.g., z-axis direction or −z-axis direction). In an embodiment, the feeder wire 350 may be disposed substantially in the vertical structure with respect to the second part 332 of the non-conductive area 330. The feeder wire 350 may transfer the wireless signal transferred through the wireless communication circuit 310 and the signal path 312 to the feeder point 340 and the at least a part of the ground area 320. The wireless signal transferred from the wireless communication circuit 310 through the signal path 312 and the feeder wire 350 may be transferred to the feeder point 340 and the at least a part of the ground area 320. In an embodiment, the matching circuit 315 may be disposed on the signal path 312 between the wireless communication circuit 310 and the feeder wire 350.

According to various embodiments, the part of the ground area 320 may be electrically connected to the first connector 322. The wireless signal, being transferred through the part of the ground area 320 and the first connector 322, may be transferred to the first electronic component 305 using the first conductive connection member 325.

With reference to FIG. 15, in case that the first part 331 of the non-conductive area 330 is spaced apart from one side surface (e.g., −y-axis direction) of the first connector 322 and is disposed in the direction (e.g., z-axis direction) that is vertical to the disposition direction (e.g., y-axis direction) of the first temple 250, and the second part 332 is disposed from the downward direction (e.g., −z-axis direction) of the first connector 322 to the direction (e.g., y-axis direction) that is horizontal to the disposition direction (e.g., y-axis direction) of the first temple 250, an electric field having a strong strength may be formed in the upward direction (e.g., z-axis direction) and the downward direction (−z-axis direction) of the first temple 250 in the wearable electronic device 200. For example, it can be identified that the amount of radiation has been increased around the first connector 322 and in the upward direction (e.g., z-axis direction) and the downward direction (−z-axis direction) of the first connector 322 in the wearable electronic device 200.

Figure 16:
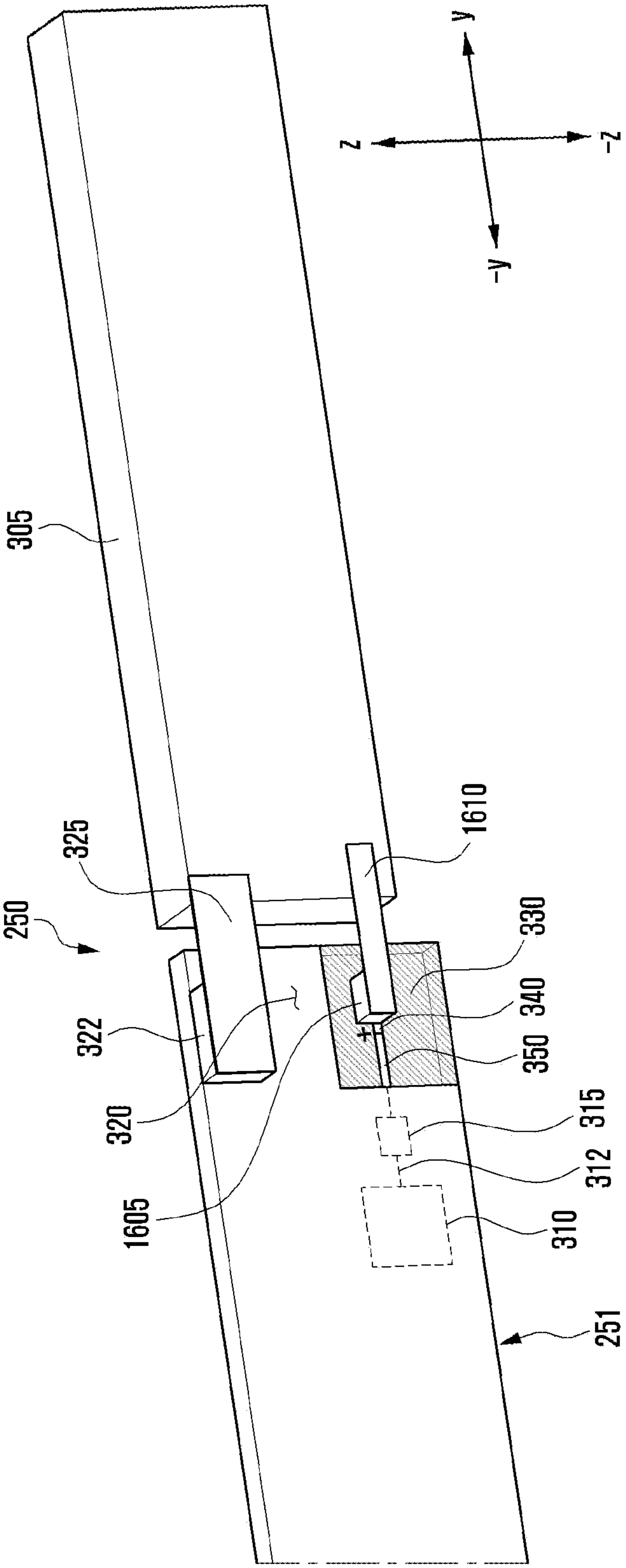
FIG. 16 is a view schematically illustrating an embodiment of a connection structure of a first printed circuit board and a first electronic component of an example wearable electronic device according to various embodiments.

FIG. 16 is a view schematically illustrating an embodiment of a connection structure of a first printed circuit board and a first electronic component of an example wearable electronic device according to various embodiments of the disclosure.

With reference to FIG. 16, the first temple 250 of the wearable electronic device 200 according to various embodiments of the disclosure may include the first printed circuit board 251 and the first electronic component 305.

According to an embodiment, the part of the first printed circuit board 251 may be electrically connected to the first electronic component 305 using the first connector 322 and the first conductive connection member 325.

According to an embodiment, the first printed circuit board 251 may include the wireless communication circuit 310, the signal path 312, the ground area 320, the non-conductive area 330, the feeder point 340, and/or the feeder wire 350. In an embodiment, the first printed circuit board 251 may be electrically connected to a second connector 1605 and/or a second conductive connection member 1610.

According to an embodiment, the wireless communication circuit 310 may be electrically connected to the feeder point 340 using the signal path 312 and the feeder wire 350. The ground area 320 may be formed on at least a part of the first printed circuit board 251. The part of the ground area 320 may be electrically connected to the first connector 322.

According to an embodiment, the non-conductive area 330 may be formed on at least a part of the first printed circuit board 251. The non-conductive area 330 may be formed in the downward direction (e.g., −z-axis direction) of the first connector 322.

According to an embodiment, the feeder point 340 may be electrically connected to the wireless communication circuit 310 using the signal path 312 and the feeder wire 350.

According to an embodiment, the first end (e.g., −y-axis direction) of the feeder wire 350 may be electrically connected to the signal path 312, and the second end (e.g., y-axis direction) thereof may be electrically connected to the second connector 1605. The feeder wire 350 may be disposed across at least a part of the non-conductive area 330, for example, in the horizontal direction (e.g., y-axis direction). The feeder wire 350 may transfer the wireless signal, being transferred through the wireless communication circuit 310 and the signal path 312, to the feeder point 340.

According to an embodiment, the second connector 1605 may transfer the wireless signal, being transferred through the feeder point 340, to the first electronic component 305 using the second conductive connection member 1610. The first printed circuit board 251 and the first electronic component 305 may be disposed to be spaced apart from each other. The first electronic component 305 is electrically connected to the feeder point 340 and the feeder wire 350 using the second conductive connection member 1610 and the second connector 1605, and thus can operate as the antenna radiator.

According to various embodiments, the second connector 1605 may include, for example, a pad for contact, a coupling member, a C-clip, or a conductive foam spring. The second conductive connection member 1610 may include a flexible printed circuit board (FPCB) or an FPCB type RF cable (FRC).

Figure 17:
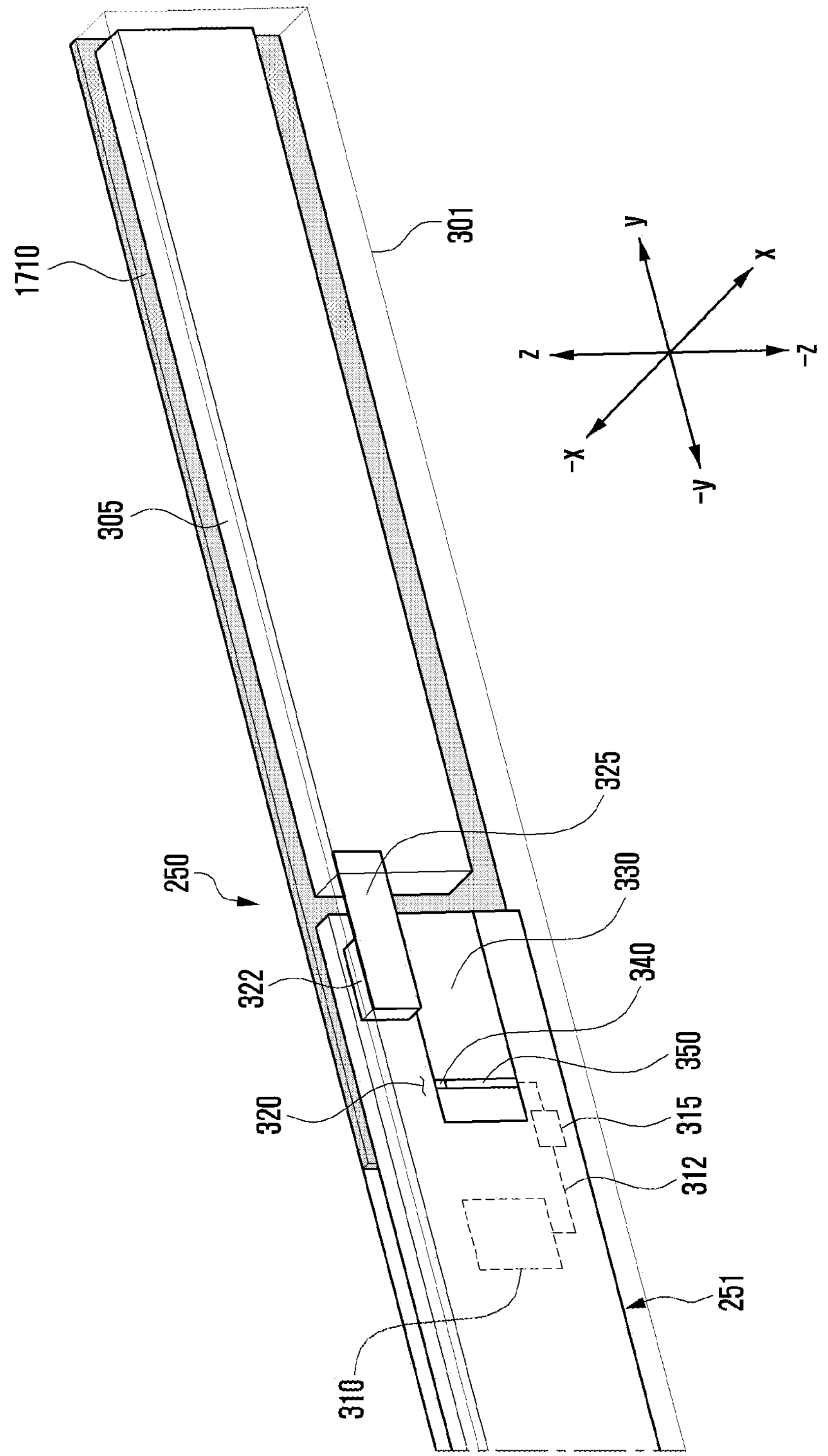
FIG. 17 is a view schematically illustrating an embodiment in which a shielding member is disposed in a first temple of an example wearable electronic device 200 according to various embodiments.
Figure 18:
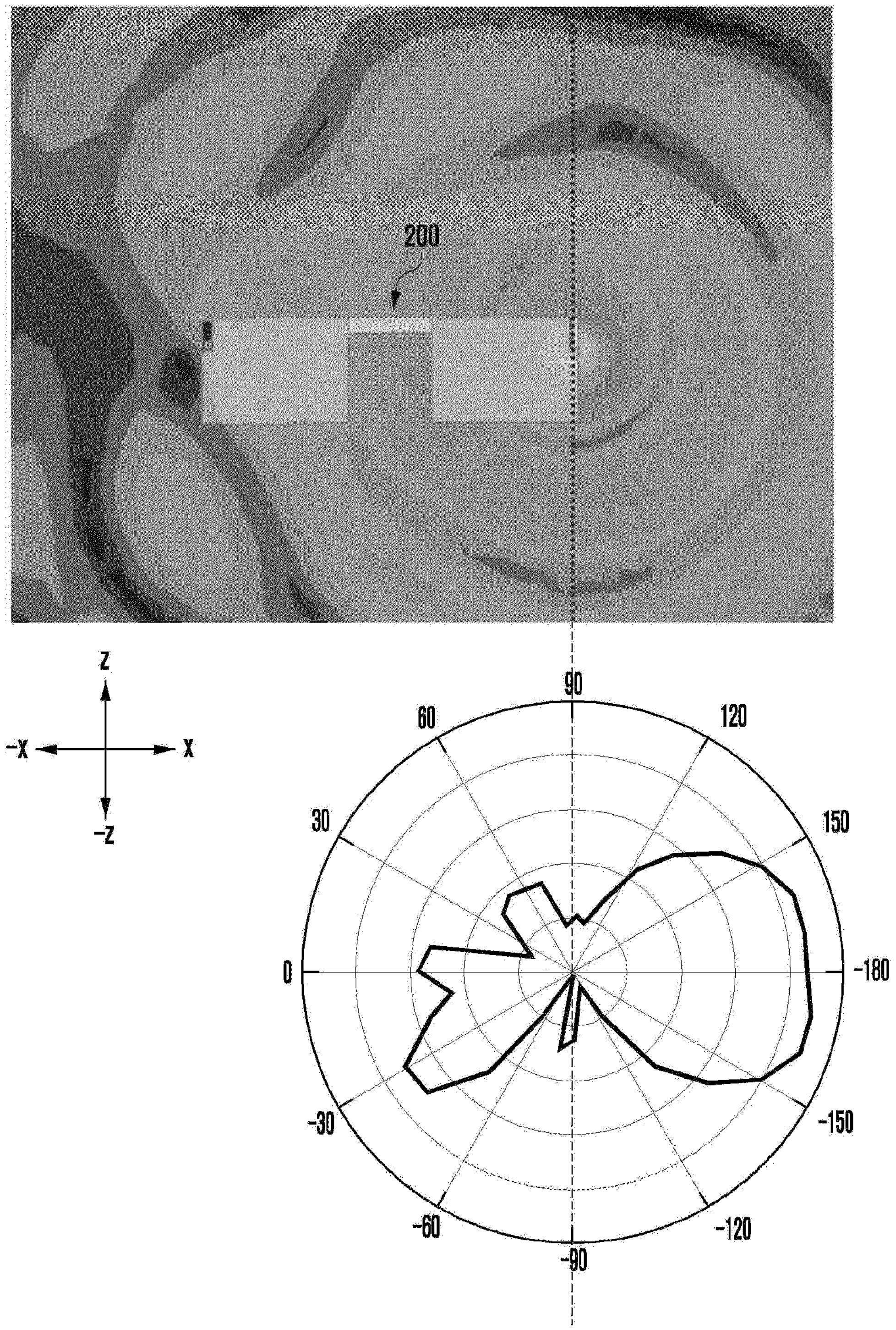
FIG. 18 is a diagram illustrating a radiation pattern in case in which the shielding member disclosed in FIG. 17 is disposed in the first temple.

FIG. 17 is a view schematically illustrating an embodiment in which a shielding member is disposed in a first temple of an example wearable electronic device 200 according to various embodiments of the disclosure. FIG. 18 is a diagram illustrating a radiation pattern in a case in which the shielding member disclosed in FIG. 17 is disposed in the first temple.

According to an embodiment, FIG. 17 may schematically illustrate an example in which a shielding member 1710 is disposed on the first temple 250 of the wearable electronic device 200 disclosed in FIG. 3.

With reference to FIG. 17, the wearable electronic device 200 according to various embodiments of the disclosure may include the shielding member 1710. The shielding member 1710 may be disposed on an inner side surface (e.g., x-axis direction) of the non-conductive case 301 located on at least a part of the rear surface (e.g., −x-axis direction) of the first printed circuit board 251 and on at least a part of the rear surface (e.g., −x-axis direction) of the first electronic component 305.

According to an embodiment, the shielding member 1710 may be disposed on one side (e.g., x-axis direction) of the rear surface of the non-conductive case 301, and may be spaced apart from the at least a part of the rear surface (e.g., −x-axis direction) of the first printed circuit board 251 and the at least a part of the rear surface (e.g., −x-axis direction) of the first electronic component 305.

According to an embodiment, in a case in which a user wears the wearable electronic device 200, and a part of the user's body (e.g., head or face) comes in contact with the first temple 250, it is possible to reduce the transfer of the electromagnetic waves, being radiated through the first radiator (e.g., first radiator 610 of FIG. 6) and the second radiator (e.g., second radiator 620 of FIG. 6), to the user's body.

With reference to FIG. 18, in a case in which the shielding member 1710 is disposed on the first temple 250, it can be identified that an electric field having a weak strength is formed in the direction of the user's body (e.g., −x-axis direction of FIG. 17), and an electric field having a strong strength is formed in an outward direction (e.g., x-axis direction of FIG. 17) of the first temple 250.

Figure 19:
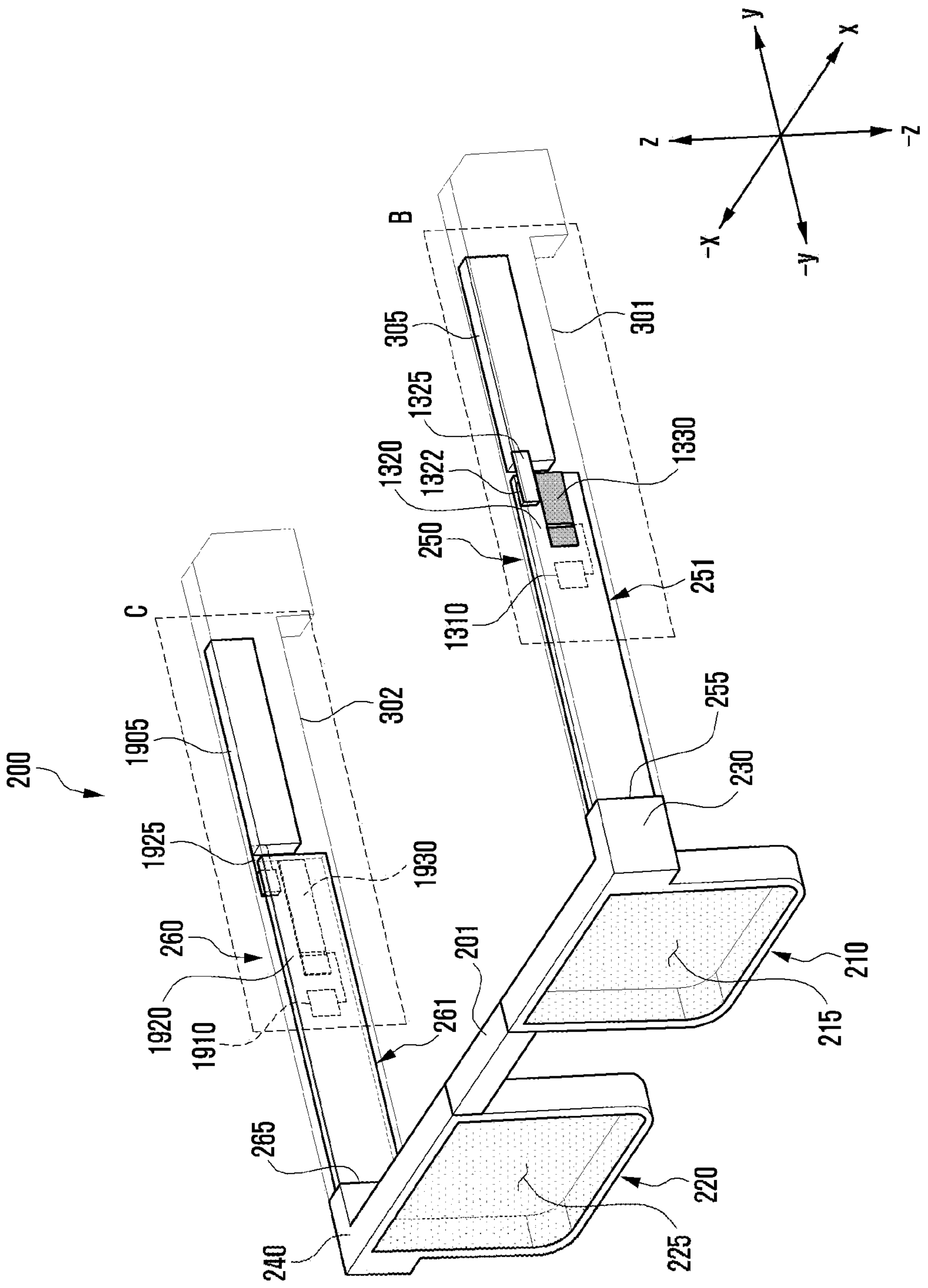
FIG. 19 is a perspective view schematically illustrating an example wearable electronic device according to various embodiments, which includes at least one antenna disposed in a first temple and at least one antenna disposed in a second temple.
Figure 20:
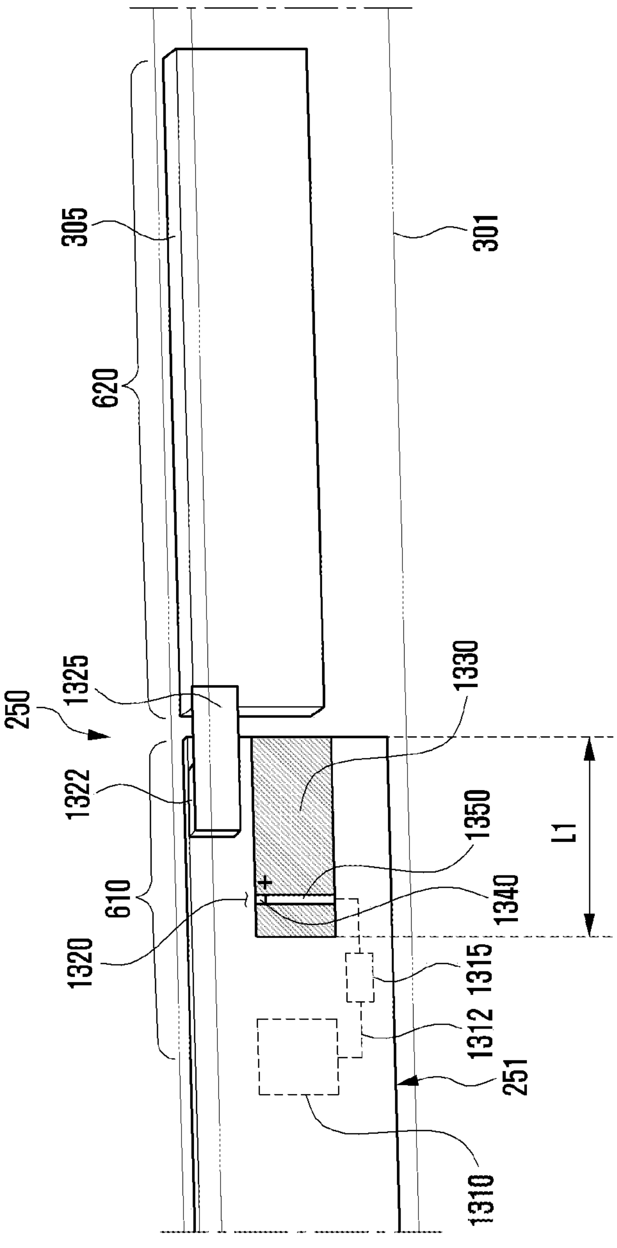
FIG. 20 is a schematic enlarged view of part B of the example wearable electronic device disclosed in FIG. 19 according to various embodiments.
Figure 21:
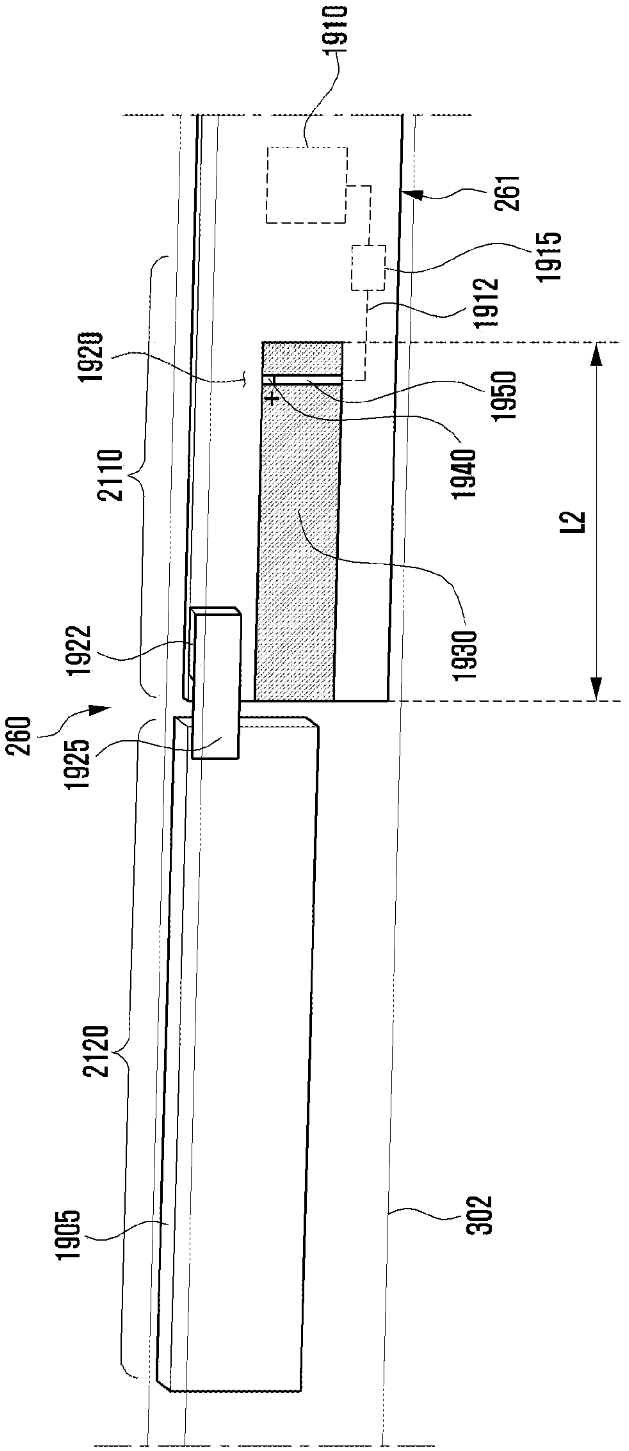
FIG. 21 is a schematic enlarged view of part C of the example wearable electronic device disclosed in FIG. 19 according to various embodiments.
Figure 22:
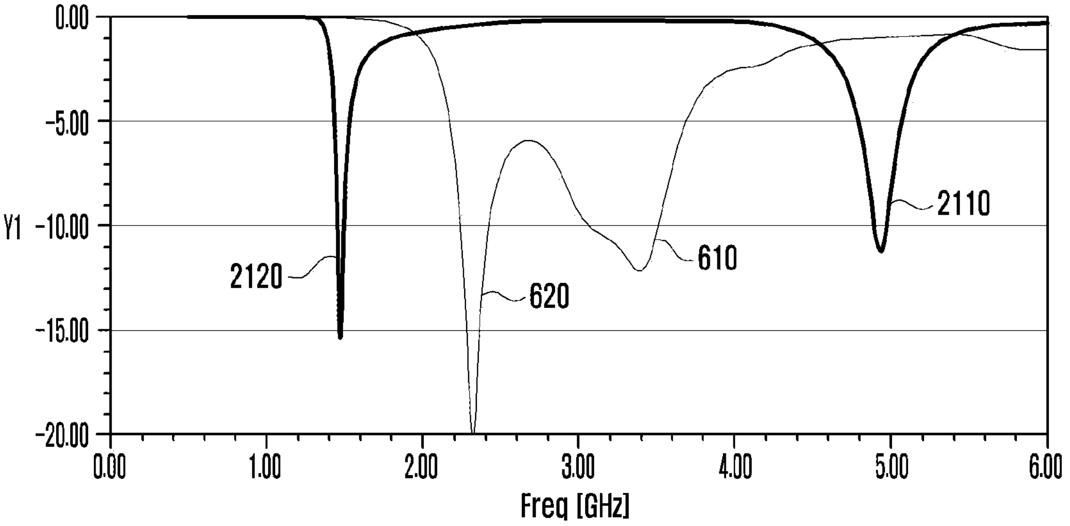
FIG. 22 is a diagram illustrating the characteristic of the at least one antenna included in the first temple and the characteristic of the at least one antenna included in the second temple of the example wearable electronic device disclosed in FIG. 19 according to various embodiments.

FIG. 19 is a perspective view schematically illustrating the configuration in which an example wearable electronic device according to various embodiments of the disclosure includes at least one antenna disposed in a first temple and at least one antenna disposed in a second temple. FIG. 20 is a schematic enlarged view of part B of the example wearable electronic device disclosed in FIG. 19 according to various embodiments of the disclosure. FIG. 21 is a schematic enlarged view of part C of the example wearable electronic device disclosed in FIG. 19 according to various embodiments of the disclosure. FIG. 22 is a diagram illustrating the characteristic of the at least one antenna included in the first temple and the characteristic of the at least one antenna included in the second temple of the example wearable electronic device disclosed in FIG. 19 according to various embodiments of the disclosure.

The wearable electronic device 200 of FIG. 19 may include at least one of the embodiments disclosed in FIGS. 2 to 18. The at least one of the embodiments disclosed in FIGS. 2 to 18 may be united or applied to the wearable electronic device 200 of FIG. 19. In explaining FIG. 19, the same reference numerals may be given to substantially the same constituent elements as those of the embodiment of the wearable electronic device 200 of FIGS. 2 to 18.

With reference to FIG. 19, the wearable electronic device 200 according to various embodiments of the disclosure may include the bridge 201, the first rim 210, the second rim 220, the first end piece 230, the second end piece 240, the first temple 250, and/or the second temple 260.

According to an embodiment, the bridge 201 may connect the first rim 210 and the second rim 220 with each other. The first rim 210 may be disposed in the first direction (e.g., x-axis direction) of the bridge 201. The second rim 220 may be disposed in the second direction (e.g., −x-axis direction) of the bridge 201, which is opposite to the first direction (e.g., x-axis direction). The first rim 210 may surround and support at least a part of the first glass 215 (e.g., first display) disposed on the inner periphery thereof. The second rim 220 may surround and support at least a part of the second glass 225 (e.g., second display) disposed on the inner periphery thereof.

According to an embodiment, the first end piece 230 may be combined with a part of the first rim 210 (e.g., x-axis direction). The second end piece 240 may be combined with a part of the second rim 220 (e.g., −x-axis direction). The first end piece 230 may connect the first rim 210 and the first temple 250 with each other. The second end piece 240 may connect the second rim 220 and the second temple 260.

According to an embodiment, the first temple 250 may be operatively connected to the first end piece 230 using the first hinge part 255. The first hinge part 255 may be rotatably configured so that the first temple 250 is folded or unfolded with respect to the first rim 210. The second temple 260 may be operatively connected to the second end piece 240 using the second hinge part 265. The second hinge part 265 may be rotatably configured so that the second temple 260 is folded or unfolded with respect to the second rim 220.

According to an embodiment, at least a part of the exterior of the first temple 250 may be formed as the first non-conductive case 301. At least a part of the exterior of the second temple 260 may be formed as the second non-conductive case 302.

With reference to FIGS. 19 and 20, the first temple 250 may include the first printed circuit board 251 and the first electronic component 305. The first printed circuit board 251 and the first electronic component 305 may be disposed inside the first non-conductive case 301.

According to various embodiments, the first printed circuit board 251 may include a first wireless communication circuit 1310 (e.g., wireless communication circuit 310 of FIG. 3), a first ground area 1320 (e.g., ground area 320 of FIG. 3), a first non-conductive area 1330 (e.g., non-conductive area 330 of FIG. 3), a first feeder point 1340 (e.g., feeder point 340 of FIG. 3), and/or a first feeder wire 1350 (e.g., feeder wire 350 of FIG. 3).

According to an embodiment, the first wireless communication circuit 1310 may transmit and/or receive a wireless signal through the first feeder point 1340. The first wireless communication circuit 1310 may be electrically connected to the first feeder point 1340 by using a first signal path 1312 (e.g., signal path 312 of FIG. 3) and the first feeder wire 1350.

According to an embodiment, the first ground area 1320 may be formed on at least a part of the first printed circuit board 251. At least a part of the first ground area 320 may receive the wireless signal transferred through the first feeder point 1340.

According to an embodiment, the first non-conductive area 330 may be formed on a part of the first printed circuit board 251. The first non-conductive area 1330 may be disposed in a direction (e.g., horizontal direction) substantially corresponding to the disposition direction (e.g., y-axis direction) of the first temple 250. For example, the first non-conductive area 1330 may be disposed in a direction substantially parallel to the first wireless communication circuit 1310 or the first electronic component 305. The first non-conductive area 1330 may include a fill cut area. The first non-conductive area 1330 may include an area on which a polymer material is applied. The first non-conductive area 1330 may be formed with a first length L1.

According to an embodiment, the first feeder point 1340 may be electrically connected to the first wireless communication circuit 1310 by using the first signal path 1312 and the first feeder wire 1350. The first feeder point 1340 may transmit and/or receive the wireless signal.

According to an embodiment, the first feeder wire 1350 may have a first end (e.g., −z-axis direction) electrically connected to the first signal path 1312 and a second end (e.g., z-axis direction) electrically connected to the part of the first ground area 1320. The first feeder wire 1350 may be disposed across at least a part of the first non-conductive area 1330, for example, in the vertical direction (e.g., z-axis direction). The first feeder wire 1350 may transfer the wireless signal, being transferred through the first wireless communication circuit 1310 and the first signal path 1312, to the first feeder point 1340 and the at least a part of the first ground area 1320. The wireless signal, being transferred from the first wireless communication circuit 1310 through the first signal path 1312 and the first feeder wire 1350, may be transferred to the first feeder point 1340 and the at least a part of the first ground area 1320. In an embodiment, the at least a part of the first ground area 1320 may operate as a first radiator 610 (e.g., first antenna radiator 610). According to various embodiments, a first matching circuit 1315 may be disposed between the first wireless communication circuit 1310 and the first feeder wire 1350. The first matching circuit 1315 may be disposed in the first signal path 1312 between the first wireless communication circuit 1310 and the first feeder wire 1350.

According to various embodiments, the first printed circuit board 251 and the first electronic component 305 may be disposed to be spaced apart from each other. The at least a part of the first ground area 1320 formed on the first printed circuit board 251 and the first electronic component 305 may be electrically connected to each other by using the first conductive connection member 1325. The first electronic component 305 that is electrically connected to the at least a part of the first ground area 1320 may operate as the second radiator 620 (e.g., second antenna radiator). In an embodiment, the at least a part of the first ground area 1320 may be electrically connected to the first conductive connection member 1325 by using the first connector 1322.

According to an embodiment, the first wireless communication circuit 1310, the first signal path 1312, the first feeder wire 1350, the first feeder point 1340, and the part of the first ground area 1320 may be electrically connected to one another, and the part of the first ground area 1320 may operate as the first radiator 610.

According to an embodiment, the part of the first ground area 1320 (e.g., first antenna radiator), the first connector 1322, the first conductive connection member 1325, and the first electronic component 305 (e.g., second antenna radiator) may be electrically connected to one another, and the at least a part of the first electronic component 305 may operate as the second radiator 620.

With reference to FIGS. 19 and 21, the second temple 260 may include the configuration substantially corresponding to the first temple 250 although only some of the expressions of the constituent elements and the reference numerals of the drawings are different from each other. According to an embodiment, FIG. 21 may be a schematic enlarged view of part C of the second temple 260 of the wearable electronic device 200 disclosed in FIG. 19 as seen from one direction (e.g., −x-axis direction).

According to an embodiment, the second temple 260 may include the second printed circuit board 261 and a second electronic component 1905. The second printed circuit board 261 and the second electronic component 1905 may be disposed inside the second non-conductive case 302. The second electronic component 1905 may include, for example, an electrically conductive component, such as the sound output module (e.g., sound output module 155 of FIG. 1 or second sound output module 263 of FIG. 2), the battery (e.g., battery 189 of FIG. 1 or second battery 267 of FIG. 2), or a motor.

According to various embodiments, the second printed circuit board 261 may include a second wireless communication circuit 1910, a second signal path 1912, a second ground area 1920, a second non-conductive area 1930, a second feeder point 1940, and/or a second feeder wire 1950.

According to an embodiment, the second wireless communication circuit 1910 may transmit and/or receive the wireless signal through the second feeder point 1940. The second wireless communication circuit 1910 may include a radio frequency IC (RFIC). The second wireless communication circuit 1910 may be electrically connected to the second feeder point 1940 by using the second signal path 1912 and the second feeder wire 1950.

According to an embodiment, the second ground area 1920 may be formed on at least a part of the second printed circuit board 261. At least a part of the second ground area 1920 may receive the wireless signal transferred through the second feeder point 1940.

According to an embodiment, the second non-conductive area 1930 may be formed on a part of the second printed circuit board 261. The second non-conductive area 1930 may be disposed in a direction (e.g., horizontal direction) substantially corresponding to the disposition direction (e.g., y-axis direction) of the second temple 260. For example, the second non-conductive area 1930 may be disposed in a direction substantially parallel to the second wireless communication circuit 1910 or the second electronic component 1905. The second non-conductive area 1930 may include a fill cut area. The second non-conductive area 1930 may include an area on which a polymer material is applied. The second non-conductive area 1930 may be formed with a second length L2.

According to various embodiments, the second non-conductive area 1930 may be formed with a different length from that of the first non-conductive area 1330. For example, the second non-conductive area 1930 having the second length L2 may be formed longer than the first non-conductive area 1330 having the first length L1. Since the second non-conductive area 1930 is formed longer than the first non-conductive area 1330, at least one antenna (e.g., first radiator 610 and second radiator 620) disposed on the first temple 250 and at least one antenna (e.g., third radiator 2110 and fourth radiator 2120) disposed on the second temple 260 may support different frequency bands. In the wearable electronic device 200 according to an embodiment, the first non-conductive area 1330 and the second non-conductive area 1930 may be formed with different lengths, and resonance frequencies of the at least one antenna disposed on the first temple 250 and the at least one antenna disposed on the second temple may be adjusted.

According to an embodiment, the second feeder point 1940 may be electrically connected to the second wireless communication circuit 1910 using the second signal path 1912 and the second feeder wire 1950. The second feeder point 1940 may transmit and/or receive the wireless signal.

According to an embodiment, the second feeder wire 1950 may have a first end (e.g., −z-axis direction) electrically connected to the second signal path 1912 and a second end (e.g., z-axis direction) electrically connected to the part of the second ground area 1920. The second feeder wire 1950 may be disposed across at least a part of the second non-conductive area 1930, for example, in the vertical direction (e.g., z-axis direction). The second feeder wire 1950 may transfer the wireless signal, being transferred through the second wireless communication circuit 1910 and the second signal path 1912, to the second feeder point 1940 and the at least a part of the second ground area 1920. The wireless signal, being transferred from the second wireless communication circuit 1910 through the second signal path 1912 and the second feeder wire 1950, may be transferred to the second feeder point 1940 and the at least a part of the second ground area 1920. In an embodiment, the at least a part of the second ground area 1920 may operate as a third radiator 2110 (e.g., third antenna radiator). According to various embodiments, a second matching circuit 1915 may be disposed between the second wireless communication circuit 1910 and the second feeder wire 1950. The second matching circuit 1915 may be disposed in the second signal path 1912 between the second wireless communication circuit 1910 and the second feeder wire 1950.

According to various embodiments, the second printed circuit board 261 and the second electronic component 1905 may be disposed to be spaced apart from each other. The at least a part of the second ground area 1920 formed on the second printed circuit board 261 and the second electronic component 1905 may be electrically connected to each other using a second conductive connection member 1925. The at least a part of the second electronic component 1905 that is electrically connected to the at least a part of the second ground area 1920 may operate as a fourth radiator 2120 (e.g., fourth antenna radiator). In an embodiment, the at least a part of the second ground area 1920 may be electrically connected to the second conductive connection member 1925 by using the second connector 1922. The second connector 1922 may include, for example, a pad for contact, a coupling member, a C-clip, or a conductive foam spring.

According to an embodiment, the second wireless communication circuit 1910, the second signal path 1912, the second feeder wire 1950, the second feeder point 1940, and the part of the second ground area 1920 may be electrically connected to one another, and the part of the second ground area 1920 may operate as the third radiator 2110.

According to an embodiment, the part of the second ground area 1920 (e.g., third antenna radiator), the second connector 1922, the second conductive connection member 1925, and the second electronic component 1905 (e.g., fourth antenna radiator) may be electrically connected to one another, and the at least a part of the second electronic component 1905 may operate as the fourth radiator 2120.

According to various embodiments, the first radiator 610 and the second radiator 620 disposed on the first temple 250 of the wearable electronic device 200 and the third radiator 2110 and the fourth radiator 2120 disposed on the second temple 260 may be utilized as various antennas having different frequency bands. The first radiator 610, the second radiator 620, the third radiator 2110, and the fourth radiator 2120 may operate independently or in a mixed manner.

According to various embodiments, the shielding member 1710 disclosed in FIG. 17 may be disposed in substantially the same location as that of the first temple 250 or the second temple 260 of the wearable electronic device 200 disclosed in FIG. 19. In an embodiment, the shielding member 1710 may be disposed on an inner side surface (e.g., x-axis direction) of the first non-conductive case 301 located on at least a part of the rear surface (e.g., −x-axis direction) of the first electronic component 305. The shielding member 1710 may be disposed on one side (e.g., x-axis direction) of the rear surface of the first non-conductive case 301, and may be spaced apart from the at least a part of the rear surface (e.g., −x-axis direction) of the first printed circuit board 251 and the at least a part of the rear surface (e.g., −x-axis direction) of the first electronic component 305. In another embodiment, the shielding member 1710 may be disposed on an inner side surface (e.g., −x-axis direction) of the second non-conductive case 302 located on at least a part of the rear surface (e.g., x-axis direction) of the second printed circuit board 261 and on at least a part of the rear surface (e.g., x-axis direction) of the second electronic component 1905. The shielding member 1710 may be disposed on one side (e.g., −x-axis direction) of the rear surface of the second non-conductive case 302, and may be spaced apart from the at least a part of the rear surface (e.g., x-axis direction) of the second printed circuit board 261 and the at least a part of the rear surface (e.g., x-axis direction) of the second electronic component 1905.

With reference to FIG. 22, it can be identified that the first radiator 610 forms a resonance frequency in the frequency band of about 3.2 GHz to 3.5 GHz by using the part of the first ground area 1320 (e.g., first antenna radiator) based on a reflection loss of about −6 dB or less.

According to an embodiment, it can be identified that the second radiator 620 forms a resonance frequency in the frequency band of about 2.2 GHz to 2.5 GHz by using the at least a part of the first electronic component 305 (e.g., second antenna radiator).

According to an embodiment, it can be identified that the third radiator 2110 forms a resonance frequency in the frequency band of about 4.7 GHz to 5 GHz by using the at least a part of the second ground area 1920 (e.g., third antenna radiator).

According to an embodiment, it can be identified that the fourth radiator 2120 forms a resonance frequency in the frequency band of about 1.3 GHz to 1.5 GHz by using the at least a part of the second electronic component 1905 (e.g., fourth antenna radiator).

A wearable electronic device 200 according to an embodiment of the disclosure may include: a bridge 201; a first rim 210 disposed in a first direction of the bridge, and a second rim 220 disposed in a second direction of the bridge, the second direction being opposite to the first direction; and a first temple 250 configured to be folded or unfolded with respect to the first rim using a first hinge part 255, and a second temple 260 configured to be folded or unfolded with respect to the second rim using a second hinge part 265, wherein the first temple includes: a first printed circuit board 251 on which a wireless communication circuit 310 is disposed and a ground area 320 is partially formed; a non-conductive area 330 formed on a part of the ground area; a feeder wire 350 disposed across the non-conductive area 330, and having a first end electrically connected to the wireless communication circuit 310 using a signal path 312 and a second end disposed adjacent to the ground area 320; a feeder point 340 formed adjacent to the second end of the feeder wire 350 and electrically connected to the feeder wire 350; and a first electronic component 305 electrically connected to a part of the ground area, electrically connected to the feeder point 340, using a first conductive connection member 325.

According to an embodiment, the first electronic component 305 may include one of a sound output module, a battery, or a motor.

According to an embodiment, the non-conductive area 330 may be formed in the first direction (e.g., −y-axis direction) on the part of the ground area, and the feeder wire 350 may be disposed in the second direction (e.g., z-axis direction) that is perpendicular to the first direction.

According to an embodiment, the part of the ground area 320 may be configured to operate as a first radiator 610, and the first electronic component 305 may be configured to operate as a second radiator 620.

According to an embodiment, the first radiator 610 and the second radiator 620 may be configured to operate in different frequency bands.

According to an embodiment, the first conductive connection member 325 may include a flexible printed circuit board (FPCB) or an FPCB type RF cable (FRC).

According to an embodiment, the part of the ground area 320 may be electrically connected to the first conductive connection member 325 using a first connector 322.

According to an embodiment, the first connector 322 may include a pad for contact, a coupling member, a C-clip, or a conductive foam spring.

According to an embodiment, the non-conductive area 330 may be formed in the first direction (e.g., horizontal direction) on the part of the ground area 320 disposed on a lower part of the first connector 322.

According to an embodiment, the non-conductive area 330 may be formed to extend in the second direction (e.g., vertical direction) on the part of the ground area 320 disposed on a lower part of the first connector 322.

According to an embodiment, the non-conductive area 330 may be formed to extend in the second direction on the part of the ground area 320 disposed on one side surface of the first connector 322.

According to an embodiment, the non-conductive area 330 may include a first part 331 formed in the second direction (e.g., vertical direction) on the part of the ground area 320 disposed on one side surface of the first connector 322, and a second part 332 formed in the first direction (e.g., horizontal direction) on the part of the ground area 320 disposed on a lower part of the first connector 322.

According to an embodiment, at least a part of an exterior of the first temple 250 may be formed as a first non-conductive case 301.

According to an embodiment, a part of the first non-conductive case 301 may be located on at least a part of a rear surface of the first printed circuit board 251 and on at least a part of a rear surface of the first electronic component 251, and a shielding member 1710 may be disposed on an inside of the part of the first non-conductive case 301.

According to an embodiment, a matching circuit 315 may be disposed between the wireless communication circuit 310 and the feeder wire 350.

A wearable electronic device 200 according to an embodiment of the disclosure may include: a bridge 201; a first rim 210 disposed in a first direction of the bridge, and a second rim 220 disposed in a second direction of the bridge, being opposite to the first direction; and a first temple 250 configured to be folded or unfolded with respect to the first rim by using a first hinge part 255, and a second temple 260 configured to be folded or unfolded with respect to the second rim by using a second hinge part 265, wherein the first temple includes: a first printed circuit board 251 on which a first wireless communication circuit 1310 is disposed and a first ground area 1320 is partially formed; a first non-conductive area 1330 formed on a part of the first ground area; a first feeder wire 1350 disposed across the first non-conductive area 1330, and having a first end electrically connected to the first wireless communication circuit 1310 by using a first signal path 1312 and a second end disposed adjacent to the first ground area 1320; a first feeder point 1340 disposed adjacent to the second end of the first feeder wire 1350 and electrically connected to the first feeder wire 1350; and a first electronic component 305 electrically connected to a part of the first ground area, electrically connected to the first feeder point 1340, by using a first conductive connection member 1325, and wherein the second temple 260 includes: a second printed circuit board 261 on which a second wireless communication circuit 1910 is disposed and a second ground area 1920 is partially formed; a second non-conductive area 1930 formed on a part of the second ground area; a second feeder wire 1950 disposed across the second non-conductive area 1930, and having a first end electrically connected to the second wireless communication circuit 1910 by using a second signal path 1912 and a second end disposed adjacent to the second ground area 1920; a second feeder point 1940 formed adjacent to the second end of the second feeder wire 1950 and electrically connected to the second feeder wire 1950; and a second electronic component 1905 electrically connected to a part of the second ground area, electrically connected to the second feeder point 1940, by using a second conductive connection member 1925.

According to an embodiment, the first non-conductive area 1330 may be formed with a first length L1 and the second non-conductive area 1930 may be formed with a second length L2, and the first length and the second length may be configured to be different from each other.

According to an embodiment, the part of the first ground area 1320 may be configured to operate as a first radiator 610, the first electronic component 305 may be configured to operate as a second radiator 620, the part of the second ground area 1920 may be configured to operate as a third radiator 2110, and the second electronic component 1005 may be configured to operate as a fourth radiator 2120.

According to an embodiment, the first radiator 610, the second radiator 620, the third radiator 2110, and the fourth radiator 2120 may be configured to operate in different frequency bands.

According to an embodiment, the part of the first ground area 1320 may be electrically connected to the first conductive connection member 1325 by using a first connector 1322, and the part of the second ground area 1920 may be electrically connected to the second conductive connection member 1925 by using a second connector 1922.

According to an embodiment, the first non-conductive area 1330 may be formed in the first direction on the part of the first ground area 1320, the first feeder wire 1350 may be disposed in the second direction that is vertical to the first direction, the second non-conductive area 1930 may be formed in the first direction on the part of the second ground area 1920, and the second feeder wire 1950 may be disposed in the second direction that is vertical to the first direction.

Figure 23A:
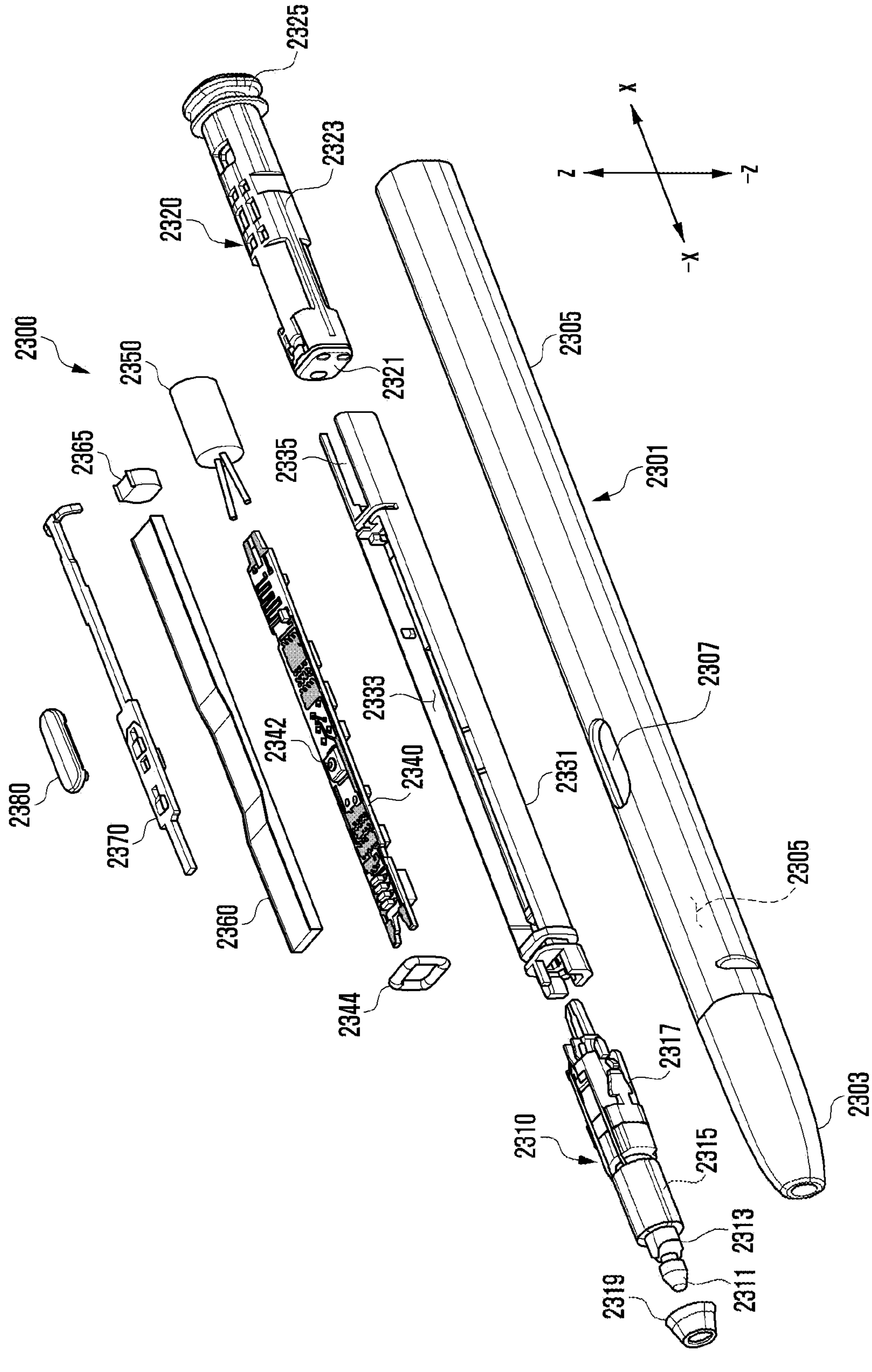
FIG. 23A is an exploded perspective view schematically illustrating a stylus pen including at least one antenna according to an embodiment of the disclosure.
Figure 23B:
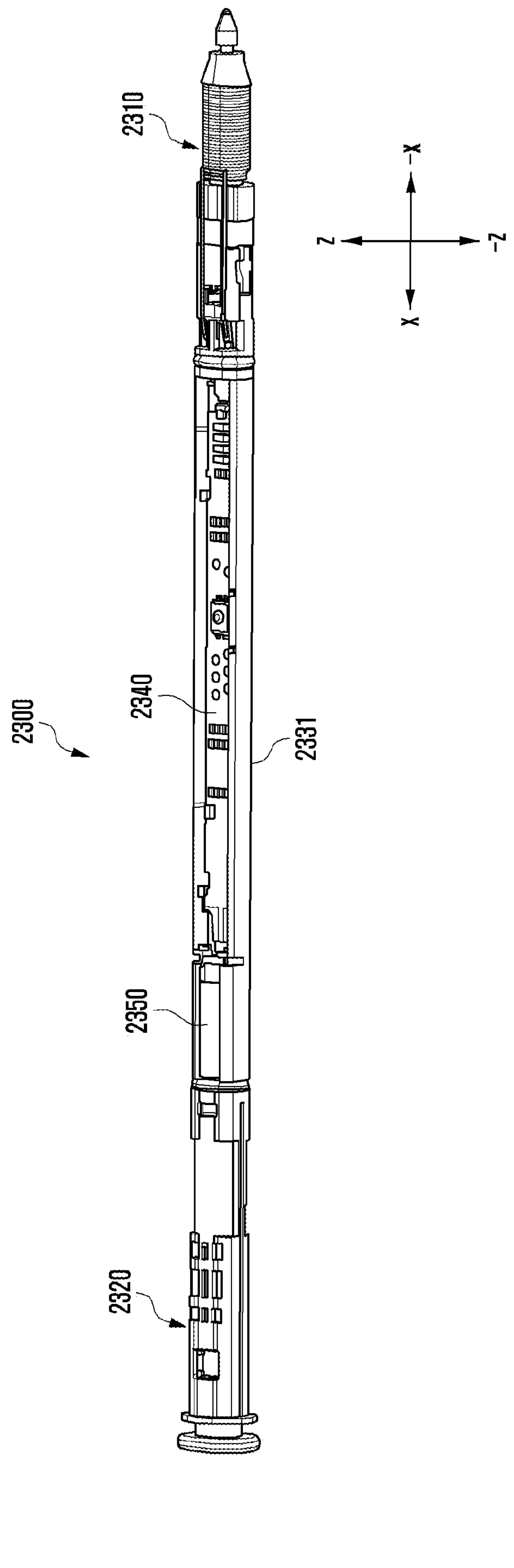
FIG. 23B is a perspective view schematically illustrating a state where some constitutions of the stylus pen disclosed in FIG. 23A are combined with each other according to an embodiment of the disclosure.

FIG. 23A is an exploded perspective view schematically illustrating a stylus pen including at least one antenna according to an embodiment of the disclosure. FIG. 23B is a perspective view schematically illustrating a state where some constitutions of the stylus pen disclosed in FIG. 23A are combined with each other according to an embodiment of the disclosure.

For example, FIG. 23B may be a view schematically illustrating a state where an inner assembly (e.g., a coil member 2310, an ejection member 2320, a base 2331 including a printed circuit board 2340, and a battery 2350) disposed inside a stylus pen 2300 disclosed in FIG. 23A are combined with one another according to an embodiment of the disclosure.

With reference to FIGS. 23A and 23B, the stylus pen 2300 may include a housing 2301 and the inner assembly disposed inside the housing 2301. For example, the inner assembly may include the coil member 2310 included inside the housing 2301, the ejection member 2320, the base 2331 including the printed circuit board 2340, and/or the battery 2350. The inner assembly is not limited to the above-described constituent elements, but may include other various constituent elements included inside the housing 2301.

According to an embodiment, the housing 2301 may include a first part 2303 and/or a second part 2305. For example, the first part 2303 may be disposed in a −x-axis direction of the housing 2301, and the second part 2305 may be disposed in an x-axis direction of the housing 2301. The housing 2301 may include a space 2305 which is provided in the first part 2303 and the second part 2305, and in which the inner assembly can be inserted. In an embodiment, the second part 2305 of the housing 2301 may include an opening 2307 formed so that a button 2380 projects therethrough. For example, the button 2380 may include a knob. The housing 2301 may be formed of a non-conductive material (e.g., polymer) and/or a conductive material (e.g., metal). For example, the first part 2303 of the housing 2301 may be formed of a non-conductive material. For example, the second part 2305 of the housing 2301 may be formed of a conductive material.

According to an embodiment, the inner assembly may be disposed in the space 2305 formed inside the housing 2301. For example, the inner assembly may include the coil member 2310, the ejection member 2320, the base 2331 including the printed circuit board 2340, and the battery 2350.

According to an embodiment, the coil member 2310 may be disposed in the first part 2303 of the housing 2301. The ejection member 2320 and the printed circuit board 2340 may be disposed in the second part 2305 of the housing 2301. The inner assembly is not limited to the coil member 2310, the ejection member 2320, and the printed circuit board 2340 as described above, but may include at least one of other various constituent elements to be described later.

According to an embodiment, the coil member 2310 may include a pen tip 2311, a packing ring 2313, a coil 2315, a sensing member 2317, and/or a holder 2319. For example, the coil member 2310 may be disposed in the −x-axis direction of the housing 2301.

According to an embodiment, if the coil member 2310 is inserted into the housing 2301, the pen tip 2311 may be exposed to outside of the first part 2303 (e.g., −x-axis direction). The pen tip 2311 may be disposed in the −x-axis direction of the coil member 2310.

According to an embodiment, the packing ring 2313 may be disposed in the x-axis direction of the pen tip 2311. The packing ring 2313 may prevent an inflow of moisture and/or dust through an end part (e.g., −x-axis direction) of the first part 2303 of the housing 2301. The packing ring 2313 may perform waterproof and/or dustproof functions. The packing ring 2313 may include, for example, at least one of epoxy, rubber, urethane, and silicone.

According to an embodiment, the coil 2315 may be formed by winding a conductive line plural times. The coil 2315 may form a resonance frequency in a set frequency band (e.g., about 500 to 900 kHz). The resonance frequency of the coil 2315 may be adjusted through at least one capacitive element (e.g., capacitor). For example, the packing ring 2313 and the coil 2315 may be disposed between the pen tip 2311 and the sensing member 2317.

According to an embodiment, the sensing member 2317 may obtain a change of pressure corresponding to pressing of the pen tip 2311. For example, the sensing member 2317 may include a pen pressure sensing member. The sensing member 2317 may be disposed in the x-axis direction of the coil member 2310.

According to an embodiment, the holder 2319 may be inserted through the pen tip 2311, and may surround the packing ring 2313 to protect the packing ring 2313.

According to an embodiment, the ejection member 2320 may include a constitution for withdrawing the stylus pen 2300 from the electronic device 101. For example, the ejection member 2320 may include a shaft 2321, a body 2323, and/or a button member 2325. For example, the ejection member 2320 may be disposed in the x-axis direction of the housing 2301.

According to an embodiment, the body 2323 may be disposed around the shaft 2321. The body 2323 may form an appearance of the ejection member 2320. The body 2323 may include at least one component (not illustrated). For example, the body 2323 may include a cam member. The body 2323 may form a push-pull structure in which an elastic member is disposed.

According to an embodiment, if the ejection member 2320 is inserted into the second part 2305 of the housing 2301, at least a part of the button member 2325 may be exposed to the outside (e.g., x-axis direction) of the second part 2305 of the housing 2301. The button member 2325 may be combined with the shaft 2321, and may reciprocate in a straight line with respect to the body 2323. The button member 2325 may include a button formed with a locking structure so that a user can withdraw the stylus pen 2300 from the electronic device 101 by using the user's finger. According to various embodiments, the stylus pen 2300 may include a sensor detecting the linear reciprocating motion of the shaft 2321.

According to an embodiment, the printed circuit board 2340 may be disposed in the base 2331. The printed circuit board 2340 may be disposed between the coil member 2310 and the ejection member 2320. The base 2331 may surround at least one surface of the printed circuit board 2340. The base 2331 may include a seating part 2333 on which the printed circuit board 2340 is disposed. The printed circuit board 2340 may be disposed on the seating part 2333 of the base 2331, and may be fixed so as not to move. The base 2331 may include a battery holder 2335. The battery 2350 (e.g., first electronic component 305 of FIG. 3) may be disposed in the battery holder 2335. The printed circuit board 2340 and the battery 2350 may be combined with each other by using an adhesive member 2365.

According to an embodiment, a sealing ring 2344 may be disposed in the −x-axis direction of the base state 2331. The sealing ring 2344 may be disposed to surround a part in the −x-axis direction of the base 2331. The sealing ring 2344 may prevent foreign substances, such as the moisture and/or dust from flowing from the outside into the printed circuit board 2340.

According to an embodiment, a plate-shaped adhesive member 2360 (e.g., ultraviolet rays bond) may be disposed on an upper surface (e.g., z-axis direction) of the base 2331. For example, after the printed circuit board 2340 is disposed in the base 2331, the z-axis direction of the base 2331 may be sealed through the adhesive member 2360.

According to an embodiment, the printed circuit board 2340 may include a first surface (e.g., z-axis direction) and a second surface (e.g., −z-axis direction). For example, a variable capacitor or a switch 2342 connected to the coil 2315 may be disposed on the first surface of the printed circuit board 2340. For example, on the first surface of the printed circuit board 2340, a wireless communication circuit (e.g., wireless communication module 192 of FIG. 1 and/or a wireless communication circuit 310 of FIG. 3) and/or a matching circuit (e.g., matching circuit 315 of FIG. 4) may be disposed. For example, a ground area (e.g., ground area 320 of FIG. 3) may be disposed on the second surface of the printed circuit board 2340. The battery 2350 may be disposed on one side surface (e.g., x-axis direction) of the printed circuit board 2340. The battery 2350 may include, for example, an electric double layered capacitor (EDLC). The battery 2350 may include a conductive material (e.g., aluminum). The battery 2350 may be disposed in the battery holder 2335 formed in the base 2331. For example, the battery 2350 may include a cylinder type battery including a conductive material at least partly. The battery 2350 may include, for example, a lithium ion battery.

According to an embodiment, a button holder 2370 may be disposed on an upper part (e.g., z-axis direction) of the adhesive member 2360. The button holder 2370 may be combined with the printed circuit board 2340 through the adhesive member 2360. The button 2380 (e.g., knob) may be disposed on an upper part (e.g., z-axis direction) of the button holder 2370. The button 2380 may be used to press the switch 2342 disposed on the printed circuit board 2340. The button 2380 may be exposed to the outside through the opening 2307 formed on the housing 2301. The button 2380 may be supported through the button holder 2370. The button holder 2370 may be formed to support the button 2380, and if there is not an external force acting on the button 2380, the button holder 2370 may provide an elastic restoring force to make the button 2380 restored or kept in a state where the button 2380 is disposed at a specific location. According to various embodiments, the button 2380 is not limited to a physical key, but may include any one of a touch key, a motion key, a pressure key, and a keyless type.

Figure 24:
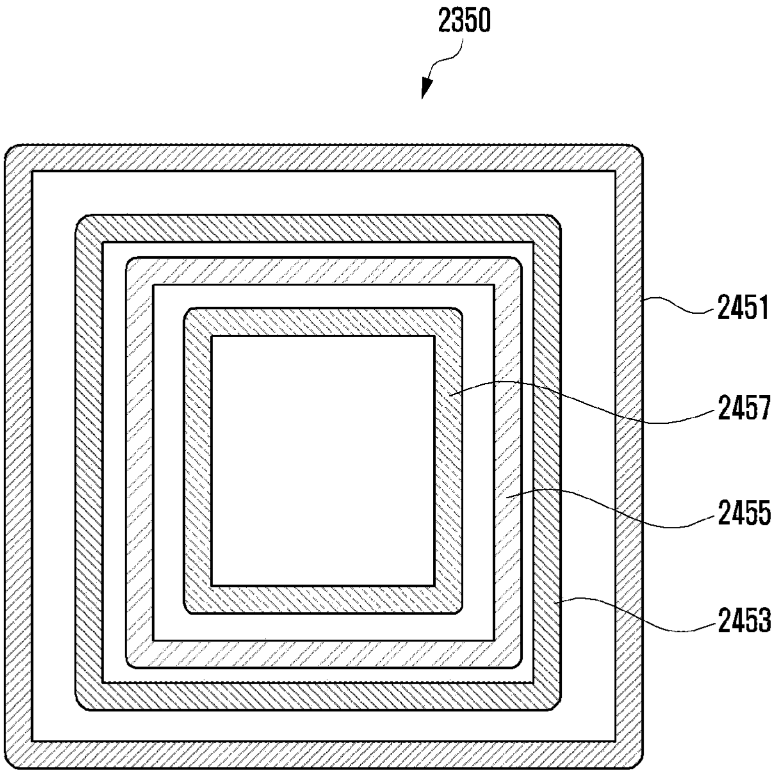
FIG. 24 is a view schematically illustrating a constitution of a battery that is applied to a stylus pen according to an embodiment of the disclosure.

FIG. 24 is a view schematically illustrating a constitution of a battery that is applied to a stylus pen according to an embodiment of the disclosure.

For example, FIG. 24 may be a view schematically illustrating the constitution of a battery 2350 disclosed in FIGS. 23A and 23B according to an embodiment of the disclosure.

With reference to FIG. 24, the battery 2350 of the stylus pen 2300 may include a case 2451, an anode 2453, a separator 2455, and a cathode 2457. The battery 2350 may supply a power to the stylus pen 2300. The battery 2350 may include a conductive material (e.g., aluminum) at least partly.

According to an embodiment, the case 2451 may be a pouch (e.g., can) in which the anode 2453, the separator 2455, and the cathode 2457 are included. Electrolyte may be filled inside the case 2451. The case 2451 may be formed of a conductive material (e.g., metal), such as aluminum or an aluminum alloy.

According to an embodiment, the anode 2453 may include a plate formed of a conductive material, such as aluminum or copper. The separator 2455 may be formed of a non-conductive material. For example, the separator 2455 may be formed of a porous polymer membrane, such as polyethylene (PE) or polypropylene (PP). The cathode 2457 may include a plate formed of a conductive material, such as aluminum or copper. The case 2451 and the anode 2453 may be disposed to be spaced apart from each other. A capacitance property may be formed between the case 2451 and the anode 2453. The anode 2453 and the cathode 2457 may be disposed to be spaced apart from each other. The capacitance property may be formed between the anode 2453 and the cathode 2457. The anode 2453 may be disposed more adjacent to the case 2451 than the separator 2455. For example, the separator 2455 may be disposed more adjacent to the anode 2453 than the cathode 2457.

According to an embodiment, the anode 2453, the separator 2455, and the cathode 2457 may be formed to be wound or in zigzag form. For example, the anode 2453, the separator 2455, and the cathode 2457 may be wound to overlap each other. For example, the anode 2453, the separator 2455, and the cathode 2457 may be formed to be wound in the form of a jelly roll. When the anode 2453 is formed in the form of the jelly roll, it may be disposed more adjacent to the case 2451 than the separator 2455. The separator 2455 may be disposed on an inside of the anode 2453. The cathode 2457 may be disposed on an inside of the separator 2455. The separator 2455 may be disposed between the anode 2453 and the cathode 2457. The anode 2453 and the cathode 2457 may be insulated from each other through the separator 2455. The separator 2455 may be a separator film that prevents the anode 2453 and the cathode 2457 from coming in contact with each other. The separator 2455 may prevent the anode 2453 and the cathode 2457 from being shorted.

According to an embodiment, the battery 2350 may convert a chemical energy that the anode 2453 and the cathode 2457 have into an electrical energy. The anode 2453 may be an electrode into which electrons flow. Since a chemical reaction for obtaining electrons occurs on the anode 2453, the anode 2453 may be an electrode on which a reduction reaction occurs. An anode active material for anode activation may be coated on at least one surface of the anode 2453. The cathode 2457 may be an electrode from which electrons flow out. Since a chemical reaction for losing electrons occurs on the cathode 2457, the cathode 2457 may be an electrode on which an oxidation reaction occurs. A cathode active material for cathode activation may be coated on at least one surface of the cathode 2457. The anode 2453 and the cathode 2457, between which the separator 2455 is interposed, may generate current through a redox reaction.

According to an embodiment, in the battery 2350, since at least one of the case 2451, the anode 2453, and the cathode 2457, which are formed of a conductive material, is electrically connected to the ground area 320 formed on the printed circuit board 2340, the ground area of the stylus pen 2300 can be extended. At least a part of the ground area 320 formed on the printed circuit board 2340 may operate as a first radiator (e.g., first radiator 610 of FIG. 25A or 26A) of the antenna included in the stylus pen 2300. At least a part of the case 2451, the anode 2453, and the cathode 2457 of the battery 2350 may operate as a second radiator (e.g., second radiator 620 of FIG. 25A or 26A) of the stylus pen 2300.

Figure 25A:
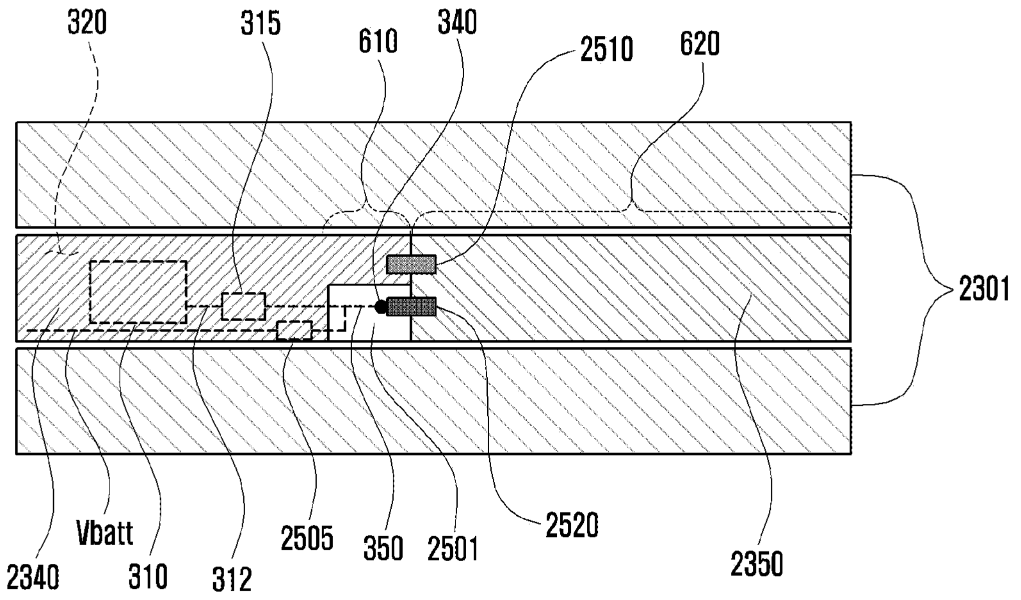
FIG. 25A is a diagram schematically illustrating a state where some constitutions of the stylus pen are combined with each other according to an embodiment of the disclosure.
Figure 25B:
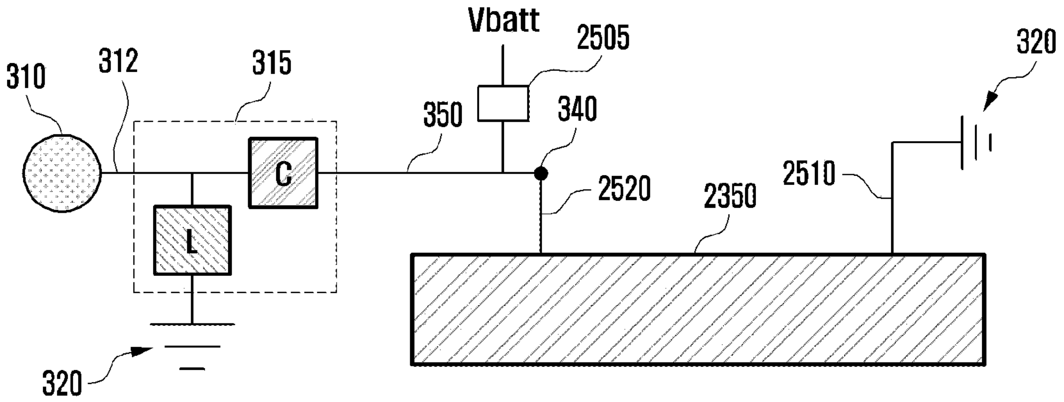
FIG. 25B is a diagram schematically illustrating an equivalent circuit constitution for a stylus pen disclosed in FIG. 25A according to an embodiment of the disclosure.

FIG. 25A is a diagram schematically illustrating a state where some constitutions of the stylus pen are combined with each other according to an embodiment of the disclosure. FIG. 25B is a diagram schematically illustrating an equivalent circuit constitution for a stylus pen disclosed in FIG. 25A according to an embodiment of the disclosure.

According to various embodiments, the stylus pen 2300 disclosed hereinafter may include the embodiments disclosed in FIGS. 1 to 22 and FIGS. 23A to 24. In the explanation related to the stylus pen 2300 disclosed hereinafter, the same reference numerals are given to substantially the same constituent elements as those of the embodiments disclosed in FIGS. 1 to 24, and the duplicate explanation of their functions may be omitted.

With reference to FIGS. 25A and 25B, the stylus pen 2300 may include the printed circuit board 2340 and the battery 2350 on the inside of the housing 2301. A part of the printed circuit board 2340 may be electrically connected to the battery 2350 by using a first conductive connection member 2510 and a second conductive connection member 2520.

According to an embodiment, the printed circuit board 2340 may include a wireless communication circuit 310, a signal path 312, a ground area 320, an opening 2501, and/or a feeder point 340. For example, the battery 2350 may include the constitution disclosed in FIG. 24. At least a part of the battery 2350 (e.g., the case 2451, the anode 2453, and the cathode 2457) may include a conductive material.

According to an embodiment, the wireless communication circuit 310 (e.g., wireless communication module 192 of FIG. 1) may transmit and/or receive a wireless signal through the feeder point 340. For example, the wireless communication circuit 310 may include a radio frequency IC (RFIC). The wireless communication circuit 310 may be electrically connected to the feeder point 340 by using the signal path 312 and the feeder wire 350. The feeder wire 350 may transfer the wireless signal to the second conductive connection member 2520 through the feeder point 340. The battery 2350 may be electrically connected to the second conductive connection member 2520. The battery 2520 may receive an input voltage Vbatt transferred through the second conductive connection member 2520. A filter 2505 may be disposed on the feeder wire 350. The filter 2505 may filter the wireless signal being transferred through the first radiator 610 that is a part of the ground area 320. For example, the filter 2505 may perform a function of enabling the wireless signal being transferred through the feeder point 340 and the second conductive connection member 2520 not to be applied to the ground area 320, but to be applied to the battery 2350. The filter 2505 may include a low-pass filter and/or a wireless signal blocking circuit. The filter 2505 may block the wireless signal, and may pass a DC power (DC).

According to an embodiment, the ground area 320 may be formed on at least a part of the printed circuit board 2340. The ground area 320 may be formed partly on the printed circuit board 2340. For example, the ground area 320 may include a conductive pattern formed partly on the inside of the printed circuit board 2340.

According to an embodiment, the opening 2501 may be formed on a part of the printed circuit board 2340. The opening 2501 may include a fill cut area. The opening 2501 may be a non-conductive area (e.g., non-conductive area 330 of FIG. 4) including a slit or slot. The ground area 320 may be electrically connected to the second conductive connection member 2520 through the opening 2501. The ground area 320 may be electrically connected to the first conductive connection member 2510.

According to an embodiment, the feeder point 340 may be electrically connected to the wireless communication circuit 310 by using the signal path 312 and the feeder wire 350. The wireless communication circuit 310 may transmit and/or receive the wireless signal through the feeder point 340. In an embodiment, the wireless communication circuit 310, the signal path 312, the feeder wire 350, and the feeder point 340 may be electrically connected to one another and may form a feeder part.

According to an embodiment, the wireless signal output from the wireless communication circuit 310 may be transferred to the feeder point 340 through the signal path 312 and the feeder wire 350. The wireless signal transferred to the feeder point 340 may be transferred to the battery 2350 through the second conductive connection member 2520. The feeder point 340 may be electrically connected to the second conductive connection member 2520 and/or the first conductive connection member 2510. Further a part of the ground area 320 may be electrically connected to the battery 2350 by using the first conductive connection member 2510 and/or the second conductive connection member 2520. In an embodiment, since the wireless signal is transferred to at least a part of the ground area 320 formed on the printed circuit board 2340, the at least a part of the ground area 320 may operate as the first radiator 610, and at least a part of the battery 2350 may operate as the second radiator 620.

According to an embodiment, the matching circuit 315 may be disposed between the wireless communication circuit 310 and the feeder point 340. The matching circuit 315 may be disposed in the signal path 312 between the wireless communication circuit 310 and the feeder point 340. For example, the matching circuit 315 may be disposed in series or in parallel in the signal path 312 of the wireless communication circuit 310 and the feeder point 340. The matching circuit 315 may adjust impedance matching of the antenna (e.g., the first radiator 610 and/or the second radiator 620 of FIG. 6 or 26A). For example, the matching circuit 315 may include at least one switch and/or at least one passive element. The at least one passive element may have, for example, different element values. For example, the at least one passive element (e.g., lumped element) may include capacitors C having various capacitance values and/or inductors L having various inductance values.

According to an embodiment, the printed circuit board 2340 and the battery 2350 may be disposed to be spaced apart from each other. The printed circuit board 2340 and the battery 2350 may be electrically connected to each other by using the first conductive connection member 2510 and the second conductive connection member 2520. For example, at least a part of the ground area 320 formed on the printed circuit board 2340 may be electrically connected to the battery 2350 by using the first conductive connection member 2510 and the second conductive connection member 2520. Since the at least a part of the ground area 320 formed on the printed circuit board 2340 is electrically connected to the battery 2350 by using the first conductive connection member 2510 and the second conductive connection member 2520, the ground area 320 may be extended.

According to an embodiment, the first conductive connection member 2510 and the second conductive connection member 2520 may include a flexible printed circuit board (FPCB) or an FPCB type RF cable (FRC). The battery 2350 electrically connected to the at least a part of the ground area 320 may operate as the second radiator 620.

With reference to FIGS. 25A and 25B, the feeder point 340 may be formed in the ground area 320 adjacent to the second conductive connection member 2520. If a feed signal is applied to the feeder point 340 through the wireless communication circuit 310, the applied signal may be transferred to at least a part of the battery 2350 through the second conductive connection member 2520. Through such an operation, the at least a part of the ground area 320 of the printed circuit board 2340 may operate as the first radiator 610, and the battery 2350 may operate as the second radiator 620. According to various embodiments, the stylus pen 2300 may extend the ground area through at least a part of the ground area 320 formed on the printed circuit board 2340 and at least a part of the battery 2350, and may improve the radiation performance of the antenna. According to various embodiments, the feeder point 340 may be formed in the ground area 320 adjacent to the first conductive connection member 2510. Alternatively, the feeder point 340 may be formed in a part of the ground area 320 that operates as the first radiator 610.

Figure 26A:
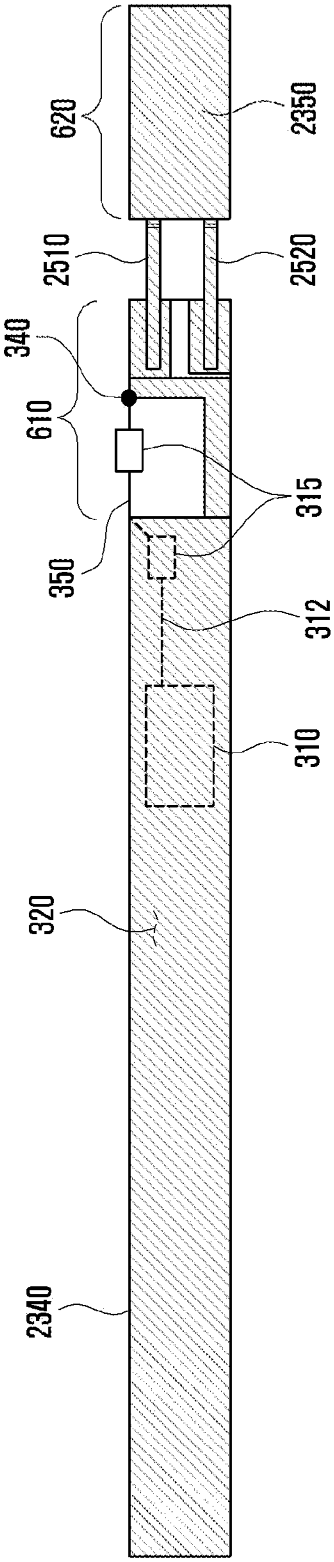
FIG. 26A is a diagram explaining a connection constitution of a printed circuit board of a stylus pen and a battery according to an embodiment of the disclosure.
Figure 26B:
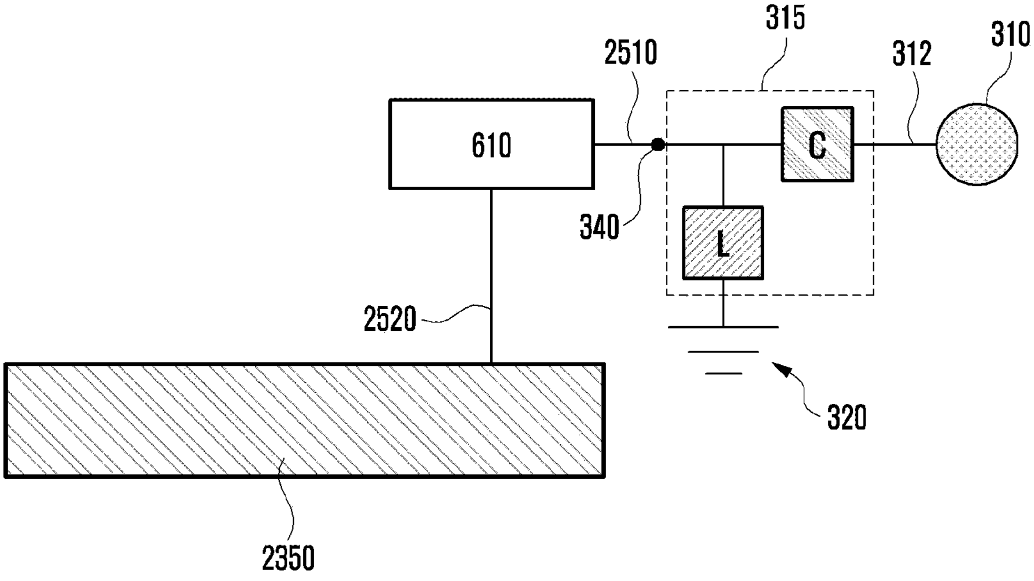
FIG. 26B is a diagram schematically illustrating an equivalent circuit constitution for the constitution disclosed in FIG. 26A according to an embodiment of the disclosure.

FIG. 26A is a diagram explaining a connection constitution of a printed circuit board of a stylus pen and a battery according to an embodiment of the disclosure. FIG. 26B is a diagram schematically illustrating an equivalent circuit constitution for the constitution disclosed in FIG. 26A according to an embodiment of the disclosure.

According to various embodiments, embodiments disclosed in FIGS. 26A and 26B may include the embodiments disclosed in FIGS. 25A and 25B. In the explanation with reference to FIGS. 26A and 26B, the same reference numerals are given to substantially the same constituent elements as those of the embodiments disclosed in FIGS. 25A and 25B, and the duplicate explanation of their functions may be omitted.

With reference to FIGS. 26A and 26B, a part of the printed circuit board 2340 may be electrically connected to the battery 2350 by using the first conductive connection member 2510 and the second conductive connection member 2520. For example, at least a part of the ground area 320 formed on the printed circuit board 2340 may be electrically connected to the battery 2350 by using the first conductive connection member 2510 and the second conductive connection member 2520. Since the at least a part of the ground area 320 formed on the printed circuit board 2340 is electrically connected to the battery 2350 by using the first conductive connection member 2510 and the second conductive connection member 2520, the ground area 320 can be extended, and the radiation area can be extended.

According to an embodiment, the wireless signal output from the wireless communication circuit 310 may be transferred to the feeder point 340 through the signal path 312 and the feeder wire 350. The wireless signal transferred to the feeder point 340 may be transferred to at least a part of the ground area 320. The wireless signal transferred to the feeder point 340 may be transferred to the battery 2350 through the first conductive connection member 2510 and the second conductive connection member 2520.

With reference to FIGS. 26A and 26B, the feeder point 340 may be formed in the ground area 320 adjacent to the first conductive connection member 2510. If a feed signal is applied to the feeder point 340 through the wireless communication circuit 310, the applied signal may be transferred to at least a part of the battery 2350. Through such an operation, the at least a part of the ground area 320 of the printed circuit board 2340 may operate as the first antenna radiator 610, and the battery 2350 may operate as the second radiator 620.

According to an embodiment, since the at least a part of the ground area 320 formed on the printed circuit board 2340 is electrically connected to the battery 2350 by using the first conductive connection member 2510 and the second conductive connection member 2520, the ground area 320 can be extended, and the radiation performance of the antenna can be improved.

According to an embodiment, at least one matching circuit 315 may be disposed between the wireless communication circuit 310 and the feeder point 340. The matching circuit 315 may be disposed in the signal path 312 between the wireless communication circuit 310 and the feeder point 340 and/or the feeder wire 350. For example, the matching circuit 315 may be disposed in series or in parallel in the signal path 312 of the wireless communication circuit 310 and the feeder point 340 and/or the feeder wire 350. The matching circuit 315 may adjust the impedance matching of the first radiator 610 and/or the second radiator 620.

Figure 26C:
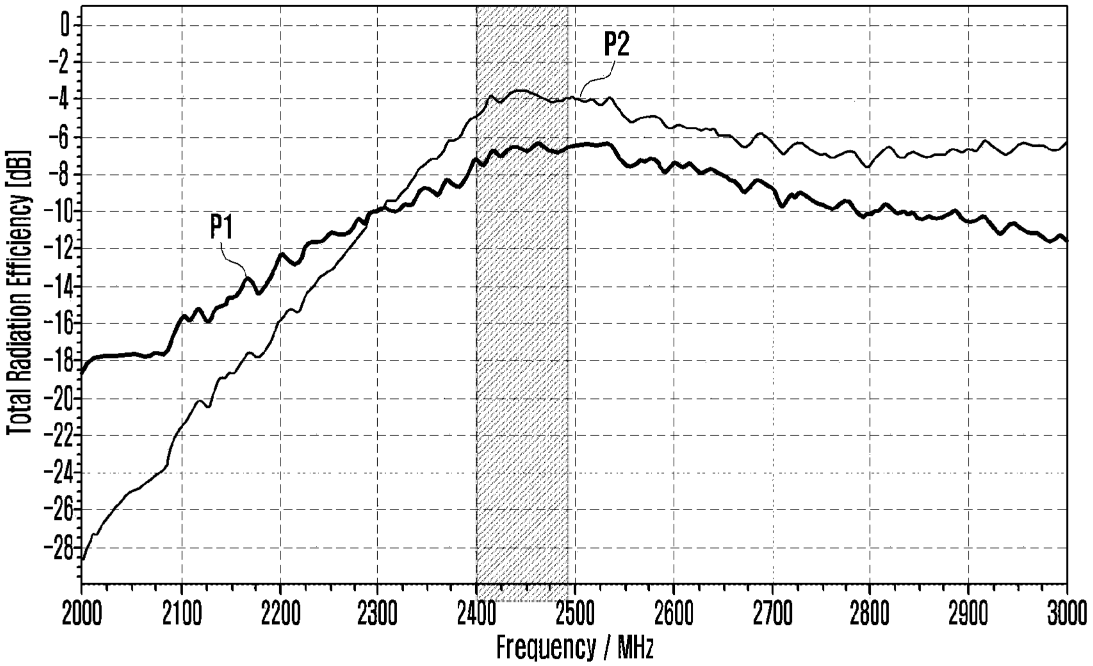
FIG. 26C is a diagram illustrating comparison of a radiation efficiency of a stylus pen according to a comparative embodiment and a radiation efficiency of a stylus pen according to an embodiment of the disclosure.

FIG. 26C is a diagram illustrating comparison of a radiation efficiency of a stylus pen according to a comparative embodiment and a radiation efficiency of a stylus pen according to an embodiment of the disclosure.

According to various embodiments, the stylus pen according to a comparative embodiment may not use the battery 2350 as the antenna radiator and the ground area. According to an embodiment, the stylus pen 2300 according to an embodiment of the disclosure may use the battery 2350 as the antenna radiator (e.g., second radiator 620) and the ground area.

With reference to FIG. 26C, it can be identified that the radiation efficiency P2 of the stylus pen 2300 according to an embodiment of the disclosure, which uses the battery 2350 as the antenna radiator (e.g., second radiator 620) and the ground area, is improved by about 2 to 3 dB in the frequency band of about 2400 to 3000 MHz as compared with the radiation efficiency P1 of the stylus pen according to the comparative embodiment, which does not use the battery 2350 as the antenna radiator and the ground area.

Figure 27A:
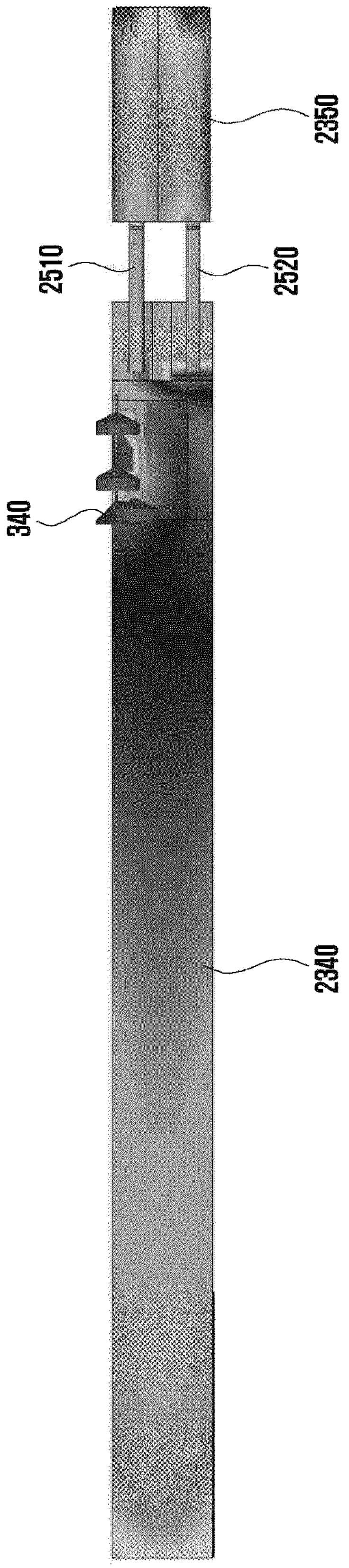
FIG. 27A is a diagram illustrating electric fields of a first radiator and a second radiator of a stylus pen according to an embodiment of the disclosure.
Figure 27B:
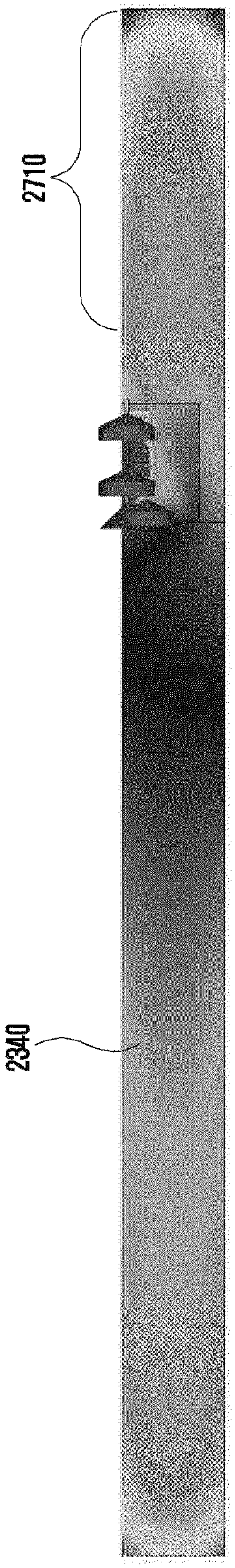
FIG. 27B is a diagram illustrating an electric field of a stylus pen according to various embodiments of the disclosure.

FIG. 27A is a diagram illustrating electric fields of a first radiator and a second radiator of a stylus pen according to an embodiment of the disclosure. FIG. 27B is a diagram illustrating an electric field of a stylus pen according to various embodiments of the disclosure.

According to an embodiment, FIG. 27A may be a diagram schematically illustrating an electric field formed on at least a part of the ground area 320 formed on the printed circuit board 2340 and the battery 2350 disclosed in FIG. 26A according to an embodiment of the disclosure.

With reference to FIG. 27A, if the wireless signal is supplied to the feeder point 340, it can be identified that an electric field is formed on the at least a part of the ground area 320 of the printed circuit board 2340 and the battery 2350, and thus they can be utilized as an antenna. For example, the at least a part of the ground area 320 of the printed circuit board 2340 may operate as the first antenna radiator 610, and the battery 2350 may operate as the second radiator 620.

According to an embodiment, since the at least a part of the ground area 320 formed on the printed circuit board 2340 is electrically connected to the battery 2350 by using the first conductive connection member 2510 and the second conductive connection member 2520, the ground area 320 can be extended.

According to an embodiment, the printed circuit board 2340 may include an extension part 2710 that is extended with a specific length. With reference to FIG. 27B, it can be identified that the electric field is formed on the at least a part of the ground area 320 formed on the printed circuit board 2340 and the extension part 2710, and thus they can be utilized as an antenna. If the printed circuit board 2340 includes the extension part 2710, the radiation area of the antenna can be extended, and the radiation performance can be improved. For example, the extension part 2710 may operate in replacement of the battery 2350 of FIG. 27A.

Figure 27C:
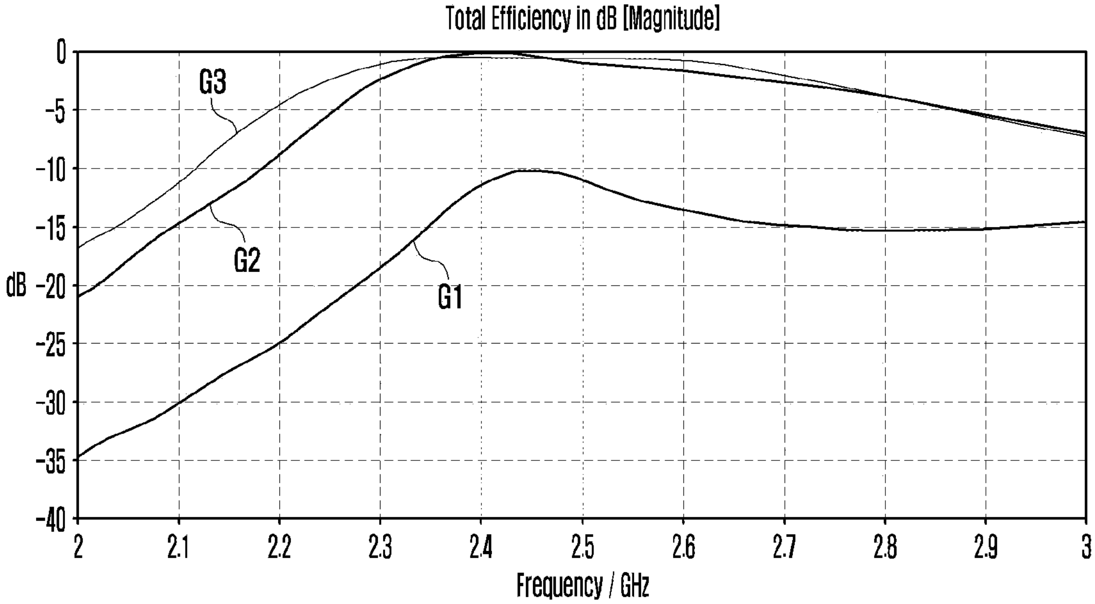
FIG. 27C is a diagram illustrating comparison of a radiation efficiency of a stylus pen according to a comparative embodiment and an electric field according to various embodiments of the disclosure.

FIG. 27C is a diagram illustrating comparison of a radiation efficiency of a stylus pen according to a comparative embodiment and an electric field according to various embodiments of the disclosure.

According to various embodiments, the stylus pen according to the comparative embodiment may not use the battery 2350 as the antenna radiator and the ground area, or may not include the extension part 2710 of the printed circuit board 2340. According to an embodiment, the stylus pen 2300 according to an embodiment of the disclosure may utilize at least a part of the ground area 320 of the printed circuit board 2340 as the first antenna radiator 610, and may utilize the battery 2350 as the second radiator 620. According to various embodiments, the printed circuit board 2340 of the stylus pen 2300 may include the extension part 2710 that is extended with a designated length.

With reference to FIG. 27C, it can be identified that the radiation efficiency G3 of the stylus pen 2300 utilizing at least a part of the ground area 320 of the printed circuit board 2340 as the first antenna radiator 610 and utilizing the battery 2350 as the second radiator 620, and the radiation efficiency G2 of the stylus pen 2300 of which the printed circuit board 2340 includes the extension part 2710 are improved by about 8 to 18 dB in the frequency band of about 2 to 3 GHz as compared with the radiation efficiency G1 of the stylus pen, which does not utilize the at least a part of the ground area 320 of the printed circuit board 2340 and the battery 2350 as the antenna radiator, or which does not include the extension part 2710 of the printed circuit board 2340.

Figure 28A:
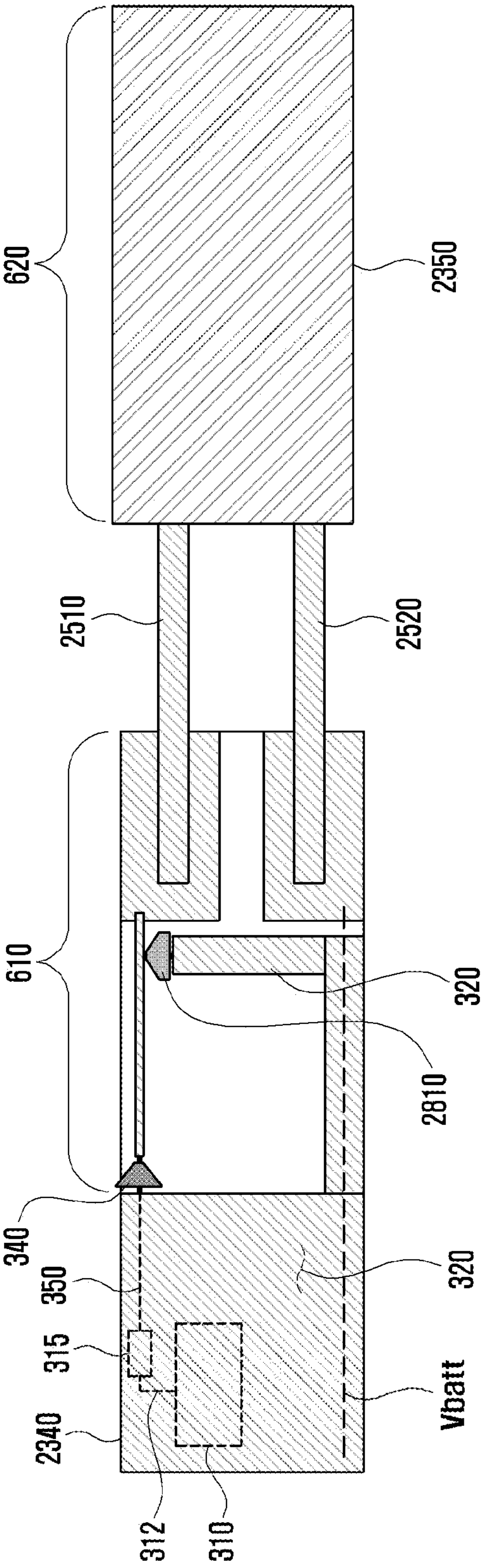
FIG. 28A is a diagram explaining a connection constitution of a printed circuit board of a stylus pen and a battery according to various embodiments of the disclosure.
Figure 28B:
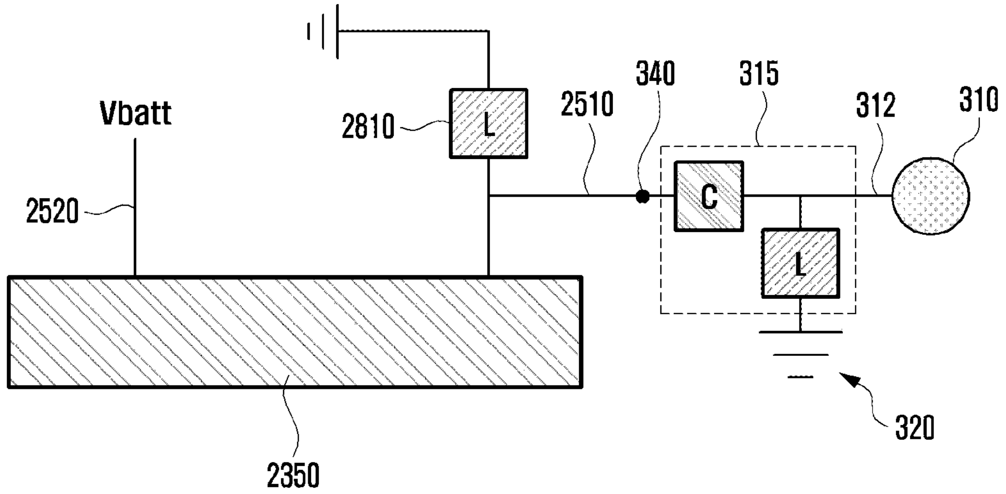
FIG. 28B is a diagram schematically illustrating an equivalent circuit constitution for a constitution disclosed in FIG. 28A according to various embodiments of the disclosure.

FIG. 28A is a diagram explaining a connection constitution of a printed circuit board of a stylus pen and a battery according to various embodiments of the disclosure. FIG. 28B is a diagram schematically illustrating an equivalent circuit constitution for a constitution disclosed in FIG. 28A according to various embodiments of the disclosure.

According to various embodiments, embodiments disclosed in FIGS. 28A and 28B may include the embodiments disclosed in FIGS. 26A and 26B. In the explanation with reference to FIGS. 28A and 28B, the same reference numerals are given to substantially the same constituent elements as those of the embodiments disclosed in FIGS. 26A and 26B, and the duplicate explanation of their functions may be omitted.

With reference to FIGS. 28A and 28B, a part of the printed circuit board 2340 may be electrically connected to the battery 2350 by using the first conductive connection member 2510 and the second conductive connection member 2520. For example, at least a part of the ground area 320 formed on the printed circuit board 2340 may be electrically connected to the battery 2350 by using the first conductive connection member 2510 and the second conductive connection member 2520. Since the at least a part of the ground area 320 formed on the printed circuit board 2340 is electrically connected to the battery 2350 by using the first conductive connection member 2510 and the second conductive connection member 2520, the ground area 320 can be extended, and the radiation area can be extended.

According to an embodiment, the wireless signal output from the wireless communication circuit 310 may be transferred to the feeder point 340 through the signal path 312 and the feeder wire 350. The wireless signal transferred to the feeder point 340 may be transferred to at least a part of the ground area 320. The at least a part of the ground area 320 may be an area that operates as the first radiator 610. The wireless signal transferred to the feeder point 340 may be transferred to the battery 2350 through the first conductive connection member 2510.

With reference to FIGS. 28A and 28B, the feeder point 340 may be formed in the ground area 320 adjacent to the first conductive connection member 2510. If a feed signal is applied to the feeder point 340 through the wireless communication circuit 310, the applied signal may be transferred to at least a part of the battery 2350 through the first conductive connection member 2510. At least a part of the ground area 320 of the printed circuit board 2340 may operate as the first antenna radiator 610, and the battery 2350 may operate as the second radiator 620.

According to an embodiment, since the at least a part of the ground area 320 formed on the printed circuit board 2340 is electrically connected to the battery 2350 by using the first conductive connection member 2510 and the second conductive connection member 2520, the ground area 320 can be extended, and the radiation performance of the antenna can be improved.

According to various embodiments, the printed circuit board 2340 may include an inductor 2810 (e.g., filter element) for an RF choke. For example, the inductor 2810 for the RF choke may be disposed between the ground area 320 and the battery 2350. For example, the inductor 2810 for the RF choke may be disposed between the first conductive connection member 2510 and the ground area 320. The inductor 2810 for the RF choke may filter the wireless signal being transferred through the first conductive connection member 2510. For example, the inductor 2810 for the RF choke may perform a function of enabling the wireless signal being transferred through the feeder point 340 and the first conductive connection member 2510 not to be applied to the ground area 320, but to be applied to the battery 2350.

Figure 28C:
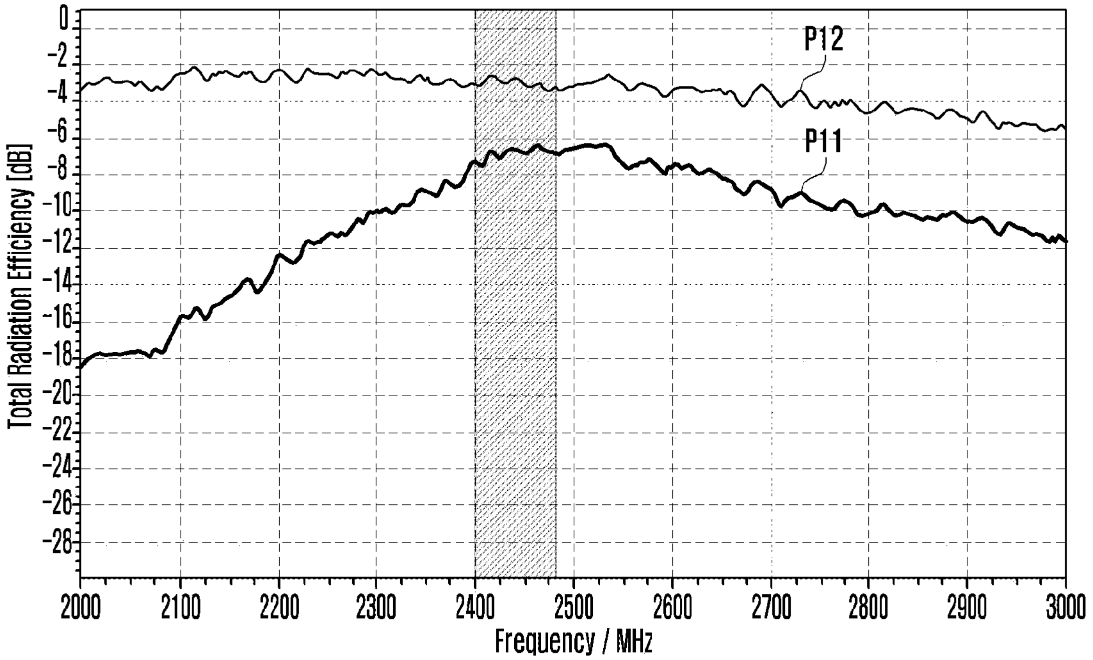
FIG. 28C is a diagram illustrating comparison of a radiation efficiency of a stylus pen according to a comparative embodiment and a radiation efficiency of a stylus pen according to an embodiment of the disclosure.

FIG. 28C is a diagram illustrating comparison of a radiation efficiency of a stylus pen according to a comparative embodiment and a radiation efficiency of a stylus pen according to an embodiment of the disclosure.

According to various embodiments, the stylus pen according to the comparative embodiment may not use the battery 2350 as the antenna radiator and the ground area, or may not include the inductor 2810 for the RF choke. The stylus pen 2300 according to an embodiment of the disclosure may use the battery 2350 as the antenna radiator (e.g., second radiator 620) and the ground area, or may include the inductor 2810 for the RF choke.

With reference to FIG. 28C, it can be identified that the radiation efficiency P12 of the stylus pen 2300 according to an embodiment of the disclosure, which uses the battery 2350 as the antenna radiator (e.g., second radiator 620) and the ground area, or which includes the inductor 2810 for the RF choke is improved by about 3 to 4 dB in the frequency band of about 2400 to 2490 MHz as compared with the radiation efficiency P11 of the stylus pen according to the comparative embodiment, which does not use the battery 2350 as the antenna radiator and the ground area, or which does not include the inductor 2810 for the RF choke.

Figure 28D:
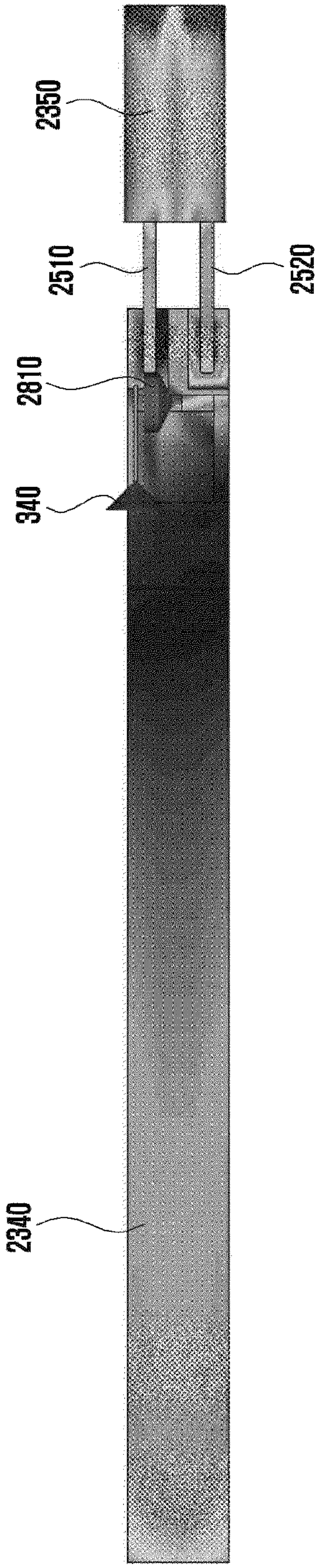
FIG. 28D is a diagram illustrating electric fields of a first radiator and a second radiator of a stylus pen according to various embodiments of the disclosure.

FIG. 28D is a diagram illustrating electric fields of a first radiator and a second radiator of a stylus pen according to various embodiments of the disclosure.

According to an embodiment, FIG. 28D may be a diagram schematically illustrating electric fields formed on at least a part of the ground area 320 formed on the printed circuit board 2340 and the battery 2350 disclosed in FIG. 28A according to an embodiment of the disclosure.

With reference to FIG. 28D, if the wireless signal is supplied to the feeder point 340, electric fields are formed on the at least a part of the ground area 320 of the printed circuit board 2340 and the battery 2350, and thus they can be utilized as the antenna. For example, the at least a part of the ground area 320 of the printed circuit board 2340 may operate as the first antenna radiator 610, and the battery 2350 may operate as the second radiator 620.

According to an embodiment, since the at least a part of the ground area 320 formed on the printed circuit board 2340 is electrically connected to the battery 2350 by using the first conductive connection member 2510 and the second conductive connection member 2520, the ground area 320 can be extended.

Figure 29A:
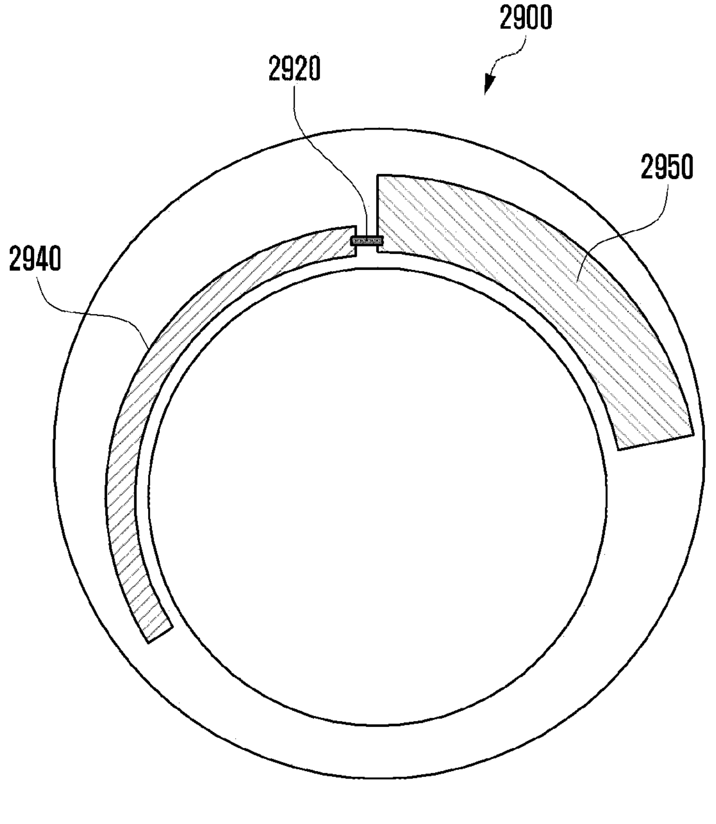
FIG. 29A is a diagram schematically illustrating a constitution of a smart ring according to an embodiment of the disclosure.
Figure 29B:
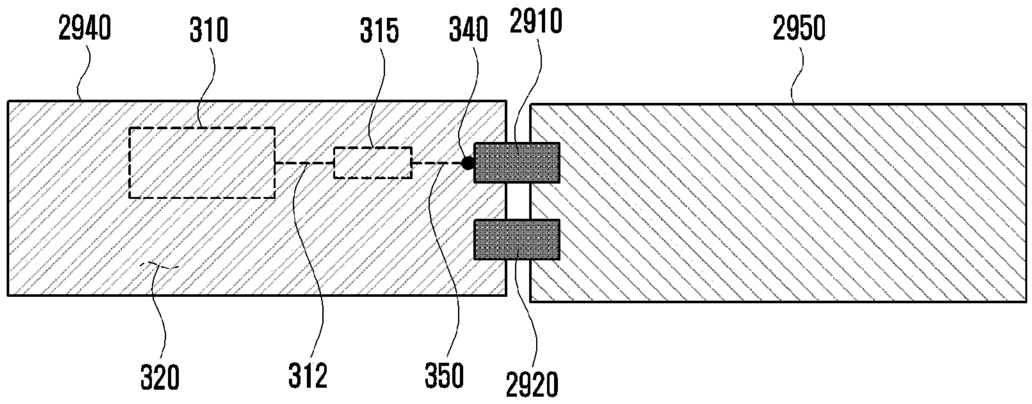
FIG. 29B is a diagram schematically illustrating a connection constitution of a printed circuit board of a smart ring disclosed in FIG. 29A and a battery according to an embodiment of the disclosure.

FIG. 29A is a diagram schematically illustrating a constitution of a smart ring according to an embodiment of the disclosure. FIG. 29B is a diagram schematically illustrating a connection constitution of a printed circuit board of a smart ring disclosed in FIG. 29A and a battery according to an embodiment of the disclosure.

According to various embodiments, embodiments disclosed in FIGS. 29A and 29B may include the embodiments disclosed in FIGS. 25A to 28D. In the explanation of FIGS. 29A and 29B, the same reference numerals are given to substantially the same constituent elements as those of the embodiments disclosed in FIGS. 25A to 28D, and the duplicate explanation of their functions may be omitted.

With reference to FIGS. 29A and 29B, a smart ring 2900 may include a printed circuit board 2940 and a battery 2950. The printed circuit board 2940 and the battery 2950 may be disposed to be spaced apart from each other. A part of the printed circuit board 2940 may be electrically connected to the battery 2950 by using a first conductive connection member 2910 and a second conductive connection member 2920.

According to an embodiment, the printed circuit board 2940 may include a wireless communication circuit 310, a signal path 312, a ground area 320, and/or a feeder point 340. For example, the battery 2950 may include the constitution disclosed in FIG. 24. At least a part of the battery 2950 (e.g., the case 2451, the anode 2453, and the cathode 2457) may include a conductive material.

According to an embodiment, since at least a part of the ground area 320 formed on the printed circuit board 2940 is electrically connected to the battery 2950 by using the first conductive connection member 2910 and the second conductive connection member 2920, the ground area 320 can be extended, and the radiation area can be extended.

According to an embodiment, the wireless signal output from the wireless communication circuit 310 may be transferred to the feeder point 340 through the signal path 312 and the feeder wire 350. The wireless signal transferred to the feeder point 340 may be transferred to at least a part of the ground area 320. The wireless signal transferred to the feeder point 340 may be transferred to the battery 2950 through the first conductive connection member 2910 and the second conductive connection member 2920.

With reference to FIGS. 29A and 29B, the feeder point 340 may be formed in the ground area 320 adjacent to the first conductive connection member 2910. If a feed signal is applied to the feeder point 340 through the wireless communication circuit 310, the applied signal may be transferred to at least a part of the battery 2950. Through such an operation, at least a part of the ground area 320 of the printed circuit board 2940 may operate as the first antenna radiator 610, and the battery 2950 may operate as the second radiator 620.

According to an embodiment, since the at least a part of the ground area 320 formed on the printed circuit board 2940 is electrically connected to the battery 2950 by using the first conductive connection member 2910 and the second conductive connection member 2920, the ground area 320 can be extended, and the radiation performance of the antenna can be improved.

Figure 30A:
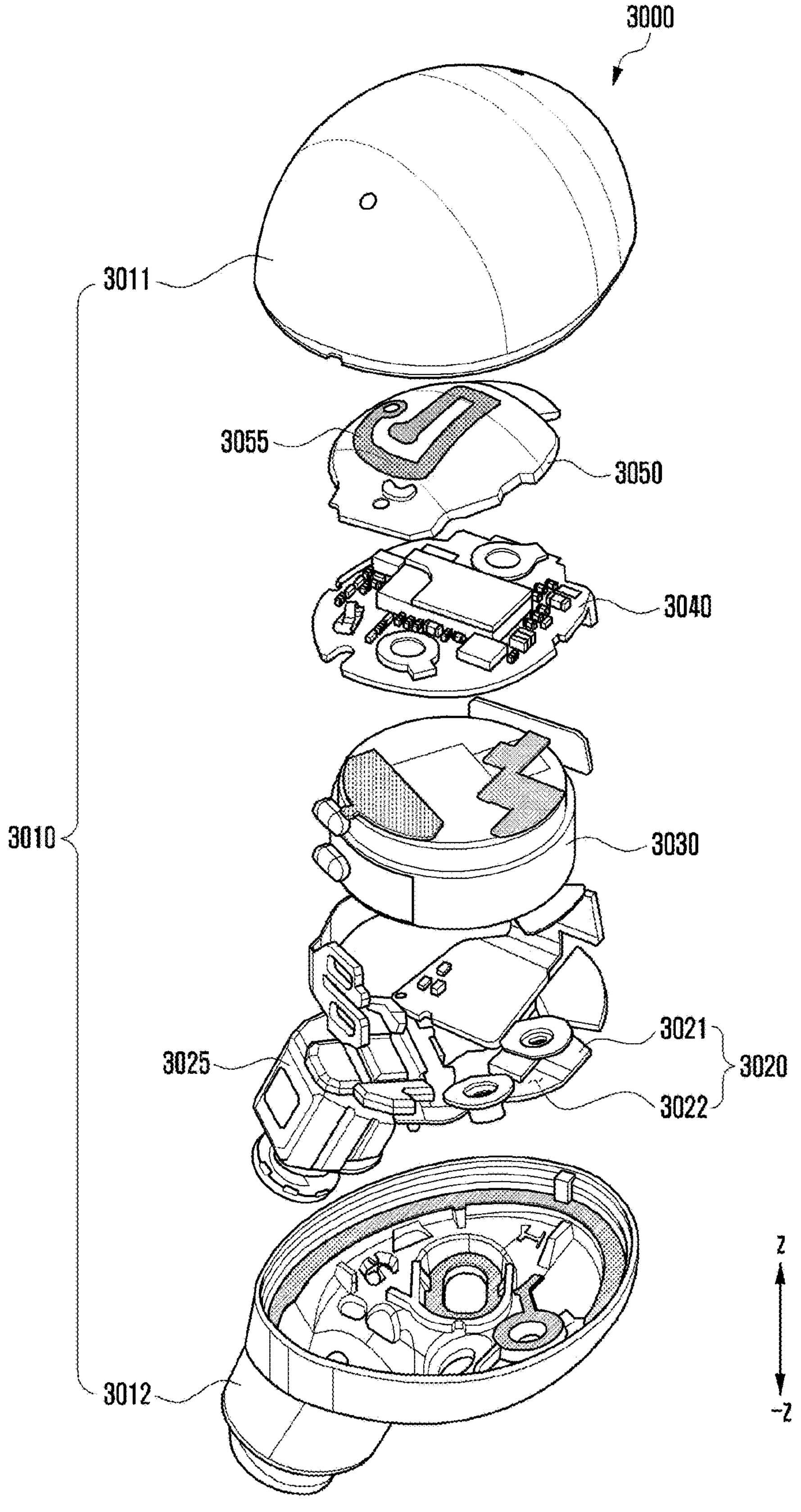
FIG. 30A is an exploded perspective view schematically illustrating a wireless earphone according to an embodiment of the disclosure.

FIG. 30A is an exploded perspective view schematically illustrating a wireless earphone according to an embodiment of the disclosure.

With reference to FIG. 30A, a wireless earphone 3000 may include a housing 3010 including a first case 3011 and a second case 3012 combined with the first case 3011.

According to an embodiment, the wireless earphone 3000 may include a bracket 3020 disposed inside the housing 3010 and including a first surface 3021 directed in the first direction (e.g., z-axis direction) and a second surface 3022 directed in the second direction (e.g., −z-axis direction), a printed circuit board 3040 disposed on the first surface 3021 of the bracket 3020, and an antenna carrier 3050 disposed between the printed circuit board 3040 and the first case 3011.

According to an embodiment, the wireless earphone 3000 may include a battery 3030 disposed on the second surface 3022 of the bracket 3020, and a speaker 3025 disposed between the battery 3030 and the second case 3012 and configured to output sound through an own sound path structure of the second case 3012.

According to an embodiment, the antenna carrier 3050 may be formed of a dielectric material, and m ay include a conductive pattern 3055 formed on an outer surface (e.g., z-axis direction) at a location near the first case 3011. When the antenna carrier 3050 is assembled, the conductive pattern 3055 may be electrically connected to the printed circuit board 3040 through an electrical connection member (e.g., conductive contact and/or C-clip). For example, the conductive pattern 3055 may be utilized as a touchpad by being electrically connected to a touch sensor module (e.g., sensor module 176 of FIG. 1) disposed on the printed circuit board 3040.

According to an embodiment, the conductive pattern 3055 may be utilized as an antenna configured to transmit or receive the wireless signal in a designated frequency band by being electrically connected to the wireless communication circuit (e.g., wireless communication circuit 310 of FIG. 30A) disposed on the printed circuit board 3040.

According to an embodiment, the antenna carrier 3050 may be disposed at a location that can be detected by a capacitance method through the conductive pattern 3055 when a user's finger comes in contact with or approaches the outer surface (e.g., z-axis direction) of the first case 3011 of the housing 3010. At least a partial area of the first case 3011 may be formed of a dielectric material.

Figure 30B:
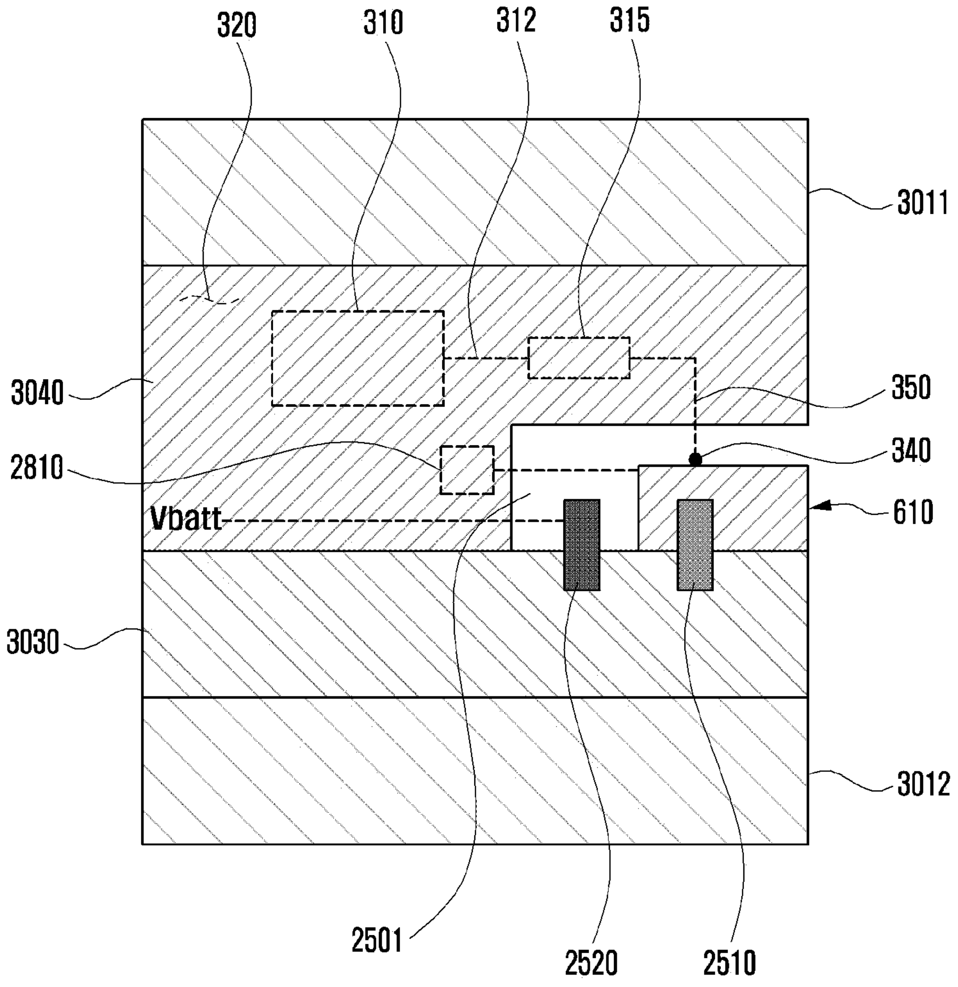
FIG. 30B is a diagram schematically illustrating an example of a state where some constitutions of the wireless earphone disclosed in FIG. 30A are combined with each other according to an embodiment of the disclosure.

FIG. 30B is a diagram schematically illustrating an example of a state where some constitutions of the wireless earphone disclosed in FIG. 30A are combined with each other according to an embodiment of the disclosure.

With reference to FIG. 30B, the wireless earphone 3000 may include the printed circuit board 3040 and the battery 3030 provided inside the housing 3010 including the first case 3011 and the second case 3012. A part of the printed circuit board 3040 may be electrically connected to the battery 3030 by using the first conductive connection member 2510 and the second conductive connection member 2520.

According to an embodiment, the printed circuit board 3040 may include the wireless communication circuit 310, the signal path 312, the ground area 320, the opening 2501, and/or the feeder point 340. The battery 3030 may include the constitution disclosed in FIG. 24. At least a part (e.g., case 2451, anode 2453, and cathode 2457 of FIG. 24) of the battery 3030 may include a conductive material.

According to an embodiment, the wireless communication circuit 310 may transmit and/or receive the wireless signal through the feeder point 340. For example, the wireless communication circuit 310 may include a radio frequency IC (RFIC). The wireless communication circuit 310 may be electrically connected to the feeder point 340 by using the signal path 312 and the feeder wire 350. The wireless communication circuit 310 may be electrically connected to the first conductive connection member 2510 through the feeder point 340.

According to an embodiment, the ground area 320 may be formed on at least a part of the printed circuit board 3040. The ground area 320 may be formed partly on the printed circuit board 3040. For example, the ground area 320 may include a conductive pattern partly formed inside the printed circuit board 3040.

According to an embodiment, the opening 2501 may be formed on a part of the printed circuit board 3040. For example, the opening 2501 may include a fill cut area. The opening 2501 may be a non-conductive area (e.g., non-conductive area 330 of FIG. 4) including a slit or a slot. The ground area 320 may be electrically connected to the first conductive connection member 2510.

According to an embodiment, the feeder point 340 may be electrically connected to the wireless communication circuit 310 by using the signal path 312 and the feeder wire 350. The feeder point 340 may transmit and/or receive the wireless signal under the control of the wireless communication circuit 310. In an embodiment, the wireless communication circuit 310, the signal path 312, the feeder wire 350, and the feeder point 340 may be electrically connected and may form the feeder part. The feeder point 340 may be formed on the first radiator 610 that is a part of the ground area 320. The feeder point 340 may be formed adjacent to the first conductive connection member 2510.

According to an embodiment, the wireless signal output from the wireless communication circuit 310 may be transferred to the feeder point 340 through the signal path 312 and the feeder wire 350. The wireless signal transferred to the feeder point 340 may be transferred to at least a part of the ground area 320 and/or the first radiator 610. The feeder point 340 may be electrically connected to a part of the ground area 320 and/or the first radiator 610. For example, at least a part of the ground area 320 formed on the printed circuit board 3040 may operate as the first radiator 610. The ground area 320 and the battery 3030 may be electrically connected to each other. For example, the battery 3030 may operate as the second radiator (e.g., second radiator 620 of FIG. 26A).

According to an embodiment, a matching circuit 315 may be disposed between the wireless communication circuit 310 and the feeder point 340. The matching circuit 315 may be disposed in the signal path 312 between the wireless communication circuit 310 and the feeder point 340 and/or the feeder wire 350. The matching circuit 315 may adjust impedance matching of the antenna (e.g., first radiator 610 and/or second radiator 620 (e.g., battery 3030)). For example, the matching circuit 315 may include at least one switch and/or at least one passive element. For example, the at least one passive element may have different element values. The at least one passive element (e.g., lumped element) may include capacitors C having various capacitance values and/or inductors L having various inductance values.

According to an embodiment, the first printed circuit board 3040 and the battery 3030 may be electrically connected to each other by using the first conductive connection member 2510 and the second conductive connection member 2520. For example, at least a part (e.g., first radiator 610) of the ground area 320 formed on the printed circuit board 3040 may be electrically connected to the battery 3030 by using the first conductive connection member 2510. Since the at least a part of the ground area 320 formed on the printed circuit board 3040 is electrically connected to the battery 3030 by using the first conductive connection member 2510, the ground area 320 can be extended, and the radiation area of the antenna can be extended. The battery 3030 electrically connected to the at least a part of the ground area 320 may operate as the second radiator (e.g., second radiator 620 of FIG. 6 or 26A).

According to an embodiment, the battery 3030 may be electrically connected to the second conductive connection member 2520. The battery 3030 may receive an input voltage Vbatt transferred through the second conductive connection member 2520. The battery 3030 may be electrically connected to the first radiator 610 through the first conductive connection member 2510. The first radiator 610 may be electrically connected to the inductor 2810 for the RF choke disposed on the printed circuit board 3040. The inductor 2810 for the RF choke may filter the wireless signal being transferred through the first radiator 610. For example, the inductor 2810 for the RF choke may perform a function of enabling the wireless signal being transferred through the feeder point 340 and the first conductive connection member 2510 not to be applied to the ground area 320, but to be applied to the battery 3030.

With reference to FIG. 30B, the feeder point 340 may be formed on the first radiator 610 (e.g., part of the ground area 320) adjacent to the first conductive connection member 2510. If the feed signal is applied to the feeder point 340 through the wireless communication circuit 310, the applied signal may be transferred to at least a part of the battery 3030 through the first conductive connection member 2510. Through such an operation, the at least a part of the ground area 320 may operate as the first radiator 610, and the battery 3030 may operate as the second radiator (e.g., second radiator 620 of FIG. 6 or 26A). According to various embodiments, the ground area of the wireless earphone 3000 may be extended through the at least a part (e.g., first radiator 610) of the ground area 320 formed on the printed circuit board 3040 and the at least a part of the battery 3030, and the radiation performance of the antenna may be improved.

Figure 30C:
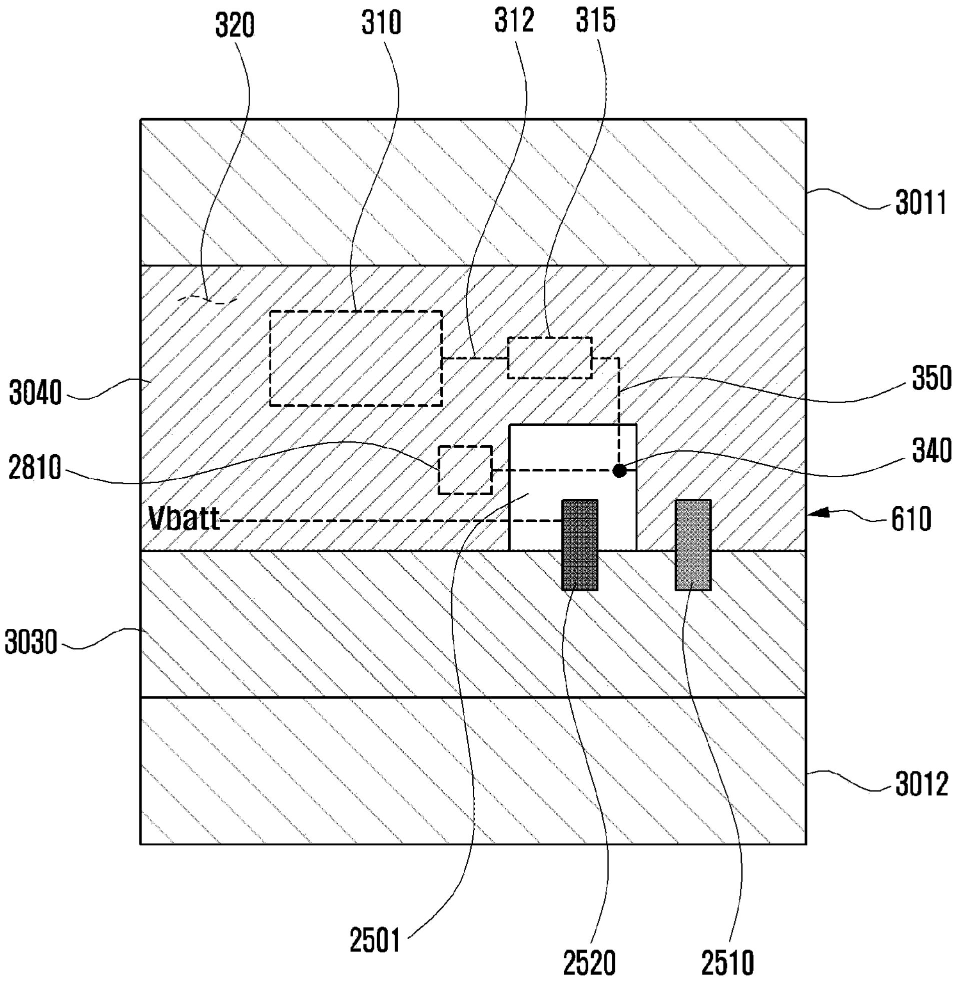
FIG. 30C is a diagram schematically illustrating various examples of a state where some constitutions of the wireless earphone disclosed in FIG. 30A are combined with each other according to an embodiment of the disclosure.

FIG. 30C is a diagram schematically illustrating various examples of a state where some constitutions of the wireless earphone disclosed in FIG. 30A are combined with each other according to an embodiment of the disclosure.

In explaining FIG. 30C, explanation of the constitution that is substantially the same as the embodiment disclosed in FIG. 30B as described above may be omitted.

According to an embodiment, the printed circuit board 3040 may include the wireless communication circuit 310, the signal path 312, the ground area 320, the opening 2501, and/or the feeder point 340.

According to an embodiment, the wireless communication circuit 310 may be electrically connected to the feeder point 340 by using the signal path 312 and the feeder wire 350. The wireless communication circuit 310 may be electrically connected to the first conductive connection member 2510 and/or the first radiator 610 through the feeder point 340.

According to an embodiment, the opening 2501 may be formed on a part of the printed circuit board 3040. At least a part of the ground area 320 may be electrically connected to the first conductive connection member 2510. The feeder point 340 may be formed on the first radiator 610 that is a part of the ground area 320.

According to an embodiment, the wireless signal output from the wireless communication circuit 310 may be transferred to the feeder point 340 through the signal path 312 and the feeder wire 350. The wireless signal transferred to the feeder point 340 may be transferred to at least a part of the ground area 320 and/or the first radiator 610. For example, at least a part of the ground area 320 formed on the printed circuit board 3040 may operate as the first radiator 610. The ground area 320 and the battery 3030 may be electrically connected to each other. For example, the battery 3030 may operate as the second radiator (e.g., second radiator 620 of FIG. 25A or 26A).

According to an embodiment, a matching circuit 315 may be disposed between the wireless communication circuit 310 and the feeder point 340. The matching circuit 315 may be disposed in the signal path 312 between the wireless communication circuit 310 and the feeder point 340 and/or the feeder wire 350.

According to an embodiment, the first printed circuit board 3040 and the battery 3030 may be electrically connected to each other by using the first conductive connection member 2510 and the second conductive connection member 2520. For example, at least a part (e.g., first radiator 610) of the ground area 320 formed on the printed circuit board 3040 may be electrically connected to the battery 3030 by using the first conductive connection member 2510. Since the at least a part of the ground area 320 formed on the printed circuit board 3040 is electrically connected to the battery 3030 by using the first conductive connection member 2510, the ground area 320 can be extended, and the radiation area of the antenna can be extended. The battery 3030 electrically connected to the at least a part of the ground area 320 may operate as the second radiator (e.g., second radiator 620 of FIG. 6 or 26A).

According to an embodiment, the battery 3030 may be electrically connected to the second conductive connection member 2520. The battery 3030 may receive an input voltage Vbatt transferred through the second conductive connection member 2520. The battery 3030 may be electrically connected to the first radiator 610 through the first conductive connection member 2510. The first radiator 610 may be electrically connected to the inductor 2810 for the RF choke disposed on the printed circuit board 3040. The inductor 2810 for the RF choke may filter the wireless signal being transferred through the first radiator 610. The feeder wire 350 may be electrically connected between the first radiator 610 and the inductor 2810 for the RF choke. The inductor 2810 for the RF choke may filter the wireless signal being transferred through the first radiator 610.

With reference to FIG. 30C, the feeder point 340 may be formed on the first radiator 610 (e.g., a part of the ground area 320) that is adjacent to the first conductive connection member 2510. If the feed signal is applied to the feeder point 340 through the wireless communication circuit 310, the applied signal may be transferred to at least a part of the battery 3030 through the first radiator 610 and/or the first conductive connection member 2510. According to various embodiments, the ground area of the wireless earphone 3000 may be extended through at least a part (e.g., first radiator 610) of the ground area 320 formed on the printed circuit board 3040 and at least a part of the battery 3030, and the radiation performance of the antenna may be improved.

Figure 31:
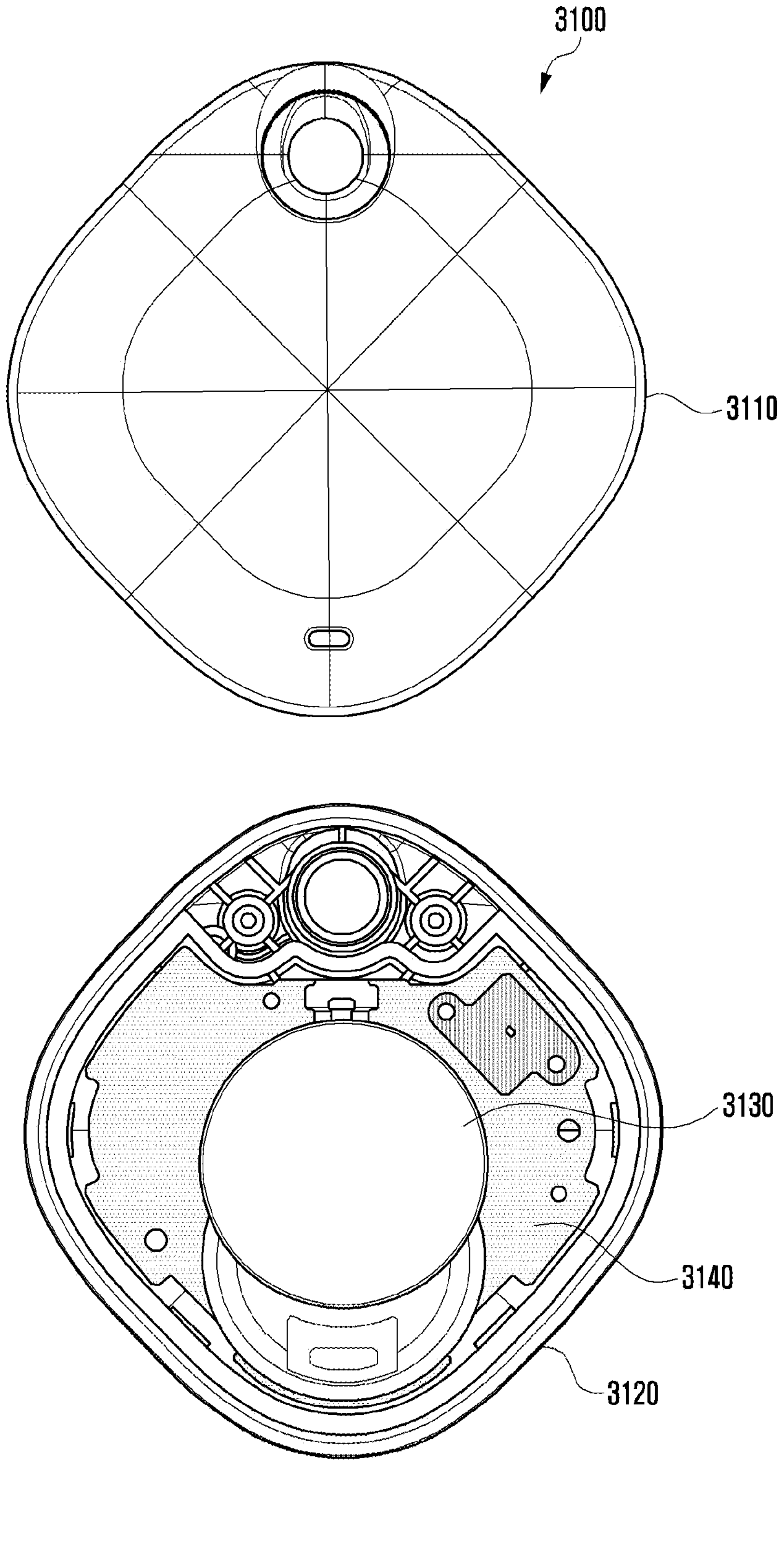
FIG. 31 is an exploded perspective view schematically illustrating a wireless tag according to an embodiment of the disclosure.

FIG. 31 is an exploded perspective view schematically illustrating a wireless tag according to an embodiment of the disclosure.

With reference to FIG. 31, a wireless tag 3100 may include a first case 3110 and a second case 3120 combined with the first case 3110.

According to an embodiment, the wireless tag 3100 may include a printed circuit board 3140 and a battery 3130 disposed inside the first case 3110 and the second case 3120.

According to an embodiment, the constitution related to the printed circuit board 3140 and the battery 3130 may be substantially the same as that of the embodiment disclosed in FIG. 30B in a state where only their drawing reference numerals are different from each other. For example, a part of the printed circuit board 3140 may be electrically connected to the battery 3130 by using the first conductive connection member 2510 and the second conductive connection member 2520.

According to an embodiment, the printed circuit board 3140 may include the wireless communication circuit 310, the signal path 312, the ground area 320, the opening 2501, and/or the feeder point 340. The battery 3130 may include the constitution disclosed in FIG. 24.

According to an embodiment, the wireless communication circuit 310 may transmit and/or receive the wireless signal through the feeder point 340. The wireless communication circuit 310 may be electrically connected to the feeder point 340 by using the signal path 312 and the feeder wire 350.

According to an embodiment, the ground area 320 may be formed on at least a part of the printed circuit board 3140. The ground area 320 may be formed partly on the printed circuit board 3140. For example, the ground area 320 may include a conductive pattern partly formed inside the printed circuit board 3140.

According to an embodiment, the opening 2501 may be formed on a part of the printed circuit board 3140. The ground area 320 may be electrically connected to the second conductive connection member 2520 through the opening 2501. The ground area 320 may be electrically connected to the first conductive connection member 2510.

According to an embodiment, the feeder point 340 may be electrically connected to the wireless communication circuit 310 by using the signal path 312 and the feeder wire 350. The feeder point 340 may transmit and/or receive the wireless signal under the control of the wireless communication circuit 310.

According to an embodiment, the wireless signal output from the wireless communication circuit 310 may be transferred to the feeder point 340 through the signal path 312 and the feeder wire 350. The wireless signal transferred to the feeder point 340 may be transferred to at least a part of the ground area 320 and/or the first radiator 610. The feeder point 340 may be electrically connected to a part of the ground area 320. In an embodiment, at least a part of the ground area 320 formed on the printed circuit board 3140 may operate as the first antenna radiator (e.g., first radiator 610 of FIG. 6 or 26A).

According to an embodiment, the printed circuit board 3140 and the battery 3130 may be electrically connected to each other by using the first conductive connection member 2510 and the second conductive connection member 2520. For example, at least a part of the ground area 320 formed on the printed circuit board 3140 may be electrically connected to the battery 3130 by using the first conductive connection member 2510 and the second conductive connection member 2520. Since the at least a part of the ground area 320 formed on the printed circuit board 3140 is electrically connected to the battery 3130 by using the first conductive connection member 2510 and the second conductive connection member 2520, the ground area 320 can be extended, and the radiation area of the antenna can be extended. The battery 3130 electrically connected to the at least a part of the ground area 320 may operate as the second radiator (e.g., second radiator 620 of FIG. 6).

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. A wearable electronic device comprising:

a bridge;

a first rim disposed in a first direction of the bridge, and a second rim disposed in a second direction of the bridge, the second direction being opposite to the first direction; and a first temple configured to be folded or unfolded with respect to the first rim using a first hinge part, and a second temple configured to be folded or unfolded with respect to the second rim using a second hinge part, wherein the first temple includes:

a first printed circuit board on which a wireless communication circuit is disposed and a ground area is partially formed;

a non-conductive area formed on a part of the ground area;

a feeder wire disposed across the non-conductive area, and having a first end electrically connected to the wireless communication circuit using a signal path and a second end disposed adjacent to the ground area;

a feeder point formed adjacent to the second end of the feeder wire and electrically connected to the feeder wire; and a first electronic component electrically connected to a part of the ground area, electrically connected to the feeder point, using a first conductive connection member.

2. The wearable electronic device of claim 1, wherein the first electronic component comprises one of a sound output module, a battery, or a motor.

3. The wearable electronic device of claim 1, wherein the non-conductive area is formed in the first direction on the part of the ground area, and wherein the feeder wire is disposed in the second direction that is perpendicular to the first direction.

4. The electronic device of claim 1, wherein the part of the ground area is configured to operate as a first radiator, and the first electronic component is configured to operate as a second radiator.

5. The wearable electronic device of claim 4, wherein the first radiator and the second radiator are configured to operate in different frequency bands.

6. The wearable electronic device of claim 1, wherein the part of the ground area is electrically connected to the first conductive connection member using a first connector.

7. The wearable electronic device of claim 6, wherein the first conductive connection member includes a flexible printed circuit board (FPCB) or an FPCB type RF cable (FRC), and wherein the first connector includes a pad for contact, a coupling member, a C-clip, or a conductive foam spring.

8. The wearable electronic device of claim 6, wherein the non-conductive area is formed in the first direction on the part of the ground area disposed on a lower part of the first connector.

9. The wearable electronic device of claim 6, wherein the non-conductive area is formed to extend in the second direction on the part of the ground area disposed on a lower part of the first connector.

10. The wearable electronic device of claim 6, wherein the non-conductive area is formed to extend in the second direction on the part of the ground area disposed on one side surface of the first connector.

11. The wearable electronic device of claim 6, wherein the non-conductive area comprises a first part formed in the second direction on the part of the ground area disposed on one side surface of the first connector, and a second part formed in the first direction on the part of the ground area disposed on a lower part of the first connector.

12. The wearable electronic device of claim 1, wherein at least a part of an exterior of the first temple is formed as a first non-conductive case.

13. The wearable electronic device of claim 12, wherein a part of the first non-conductive case is located on at least a part of a rear surface of the first printed circuit board and on at least a part of a rear surface of the first electronic component, and wherein a shielding member is disposed on an inside of the part of the first non-conductive case.

14. The wearable electronic device of claim 1, wherein a matching circuit is disposed between the wireless communication circuit and the feeder wire.

15. A wearable electronic device comprising:

a bridge;

a first rim disposed in a first direction of the bridge, and a second rim disposed in a second direction of the bridge, the second direction being opposite to the first direction; and a first temple configured to be folded or unfolded with respect to the first rim using a first hinge part, and a second temple configured to be folded or unfolded with respect to the second rim using a second hinge part, wherein the first temple includes:

a first printed circuit board on which a first wireless communication circuit is disposed and a first ground area is partially formed;

a first non-conductive area formed on a part of the first ground area;

a first feeder wire disposed across the first non-conductive area, and having a first end electrically connected to the first wireless communication circuit using a first signal path and a second end disposed adjacent to the first ground area;

a first feeder point formed adjacent to the second end of the first feeder wire and electrically connected to the first feeder wire; and a first electronic component electrically connected to a part of the first ground area, electrically connected to the first feeder point, using a first conductive connection member, and wherein the second temple includes:

a second printed circuit board on which a second wireless communication circuit is disposed and a second ground area is partially formed;

a second non-conductive area formed on a part of the second ground area;

a second feeder wire disposed across the second non-conductive area, and having a first end electrically connected to the second wireless communication circuit using a second signal path and a second end disposed adjacent to the second ground area;

a second feeder point formed adjacent to the second end of the second feeder wire and electrically connected to the second feeder wire; and a second electronic component electrically connected to a part of the second ground area, electrically connected to the second feeder point, using a second conductive connection member.

16. The wearable electronic device of claim 15, wherein the first non-conductive area is formed with a first length, and the second non-conductive area is formed with a second length, and wherein the first length and the second length are configured to be different from each other.

17. The wearable electronic device of claim 15, wherein the part of the first ground area is configured to operate as a first radiator, the first electronic component is configured to operate as a second radiator, the part of the second ground area is configured to operate as a third radiator, and the second electronic component is configured to operate as a fourth radiator.

18. The wearable electronic device of claim 17, wherein the first radiator, the second radiator, the third radiator, and the fourth radiator are configured to operate in different frequency bands.

19. The wearable electronic device of claim 15, wherein the part of the first ground area is electrically connected to the first conductive connection member using a first connector, and wherein the part of the second ground area is electrically connected to the second conductive connection member using a second connector.

20. The wearable electronic device of claim 15, wherein the first non-conductive area is formed in the first direction on the part of the first ground area, and the first feeder wire is disposed in the second direction that is perpendicular to the first direction, and wherein the second non-conductive area is formed in the first direction on the part of the second ground area, and the second feeder wire is disposed in the second direction that is perpendicular to the first direction.

* * * * *